US012212525B2

(12) United States Patent
Zhang et al.

(10) Patent No.: US 12,212,525 B2
(45) Date of Patent: Jan. 28, 2025

(54) TARGET PARAMETER DETERMINATION METHOD, COMMUNICATION NODE AND STORAGE MEDIUM

(71) Applicant: ZTE Corporation, Shenzhen (CN)

(72) Inventors: Shujuan Zhang, Guangdong (CN); Zhaohua Lu, Guangdong (CN); Xiyu Wang, Guangdong (CN); Yu Ngok Li, Guangdong (CN); Chuangxin Jiang, Guangdong (CN); Xianghui Han, Guangdong (CN); Wei Gou, Guangdong (CN)

(73) Assignee: ZTE Corporation, Shenzhen (CN)

( * ) Notice: Subject to any disclaimer, the term of this patent is extended or adjusted under 35 U.S.C. 154(b) by 313 days.

(21) Appl. No.: 17/632,337

(22) PCT Filed: Jul. 30, 2020

(86) PCT No.: PCT/CN2020/105800
§ 371 (c)(1),
(2) Date: Feb. 2, 2022

(87) PCT Pub. No.: WO2021/023091
PCT Pub. Date: Feb. 11, 2021

(65) Prior Publication Data
US 2022/0278807 A1 Sep. 1, 2022

(30) Foreign Application Priority Data
Aug. 2, 2019 (CN) .......................... 201910713325.7

(51) Int. Cl.
H04L 5/00 (2006.01)
H04L 1/1812 (2023.01)
(Continued)

(52) U.S. Cl.
CPC .......... H04L 5/0055 (2013.01); H04L 1/1812 (2013.01); H04W 72/0446 (2013.01); H04W 72/23 (2023.01); H04L 41/0803 (2013.01)

(58) Field of Classification Search
CPC ....... H04L 5/0053; H04L 5/0055; H04L 1/18; H04L 1/1812; H04L 1/0075;
(Continued)

(56) References Cited

U.S. PATENT DOCUMENTS

2019/0103943 A1 4/2019 Wang et al.
2019/0253308 A1* 8/2019 Huang ................ H04L 43/0823
(Continued)

FOREIGN PATENT DOCUMENTS

CN 107113122 A 8/2017
CN 110535609 A 12/2019
(Continued)

OTHER PUBLICATIONS

PCT/CN2020/105800, Nov. 2, 2020, International Search Report.
(Continued)

Primary Examiner — Warner Wong
(74) Attorney, Agent, or Firm — Wolf, Greenfield & Sacks, P.C.

(57) ABSTRACT

Provided are a target parameter determination method, a communication node and a storage medium. The target parameter determination method includes determining N types of information, where N is a positive integer, and a mapping relationship exists between the N types of information and a first-type set; and determining a target parameter according to the N types of information, where the target parameter includes at least one of a hybrid automatic repeat request (HARQ-ACK) parameter or a channel parameter.

16 Claims, 15 Drawing Sheets

(51) Int. Cl.
*H04W 72/0446* (2023.01)
*H04W 72/23* (2023.01)
*H04L 41/0803* (2022.01)

(58) Field of Classification Search
CPC ... H04L 1/1815; H04L 41/0803; H04L 41/08; H04L 41/0806; H04L 67/30; H04L 67/303; H04L 67/306; H04W 72/04; H04W 72/042
See application file for complete search history.

(56) References Cited

U.S. PATENT DOCUMENTS

| | | | | |
|---|---|---|---|---|
| 2020/0280971 | A1* | 9/2020 | Moon | H04L 5/0053 |
| 2020/0351129 | A1* | 11/2020 | Kwak | H04W 76/27 |
| 2020/0358487 | A1* | 11/2020 | Yang | H04L 1/1819 |
| 2022/0070934 | A1* | 3/2022 | Yang | H04W 76/28 |
| 2022/0201727 | A1* | 6/2022 | Gong | H04L 5/0055 |
| 2022/0232603 | A1* | 7/2022 | Xiao | H04L 1/1861 |
| 2022/0256573 | A1* | 8/2022 | Frenne | H04L 5/0053 |
| 2022/0256574 | A1* | 8/2022 | Shi | H04W 72/23 |
| 2022/0264339 | A1* | 8/2022 | Kim | H04B 17/373 |
| 2022/0321303 | A1* | 10/2022 | Matsumura | H04L 5/0053 |
| 2022/0345245 | A1* | 10/2022 | Yuan | H04L 5/0023 |
| 2023/0164800 | A1* | 5/2023 | Khoshnevisan | H04W 72/23 370/329 |
| 2023/0370211 | A1* | 11/2023 | Wang | H04L 5/0055 |

FOREIGN PATENT DOCUMENTS

| | | | |
|---|---|---|---|
| EP | 3 242 433 A1 | 11/2017 | |
| EP | 3662715 A1 * | 6/2020 | H04J 11/00 |
| WO | WO 2018/128474 A1 | 7/2018 | |
| WO | WO 2018/228487 A1 | 12/2018 | |
| WO | WO 2019/095314 A1 | 5/2019 | |

OTHER PUBLICATIONS

International Search Report mailed Nov. 2, 2020 in connection with International Application No. PCT/CN2020/105800.
[No Author Listed], Enhancements on multiple TRP or panel transmission. 3GPP TSG RAN WG1 #97. R1-1907443. ASUSTeK. May 13-17, 2019. 4 pages.
[No Author Listed], UCI enhancements for URLLC. 3GPP TSG RAN WG1 #97. R1-1906882. China Telecom. May 13-17, 2019. 3 pages.
[No Author Listed], Enhancements on multi-TRP/panel transmission. 3GPP TSG RAN WG1 #97. R1-1906224. NTT Docomo, Inc. May 13-17, 2019. 32 pages.
[No Author Listed], Further discussion on Multi-TRP/Panel transmission. 3GPP TSG RAN WG1 #97. R1-1906159. vivo. May 13-17, 2019.
[No Author Listed], Enhancements on Multi-TRP and Multi-panel Transmission. 3GPP TSG RAN WG1 #97. R1-1906236. ZTE. May 13-17, 2019. 14 pages.
IN 202227011169, Jul. 21, 2022, Examination Report.
Indian Examination Report mailed Jul. 21, 2022, in connection with Indian Application No. 202227011169.
Extended European Search Report dated Jul. 19, 2023, in connection with European Application No. 20849199.3.
Chinese Search Report dated May 5, 2023, in connection with Chinese Application No. 2019107133257.
Chinese Office Action dated May 7, 2023, in connection with Chinese Application No. 201910713325.7.
[No Author Listed], Enhancements on multiple TRP and Multi-panel transmission. 3GPP TSG RAN WG1 #96bis. R1-1904013. ZTE. Apr. 8-12, 2019. 13 pages.

* cited by examiner

```
Determine N types of information, where N is a positive integer, and
a mapping relationship exists between the N types of information and      S110
                        a first-type set
```

↓

```
Determine a target parameter according to the N types of information,     S120
  where the target parameter includes at least one of a HARQ-ACK
              parameter or a channel parameter
```

| | PDSCH11-(2,2) | PDSCH11-(4,4) |
|---|---|---|
| CC2 | PDSCH22-(2,2) PDSCH21-(2,2) | |
| | PDSCH12(2,2) | PDSCH12-(4,4) |
| CC1 | PDSCH22-(1,2) PDSCH21-(1,2) | PDSCH22-(3,3) PDSCH21-(3,3) |
| | PDSCH12-(1,2) | PDSCH12-(3,4) |
| | PDSCH11-(1,2) | PDSCH11-(3,4) |
| | ←—Slot (n)—→ | ←—Slot (n + 1)—→ |

FIG. 9

| | PDSCH11-(1,4) | PDSCH11-(1,2) |
|---|---|---|
| CC2 | PDSCH22-(4,4) PDSCH21-(3,4) | |
| | PDSCH12(2,4) | PDSCH12-(2,2) |
| CC1 | PDSCH22-(4,4) PDSCH21-(3,4) | PDSCH22-(4,2) PDSCH21-(3,2) |
| | PDSCH12-(2,4) | PDSCH12-(2,2) |
| | PDSCH11-(1,4) | PDSCH11-(1,2) |
| | ←—Slot (n)—→ | ←—Slot (n + 1)—→ |

FIG. 10

TARGET PARAMETER DETERMINATION METHOD, COMMUNICATION NODE AND STORAGE MEDIUM

CROSS REFERENCES TO RELATED APPLICATIONS

This is a U.S. National Stage Application, filed under 35 U.S.C. 371, of International Patent Application No. PCT/CN2020/105800, filed on Jul. 30, 2020, which claims priority to Chinese Patent Application No. 201910713325.7 filed with the CNIPA on Aug. 2, 2019, the contents of which are incorporated herein by reference in their entireties.

TECHNICAL FIELD

The present application relates to a wireless communication network, for example, a target parameter determination method, a communication node and a storage medium.

BACKGROUND

New Radio (NR) Rel-15 supports semi-static hybrid automatic repeat request acknowledgement (HARQ-ACK) codebooks and dynamic HARQ-ACK codebooks. Different types of codebooks have different feedback mechanisms. For example, for a semi-static HARQ-ACK codebook, the problem of missing detection of downlink control information can be solved, but for each type of candidate physical downlink shared channel (PDSCH), corresponding HARQ-ACK information needs to be fed back, resulting in a relatively large number of HARQ-ACK bits included in the HARQ-ACK feedback codebook; and for a dynamic HARQ-ACK codebook, the number of HARQ-ACK bits is relatively small, and HARQ-ACK information corresponding to an actually scheduled PDSCH is mainly included. In addition, feedback requirements for HARQ-ACKs of different types of PDSCHs may be different. For example, it is necessary to distinguish between different sending nodes and to distinguish between HARQ-ACK feedback information of different types of PDSCHs. The feedback of HARQ-ACK information has various features, but there is no effective method for accurately determining a target parameter for the feedback of HARQ-ACK information, and HARQ-ACK information cannot be accurately fed back during transmission, resulting in low communication efficiency and reliability.

SUMMARY

The present application provides a target parameter determination method, a communication node and a storage medium to improve communication efficiency and reliability by determining a target parameter for HARQ-ACK information feedback.

An embodiment of the present application provides a target parameter determination method. The method includes determining N types of information, where N is a positive integer, and a mapping relationship exists between the N types of information and a first-type set; and determining a target parameter according to the N types of information, where the target parameter includes at least one of a hybrid automatic repeat request (HARQ-ACK) parameter or a channel parameter.

An embodiment of the present application provides a target parameter determination method. The method includes determining M types of information, wherein M is a positive integer, and in a case where M is greater than 1, at least two of the M types of information are associated with each other; and determining a target parameter according to the M types of information, where the target parameter includes at least one of a HARQ-ACK parameter or a channel parameter.

An embodiment of the present application provides a communication node. The communication node includes one or more processors; and a storage device configured to store at least one program.

When the one or more programs are executed by the one or more processors, the one or more processors perform the preceding target parameter determination method.

An embodiment of the present application provides a computer-readable storage medium. The storage medium stores a computer program which, when executed by a processor, causes the processor to perform the preceding target parameter determination method.

BRIEF DESCRIPTION OF DRAWINGS

FIG. 9 is a diagram illustrating separate calculations of DAI information corresponding to different combination values according to an embodiment.

FIG. 10 is a diagram illustrating a unified calculation of DAI information corresponding to different combination values according to an embodiment.

DETAILED DESCRIPTION

Figures 1, 2:
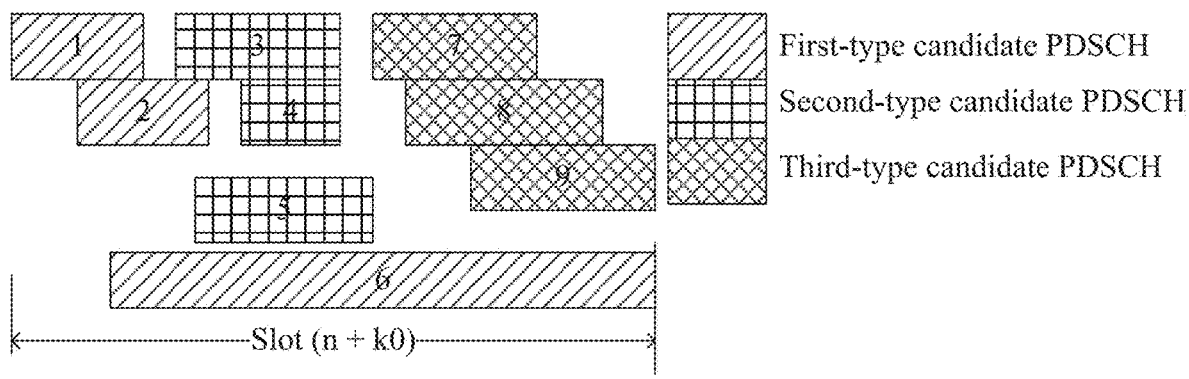
FIG. 1 is a diagram illustrating a classification of candidate PDSCHs in the process of acquiring a semi-static HARQ-ACK codebook.
FIG. 2 is a flowchart of a target parameter determination method according to an embodiment.

The present application is described hereinafter in conjunction with drawings and embodiments. The embodiments described herein are intended to explain and not to limit the present application. For ease of description, only part, not all, of structures related to the present application are illustrated in the drawings.

For a semi-static HARQ-ACK codebook, a HARQ-ACK feedback codebook can be obtained according to a time domain parameter of a PDSCH and a PDSCH-to-HARQ-ACK time offset set, and thus, the problem of missing detection of downlink control information can be solved. However, the HARQ-ACK feedback codebook includes a relatively large number of HARQ-ACK bits. This is because corresponding HARQ-ACK feedback bits need to be fed back for each type of candidate PDSCHs, even if a terminal receives no candidate PDSCH scheduled by a serving node, or no PDSCH in this type of candidate PDSCHs is scheduled by a serving node.

FIG. 1 is a diagram illustrating a classification of candidate PDSCHs in the process of acquiring a semi-static HARQ-ACK codebook. For example, a terminal may obtain, according to higher-layer signaling and/or a predetermined rule, time domain symbols occupied by PDSCHs (that is, candidate PDSCHs) possibly scheduled by a serving node in one slot. For example, a possible set of start time domain symbol information and occupied time domain symbol length information of the PDSCHs is notified in the higher-layer signaling. Time domain resources of PDSCHs actually scheduled by the serving node belong to the possible set. As shown in FIG. 1, a time domain resource set of the PDSCHs includes 9 rows (corresponding to blocks 1 to 9). Each block indicates a time domain symbol set of one PDSCH. In the process of scheduling a PDSCH, a physical downlink control channel (PDCCH) is used to indicate which block of FIG. 1 indicates a time domain resource occupied by the scheduled PDSCH. For example, if the terminal receives a PDCCH in slot (n), and the PDCCH indicates that PDSCH1 is in slot (n+k0) and indicates that HARQ-ACK information of PDSCH1 is fed back in slot (n+k0+k1), the terminal constructs a semi-static HARQ-ACK codebook in the process of feeding back the HARQ-ACK information in slot (n+k0+k1). In the semi-static HARQ-ACK codebook, not only HARQ-ACK information of PDSCH1 is fed back, but also HARQ-ACK information of other types of PDSCHs is required to be fed back, resulting in a relatively large number of HARQ-ACK bits. In this case, the terminal may or may not receive other types of PDSCHs.

The semi-static codebook may be obtained according to a possible time offset set of a PDSCH to a feedback resource of a HARQ-ACK codebook (for example, $\{k_1^0, k_1^1, k_1^2, \ldots, k_1^L\}$) notified by higher-layer signaling. In the downlink slot (n+k0+k1−k2) corresponding to each k2 among $k2 \in \{k_1^0, k_1^1, k_1^2, \ldots, k_1^L\}$, the terminal may obtain 3 types of candidate PDSCHs according to FIG. 1. Each type of PDSCH may also be referred to as one occasion of the PDSCH. In each type of candidate PDSCHs, the serving node can actually schedule only one PDSCH. In the process of feeding back the corresponding HARQ-ACK information for the actually scheduled PDSCH, even if the serving node does not schedule a PDSCH in another type of candidate PDSCHs or the terminal does not detect the PDCCH sent by the serving node to schedule this type of PDSCH, the terminal still needs to feed back the HARQ-ACK information corresponding to the another type of candidate PDSCHs in the semi-static feedback codebook. The feedback manner is, for example, to specify that a default HARQ-ACK value, such as non-acknowledgement (NACK), is fed back for the another type of candidate PDSCHs.

In the following embodiment, the process of obtaining the candidate PDSCHs for one carrier component (CC) may be as follows: Blocks whose start positions are earlier than the candidate PDSCH with the earliest end position of the time domain symbol among the time domain symbol sets of the 9 PDSCHs in FIG. 1, that is, earlier than block 1, are classified as one type of candidate PDSCHs. In this manner, {block 1, block 2, block 6} are first-type candidate PDSCHs. Blocks whose start positions are earlier than the candidate PDSCH with the earliest end position of the time domain symbol among the 6 blocks other than the first-type candidate PDSCHs among the 9 PDSCHs, that is, earlier than block 3, are classified as second-type candidate PDSCHs. In this manner, {block 3, block 4, block 5} are second-type candidate PDSCHs. Blocks whose start positions are earlier than the candidate PDSCH with the earliest end position of the time domain symbol among the blocks other than the preceding two types of candidate PDSCHs, that is, earlier than block 7, are classified as third-type candidate PDSCHs. In this manner, {block 7, block 8, block 9} are third-type candidate PDSCHs. In this manner, the three types of candidate PDSCHs as shown in FIG. 1 are obtained. In an embodiment, according to the time domain resource set corresponding to the candidate PDSCHs, the number of types of candidate PDSCHs included in each slot may be more than 3 or less than 3. In this manner, the number of candidate PDSCH types in each preceding downlink slot (n+k0+k1−k2) is obtained. PDSCHs in one type of candidate PDSCHs belong to one carrier component or belong to one bandwidth part (BWP) of one carrier component. In a multi-carrier component application scenario, the next semi-static HARQ-ACK codebook needs to include HARQ-ACK information of the candidate PDSCHs in each of the multiple carrier components, and the type of the candidate PDSCHs in each carrier component may be determined according to FIG. 1. In version of NR Rel15, for one type of candidate PDSCHs in one carrier component, the terminal expects that the serving node cannot schedule more than one PDSCH during actual scheduling. The preceding one type of candidate PDSCHs belong to one slot.

A dynamic HARQ-ACK codebook can only partially solve the problem of missing detection of DCI but include fewer HARQ-ACK bits than a semi-static HARQ-ACK codebook. A dynamic HARQ-ACK codebook mainly includes the HARQ-ACK information corresponding to the actually scheduled PDSCHs. In application of wireless communication technologies, HARQ-ACK feedback of different types of PDSCHs needs to satisfy different features, but there is no effective enhancement scheme for HARQ-ACK information of different types of PDSCHs in the related art.

On the other hand, in the case where multiple nodes cooperate to schedule PDSCHs for one terminal, to reduce interaction information between the cooperative nodes, it is necessary to consider an enhancement scheme of HARQ-ACKs of PDSCHs sent by different sending nodes.

In the case where a terminal supports a HARQ-ACK feedback enhancement scheme for different types of PDSCHs or supports a HARQ-ACK enhancement scheme for multiple cooperative nodes, the feedback of HARQ-ACK information has various features. There is no effective solution for how a terminal accurately obtains HARQ-ACK feedback information and how a terminal accurately feeds back HARQ-ACK feedback information. As a result, the communication efficiency and reliability are degraded because the terminal cannot accurately feed back HARQ-ACK information during transmission.

In this embodiment, the target parameter about HARQ-ACK information feedback is determined according to the N types of information so that multiple communication nodes can communicate with one type of terminal in the same frequency-domain bandwidth and data channels with different requirements can be supported, thus improving the service diversity and link robustness, thereby improving the communication efficiency and reliability.

FIG. 2 is a flowchart of a target parameter determination method according to an embodiment. As shown in FIG. 2, the target parameter determination method according to this embodiment includes S110 and S120.

In S110, N types of information are determined, where N is a positive integer, and a mapping relationship exists between the N types of information and a first-type set.

The N types of information in this embodiment are used for determining the target parameter for a HARQ-ACK feedback. For example, the N types of information may include first-type information and second-type information. The first-type information is used for distinguishing between different communication nodes scheduling PDSCHs. The second-type information is used for distinguishing between different types of PDSCHs. The target parameter is determined according to the first-type information and the second-type information so that multiple communication nodes can communicate with one type of terminal in the same frequency-domain bandwidth and HARQ-ACK information can be fed back for different types of PDSCHs, thereby improving the communication reliability.

In this embodiment, a mapping relationship exists between the N types of information and a first-type set. The mapping relationship may affect a value of the N types of information or may be used as a basis for determining the target parameter. For example, the first-type set may be a downlink channel set, a HARQ-ACK bit set, an uplink channel set including HARQ-ACK information, or a downlink control channel element set. A downlink control channel element includes one of the following: a control resource set (CORESET), a search space set, a search space corresponding to one aggregation degree, a time domain monitoring occasion of one search space set, one frequency domain resource set of one CORESET, one control channel demodulation reference signal port group, a control channel resource corresponding to one quasi co-location reference signal set, a candidate control channel, or a downlink control channel corresponding to a scrambling sequence.

In S120, a target parameter is determined according to the N types of information, where the target parameter includes at least one of a hybrid automatic repeat request (HARQ-ACK) parameter or a channel parameter.

In this embodiment, the N types of information in this embodiment may be used for determining the target parameter for a HARQ-ACK feedback. For example, a HARQ-ACK codebook to be fed back may be determined according to the N types of information, or a feedback resource where HARQ-ACK information to be fed back is located may be determined according to the N types of information. In the case where the channel is a downlink channel, the channel may be received according to the target parameter. In the case where the channel is an uplink channel, the channel may be sent according to the target parameter.

In an embodiment, the HARQ-ACK parameter includes a parameter for determining at least one of the following: a location where a HARQ-ACK of a downlink channel is located in one HARQ-ACK bit set, the number of HARQ-ACK bits included in one HARQ-ACK bit set, an uplink feedback resource where a HARQ-ACK bit is located, or a parameter for acquisition of HARQ-ACK bits included in one HARQ-ACK bit set. In this embodiment, a HARQ-ACK bit set includes one of the following: a HARQ-ACK codebook, a HARQ-ACK subcodebook, a HARQ-ACK bit sequence, or a HARQ-ACK bit set included in one uplink feedback resource.

In an embodiment, in the case where the target parameter includes the HARQ-ACK parameter, the target parameter is determined according to the N types of information in at least one of the manners below.

The HARQ-ACK parameter includes a HARQ-ACK feedback channel, and HARQ-ACK information of downlink channels which have the same combination value of the N types of information is included in the same HARQ-ACK feedback channel.

The HARQ-ACK parameter includes a HARQ-ACK feedback channel, and HARQ-ACK information of downlink channels which have different information values of at least one of the N types of information is included in different HARQ-ACK feedback channels.

The HARQ-ACK parameter includes a HARQ-ACK bit set, and HARQ-ACK information of downlink channels which have the same combination value of the N types of information is included in the same HARQ-ACK bit set.

HARQ-ACK parameter includes a HARQ-ACK bit set, and HARQ-ACK information of downlink channels which have different information values of at least one of the N types of information is included in different bit sets.

For example, in an embodiment, the HARQ-ACK parameter includes a HARQ-ACK feedback channel, and HARQ-ACK information of downlink channels which have the same combination value of the N types of information corresponds to the same HARQ-ACK feedback channel. For example, the N types of information include first-type information and second-type information. In the case where the value of the first-type information is 0 or 1 and the value of the second-type information is 0 or 1, then the combination value of the first-type information and the second-type information corresponding to downlink channel 1 is (0, 1), and the combination value of the first-type information and the second-type information corresponding to downlink channel 2 is (0, 1) and one PUSCH or different PUSCHs.

In an embodiment, one time unit includes at least two HARQ-ACK bit sets, and physical uplink control channel (PUCCH) resources where different HARQ-ACK bit sets are located are indicated by different PDCCHs. For example, in the case where the time unit is slot and slot 1 includes HARQ-ACK bit set 1 and HARQ-ACK bit set 2, then a PUCCH resource where HARQ-ACK bit set 1 is located is indicated by PDCCH1 and a PUCCH resource where HARQ-ACK bit set 2 is located is indicated by PDCCH2.

In an embodiment, the PDCCHs satisfy at least one of the features below.

Different PDCCHs correspond to different combination values of the N types of information. For example, the N types of information include first-type information and second-type information, the combination value corresponding to PDCCH1 is (0, 1), and the combination value corresponding to PDCCH2 is (0, 2).

Combination values of the N types of information corresponding to the PDCCHs are the same as combination values of the N types of information corresponding to the HARQ-ACK bit sets included in the PUCCH resources indicated by the PDCCHs. For example, in the case where the N types of information include first-type information and second-type information and the combination value corresponding to a PDCCH is (0, 1), then combination values corresponding to a HARQ-ACK bit set in a PUCCH resource indicated by the PDCCH are all (0, 1).

Combination values of the N types of information corresponding to the PDCCHs are the same as combination values of the N types of information corresponding to the PUCCH resources indicated by the PDCCHs. For example, in the case where the N types of information include first-type information and second-type information and the combination value corresponding to a PDCCH is (0, 1), then a combination value corresponding to a PUCCH resource indicated by the PDCCH is also (0, 1).

In an embodiment, the HARQ-ACK bit set satisfies at least one of the features below.

Different HARQ-ACK bit sets correspond to different candidate PDSCH type sets. For example, HARQ-ACK bit set 1 corresponds to a set including first-type candidate PDSCHs and second-type candidate PDSCHs, and HARQ-ACK bit set 2 corresponds to a set including third-type candidate PDSCHs.

Each HARQ-ACK bit set corresponds to one HARQ-ACK codebook type, where the HARQ-ACK codebook type includes a semi-static codebook and a dynamic codebook. For example, HARQ-ACK bit set 1 corresponds to a semi-static codebook, HARQ-ACK bit set 2 corresponds to a dynamic codebook, and HARQ-ACK bit set 3 corresponds to a dynamic codebook.

At least two HARQ-ACK bit sets correspond to different HARQ-ACK codebook types. For example, the number of HARQ-ACK bit sets is greater than or equal to 2, and among the HARQ-ACK bit sets, at least one HARQ-ACK bit set corresponds to a semi-static codebook and at least one HARQ-ACK bit set corresponds to a dynamic codebook. For example, HARQ-ACK bit set 1 corresponds to a semi-static codebook, HARQ-ACK bit set 2 corresponds to a dynamic codebook, and HARQ-ACK bit set 3 corresponds to a dynamic codebook.

Each HARQ-ACK bit set includes HARQ-ACK information of each type of candidate PDSCHs in a candidate PDSCH type set. For example, in the case where there are a total of three types of candidate PDSCHs, then each bit set includes HARQ-ACK information of a respective one of the three types of candidate PDSCHs.

A HARQ-ACK bit sets include HARQ-ACK information of PDSCHs of the same type of candidate PDSCHs, where A is a non-negative integer less than or equal to the number of combination values of set-type information in the N types of information. In an embodiment, in the case where A is greater than 1, the A HARQ-ACK bit sets include HARQ-ACK information of the same or different PDSCHs of the same type of candidate PDSCHs. In the case where the N types of information include a time unit where a HARQ-ACK is located, the set-type information does not include the time unit where the HARQ-ACK is located.

In the case where for one type of candidate PDSCHs, a downlink channel corresponding to a first combination value of the N types of information is not received, the state of whether a HARQ-ACK bit set corresponding to the first combination value includes HARQ-ACK information corresponding to the one type of candidate PDSCHs is determined according to at least one of signaling information or a first predetermined rule. For example, in the case where the N types of information include first-type information and second-type information and a downlink channel whose combination value is (0, 1) is not received for a first-type candidate PDSCH, whether a HARQ-ACK bit set corresponding to (0, 1) includes HARQ-ACK information corresponding to the first-type candidate PDSCH is determined according to at least one of signaling information or a first predetermined rule.

In the case where for one type of candidate PDSCHs, the number of received downlink channels is 0, at least one of the following is determined according to at least one of signaling information or a predetermined rule:

A HARQ-ACK bit set containing default HARQ-ACK information corresponding to the one type of candidate PDSCHs. For example, in the case where the number of received downlink channels is 0 for first-type candidate PDSCHs, a HARQ-ACK bit set containing default HARQ-ACK information corresponding to the first-type candidate PDSCHs is determined according to at least one of signaling information or a predetermined rule.

The number of groups of HARQ-ACK information of the one type of candidate PDSCHs included in one HARQ-ACK bit set. For example, the number of groups of HARQ-ACK information of first-type candidate PDSCHs is determined according to at least one of signaling information or a predetermined rule.

In an embodiment, one group of HARQ-ACK information corresponds to one PDSCH or one transport block (TB).

In an embodiment, a HARQ-ACK bit set satisfies that A HARQ-ACK bit sets include HARQ-ACK information of PDSCHs of the same type of candidate PDSCHs, where A is a non-negative integer less than or equal to the number of combination values of set-type information in the N types of information. In this embodiment, set-type information is irrelevant to a time unit where HARQ-ACK information of a downlink channel is located. For example, in the case where the N types of information include first-type information, second-type information and third-type information, where the third-type information is a time unit where HARQ-ACK information of a downlink channel is located, the number of combination values of the N types of information is determined according to the first-type information (whose value is 0 or 1) and the second-type information (whose value is 0 or 1) and is irrelevant to the third-type information. In this case, N=2, the number of combination values of the set-type information is 4, and if A=3, the 3 bit sets include HARQ-ACK information of PDSCHs in the same type of candidate PDSCHs.

In an embodiment, the state of whether the HARQ-ACK bit set corresponding to the first combination value includes the HARQ-ACK information corresponding to the one type of candidate PDSCHs includes at least one of the following:

The HARQ-ACK bit set corresponding to the first combination value includes default HARQ-ACK information of the one type of candidate PDSCHs. For example, in the case where the N types of information include first-type information and second-type information and no downlink channel whose first combination value is (0, 1) is received for a first-type candidate PDSCH, then the inclusion state is determined according to at least one of signaling information or a first predetermined rule. The inclusion state includes that the HARQ-ACK bit set corresponding to (0, 1) includes default information of the first-type candidate PDSCH.

The HARQ-ACK bit set corresponding to the first combination value does not include default HARQ-ACK information of the one type of candidate PDSCHs. For example, in the case where the N types of information include first-type information and second-type information and no downlink channel whose first combination value is (0, 1) is received for a first-type candidate PDSCH, then the inclusion state is determined according to at least one of signaling information or a first predetermined rule. The inclusion state includes that the HARQ-ACK bit set corresponding to (0, 1) does not include default information of the first-type candidate PDSCH.

The HARQ-ACK bit set corresponding to the first combination value includes HARQ-ACK information of another PDSCH of the one type of candidate PDSCHs, where a combination value of the N types of information corresponding to the another PDSCH is different from the first combination value. For example, in the case where the N types of information include first-type information and second-type information and no downlink channel whose first combination value is (0, 1) is received for a first-type candidate PDSCH, then the inclusion state is determined according to at least one of signaling information or a first predetermined rule. The inclusion state includes that the HARQ-ACK bit set corresponding to (0, 1) includes HARQ-ACK information of other PDSCHs of first-type candidate PDSCHs, for example, HARQ-ACK information of PDSCHs corresponding to (0, 0), (1, 0) and (1, 1).

In an embodiment, one group of HARQ-ACK information corresponds to one PDSCH or one TB.

In an embodiment, the HARQ-ACK bit set satisfies at least one of the features below.

The first predetermined rule includes determining, according to a first parameter, the inclusion state of whether the HARQ-ACK bit set corresponding to the first combination value includes the HARQ-ACK information corresponding to the one type of candidate PDSCHs.

The second predetermined rule includes determining the HARQ-ACK bit set containing the default HARQ-ACK information according to a second parameter.

In an embodiment, the first parameter includes at least one of the following: the number of HARQ-ACK bit sets included in one time unit; the number of HARQ-ACK bit sets included in one feedback resource; a relationship between the first combination value and a combination value of the N types of information corresponding to a received PDSCH in the one type of candidate PDSCHs; the number of received PDSCHs in the one type of candidate PDSCHs; the maximum number of received PDSCHs in the one type of candidate PDSCHs; the maximum number of received transport blocks (TBs) in the one type of candidate PDSCHs; a set of combination values of the N types of information corresponding to the serving cell where the one type of candidate PDSCHs are located; or information about the number of sets of parameters of the same type corresponding to the frequency domain bandwidth where the one type of candidate PDSCHs are located.

In this embodiment, the time unit is a time unit where the HARQ-ACK bit set corresponding to the first combination value is located; and the feedback resource includes one or more HARQ-ACK bit sets. The feedback resource where the HARQ-ACK information is located in is a PUCCH resource (or a PUSCH resource).

The second parameter includes at least one of the following: a HARQ-ACK bit set containing HARQ-ACK information of the one type of candidate PDSCHs; the number of HARQ-ACK bit sets included in one time unit; the number of HARQ-ACK bit sets included in one feedback resource; the maximum number of received PDSCHs in the one type of candidate PDSCHs; a set of combination values of the N types of information corresponding to the serving cell where the one type of candidate PDSCHs are located; the maximum number of received TBs in the one type of candidate PDSCHs; or information about the number of sets of parameters of the same type corresponding to the frequency domain bandwidth where the one type of candidate PDSCHs are located.

In this embodiment, the number of HARQ-ACK bit sets containing default HARQ-ACK information of the one type of candidate PDSCHs is less than or equal to the number of combination values of the set-type information among the N types of information or less than or equal to the number of HARQ-ACK bit sets included in one time unit. In this embodiment, the set-type information among the N types of information does not include a time unit where HARQ-ACK information of a downlink channel is located.

In an embodiment, in the case where the target parameter includes the HARQ-ACK parameter, the HARQ-ACK parameter includes a DAI for determining at least one of a bit sequence of HARQ-ACK information or a number of bits of HARQ-ACK information.

In an embodiment, the DAI satisfies at least one of the features below.

DAIs corresponding to different values of the N types of information are counted separately.

T-DAI information in the DAI includes a cumulative number of PDCCH monitoring occasion-serving cell pairs that satisfy a first predetermined feature and exist until a PDCCH monitoring occasion-serving cell pair corresponding to a PDCCH where the DAI is located.

C-DAI information in the DAI includes a total number of PDCCH monitoring occasion-serving cell pairs that satisfy a first predetermined feature and exist until a PDCCH monitoring occasion corresponding to a PDCCH where the DAI is located.

One HARQ-ACK bit set includes multiple groups of HARQ-ACK bits, each group of HARQ-ACK bits corresponds to one DAI, and DAIs corresponding to the multiple groups of HARQ-ACK bits correspond to the same combination value of the N types of information, where a DAI corresponding to one group of HARQ-ACK bits includes a DAI included in a PDCCH scheduling the HARQ-ACK information. For example, in the case where one HARQ-ACK bit set includes three groups of HARQ-ACK bits, and each group of HARQ-ACK bits corresponds to one DAI, then the three DAIs correspond to the same combination value of the N types of information. Among the three groups of HARQ-ACK bits, one group of HARQ-ACK bits constitutes HARQ-ACK information for one TB or one PDSCH.

A combination value of the N types of information corresponding to one HARQ-ACK bit set is the same as a combination value of the N types of information corresponding to HARQ-ACK bits included in the one HARQ-ACK bit set. For example, in the case where a combination value of the N types of information corresponding to one HARQ-ACK bit set is (0, 0), then a combination value of the N types of information corresponding to multiple groups of HARQ-ACK bits included in the one HARQ-ACK bit set is also (0, 0).

The DAI includes the C-DAI, or the DAI includes the C-DAI and the T-DAI.

In an embodiment, the serving cell satisfies at least one of the following:

The serving cell is a serving cell where a PDCCH is located or a serving cell where a PDSCH scheduled by a PDCCH is located.

One PDCCH monitoring occasion-serving cell pair corresponds to one downlink channel. The downlink channel includes at least one of the following: a PDSCH; or a PDCCH releasing an SPS PDSCH. For example, one PDCCH monitoring occasion-serving cell pair corresponds to one PDSCH, and one PDCCH monitoring occasion-serving cell pair corresponds to one PDCCH releasing an SPS PDSCH. The first predetermined feature includes at least one of the following:

Combination values of the N types of information corresponding to the PDCCH monitoring occasion-serving cell pairs are the same. For example, for one DAI, T-DAI information includes a cumulative number of PDCCH monitoring occasion-serving cell pairs that correspond to a combination value of (0, 1) of the N types of information and exist until a PDCCH monitoring occasion-serving cell pair corresponding to a PDCCH where the DAI is located; and C-DAI information includes the total number of PDCCH monitoring occasion-serving cell pairs that correspond to a combination value of (0, 1) of the N types of information and exist until a PDCCH monitoring occasion corresponding to a PDCCH where the DAI is located. PDCCH monitoring occasion-serving cell pairs that correspond to a combination value of (0, 1) of the N types of information indicate a PDCCH corresponding to a combination value of (0, 1) of the N types of information in a PDCCH monitoring occasion and a PDSCH or PDCCH corresponding to a combination value of (0, 1) in a serving cell. Corresponding to a PDCCH monitoring occasion corresponding to a combination value of (0, 1) of the N types of information means the PDCCH monitoring occasion includes a PDCCH corresponding to a combination value of (0, 1).

HARQ-ACK information of downlink channels corresponding to the PDCCH monitoring occasion-serving cell pairs falls within the same feedback unit.

In this embodiment, the feedback unit at least one of the following: one HARQ-ACK feedback time unit such as one slot including an uplink transport domain or one subslot including an uplink transport domain; one HARQ-ACK bit set; or one feedback channel including a HARQ-ACK.

In an embodiment, the DAI satisfies at least one of the features below.

DAIs corresponding to different combination values of the N types of information are counted in a uniform manner.

A processing sequence of DAIs in multiple PDCCHs corresponding to different combination values of the N types of information is determined according to at least one of signaling information or a predetermined rule.

T-DAI information in the DAI includes a cumulative number of PDCCH monitoring occasion-serving cell pairs that satisfy a second predetermined feature and exist until a PDCCH monitoring occasion-serving cell pair corresponding to a PDCCH where the DAI is located.

C-DAI information in the DAI includes a total number of PDCCH monitoring occasion-serving cell pairs that satisfy a second predetermined feature and exist until a PDCCH monitoring occasion corresponding to a PDCCH where the DAI is located.

The DAI includes the C-DAI, or the DAI includes the C-DAI and the T-DAI.

In an embodiment, a processing sequence of DAIs in multiple PDCCHs corresponding to different combination values of the N types of information is determined according to at least one of signaling information or a predetermined rule in at least one of the manners below.

The processing sequence of the DAIs in the multiple PDCCHs corresponding to the different combination values of the N types of information is determined according to indexes of the combination values of the N types of information. For example, the DAI of a PDCCH corresponding to a combination value having a smaller index is processed first.

The processing sequence is determined in the following manner: The multiple PDCCHs are ordered in ascending order of each of the N types of information. For example, in the case where the N types of information include first-type information and second-type information, the multiple PDCCHs correspond to DAI1, DAI2, DAI3 and DAI4, and the corresponding values of (first-type information, second-type information) are (0, 0), (0, 1), (1, 1) and (1, 0) respectively, then the multiple PDCCHs first increase progressively according to the first-type information and then increase progressively according to the second-type information so that the arrangement sequence of the multiple PDCCHs is (0, 0), (1, 0), (0, 1) and (1, 1). Thus, the arrangement sequence of the corresponding DAIs is DAI1, DAI4, DAI2 and DAI3. Optionally, among the multiple PDCCHs, different PDCCHs correspond to different combination values of the N types of information.

The multiple PDCCHs are the same in terms of at least one of the following information: a PDCCH monitoring occasion, a serving cell where a PDCCH is located, a serving cell where a PDSCH scheduled by a PDCCH is located, a time unit where HARQ-ACK information corresponding to a PDCCH is located, a HARQ-ACK bit set containing HARQ-ACK information corresponding to a PDCCH, or a HARQ-ACK feedback resource where HARQ-ACK information corresponding to a PDCCH is located.

One processing of the DAI in one PDCCH of the multiple PDCCHs includes at least one of the following:

The state of a progressive increase of second predetermined information is determined according to a relationship between the C-DAI in the one PDCCH and first predetermined information. In this embodiment, determining the state of a progressive increase includes determining whether the second predetermined information increases progressively according to a predetermined step length in an accumulative manner. For example, in the case where the C-DAI in the PDCCH is smaller than the first predetermined information, the second predetermined information is increased by 1; otherwise, the second predetermined information remains unchanged.

First predetermined information is updated to the C-DAI information in the one PDCCH.

Third predetermined information is updated to the C-DAI or the T-DAI according to a relationship between the T-DAI in the one PDCCH and an empty set. For example, in the case where the one PDCCH includes no T-DAI, that is, in the case where the T-DAI is an empty set, the third predetermined value is updated to the C-DA; otherwise, the third predetermined value is updated to the T-DAI.

The first predetermined information is used for determining a position where a HARQ-ACK bit corresponding to the PDCCH is located in a HARQ-ACK bit set to which the HARQ-ACK bit belongs. The second predetermined information is used for determining at least one of a position where a HARQ-ACK bit corresponding to the PDCCH is located in a HARQ-ACK bit set to which the HARQ-ACK bit belongs. The third predetermined information is used for determining the number of bits included in a HARQ-ACK bit set.

In an embodiment, the second predetermined feature includes at least one of the following:

Combination values of the N types of information corresponding to the PDCCH monitoring occasion-serving cell pairs are the same.

HARQ-ACK information of downlink channels corresponding to the PDCCH monitoring occasion-serving cell pairs falls within the same feedback unit.

The feedback unit includes at least one of the following: one HARQ-ACK feedback time unit, one HARQ-ACK bit set, or one feedback channel including a HARQ-ACK.

In an embodiment, in the case where the target parameter includes the HARQ-ACK parameter, the HARQ-ACK parameter includes an uplink feedback resource where a HARQ-ACK is located. The target parameter is determined according to the N types of information in the manner below.

The uplink feedback resource is determined according to uplink feedback resource information indicated in a PDCCH, where the PDCCH includes a PDCCH satisfying a predetermined feature among multiple PDCCHs corresponding to multiple groups of HARQ-ACK information, and the uplink feedback resource includes the multiple groups of HARQ-ACK information. The multiple groups of HARQ-ACK information correspond to multiple PDCCHs. The PDCCH corresponding to the each of the multiple groups of HARQ-ACK information include the PDCCH scheduling the each of the multiple groups of HARQ-ACK information. A PDCCH scheduling one group of HARQ-ACK information is a PDCCH scheduling a PDSCH corresponding to the one group of HARQ-ACK information or is a PDCCH corresponding to the one group of HARQ-ACK information. The PDCCH is used for releasing an SPS PDSCH.

In an embodiment, an acquisition parameter of the PDCCH satisfying the predetermined feature includes the N types of information.

In an embodiment, in the case where a predetermined condition is satisfied, an acquisition parameter of the PDCCH satisfying the predetermined feature includes the N types of information.

In an embodiment, the PDCCHs satisfy at least one of the features below.

The PDCCH satisfying the predetermined feature includes a PDCCH having the largest index among the multiple PDCCHs, where an acquisition parameter of the indexes of the multiple PDCCHs includes the N types of information or where an acquisition parameter of the indexes of the multiple PDCCHs includes the N types of information, a PDCCH monitoring occasion index, and a serving cell index corresponding to the PDCCH. For example, the index of the PDCCH may be acquired according to the N types of information or according to the N types of information, a PDCCH monitoring occasion index, and a serving cell index corresponding to the PDCCH.

The PDCCH satisfying the predetermined feature includes a PDCCH having the largest index among multiple PDCCHs corresponding to predetermined combination values of the N types of information, where an acquisition parameter of the indexes of the multiple PDCCHs does not include the N types of information.

The predetermined condition includes at least one of the following:

One PDCCH monitoring occasion includes more than one PDCCH that schedules PDSCHs belonging to one serving cell.

The multiple PDCCHs include at least two PDCCHs in one PDCCH monitoring occasion, and PDSCHs corresponding to the two PDCCHs are located in one serving cell.

DAIs corresponding to different combination values of the N types of information are counted in a uniform manner.

The uplink feedback resource includes HARQ-ACK bits corresponding to different combination values of the N types of information.

In an embodiment, the first-type set satisfies at least one of the features below.

The number of first-type sets is determined according to the number of combination values of set-type information among the N types of information, where the set-type information does not include a time unit where HARQ-ACK information of a downlink channel is located.

The number of first-type sets included in one time unit is less than or equal to the number of combination values of set-type information among the N types of information.

The maximum number of PUCCH resources included in one time unit is determined according to the number of combination values of set-type information among the N types of information.

HARQ-ACK information corresponding to the same type of candidate PDSCHs is included in H first-type sets, where H is less than or equal to the number of combination values of set-type information among the N types of information or where H is less than or equal to the number of first-type sets included in one time unit; and where the H first-type sets include HARQ-ACK information of the same or different PDSCHs in the same type of candidate PDSCHs.

In an embodiment, H is determined in one of the manners below.

H is determined according to the maximum number of received PDSCHs in the same type of candidate PDSCHs.

H is determined according to the number of actually received PDSCHs in the same type of candidate PDSCHs.

In an embodiment, in the case where the target parameter includes the HARQ-ACK parameter, at least one of the following applies:

A loop of each of the N types of information is included in a process of determining a HARQ-ACK bit set included in one HARQ-ACK feedback resource.

A loop of combination values of the N types of information is included in a process of determining a HARQ-ACK bit set included in one HARQ-ACK feedback resource.

The HARQ-ACK parameter includes the HARQ-ACK bit set included in the one HARQ-ACK feedback resource.

In an embodiment, in the case where the target parameter includes the channel parameter, the channel parameter includes a PDCCH parameter, and a PDCCH satisfies at least one of the following:

In one PDCCH monitoring occasion, at most one PDCCH in one type of PDCCH is received.

In one PDCCH monitoring occasion, in the case where the number of PDCCHs scheduling PDSCHs is greater than 1, different PDCCHs are different in terms of an information value of at least one type of information in a first-type information set.

The one type of PDCCH corresponds to one combination value of the first-type information set.

In an embodiment, the first-type information set satisfies at least one of the following:

In the case where HARQ-ACK information included in one dynamic HARQ-ACK codebook corresponds to two or more combination values of set-type information among the N types of information, the first-type information set includes the N types of information.

In the case where HARQ-ACK information included in one dynamic HARQ-ACK codebook corresponds to less than two combination values of set-type information among the N types of information, the first-type information set does not include the N types of information.

The first-type information set includes one of the following: the N types of information, a time unit where a HARQ-ACK corresponding to a PDCCH is located, and a serving cell where a PDSCH scheduled by the PDCCH is located; a time unit where a HARQ-ACK corresponding to a PDCCH is located and a serving cell where a PDSCH scheduled by the PDCCH is located; the N types of information, a time unit where a HARQ-ACK corresponding to a PDCCH is located, and a serving cell where the PDCCH is located; or a time unit where a HARQ-ACK corresponding to a PDCCH is located and a serving cell where the PDCCH is located.

In an embodiment, in the case where the target parameter includes the HARQ-ACK parameter, at least one of the following also applies:

For multiple HARQ-ACK bit sequences falling within the same time unit, the arrangement sequence of the multiple HARQ-ACK bit sequences in one combination HARQ-ACK bit sequence is determined according to the N types of information. In the embodiment, the HARQ-ACK parameter includes a HARQ-ACK bit sequence.

For multiple downlink channels whose HARQ-ACKs fall within the same time unit, the positions where the HARQ-ACKs of the multiple downlink channels are located in one combination HARQ-ACK bit sequence are determined according to combination values of the N types of information corresponding to the multiple downlink channels. In the embodiment, the HARQ-ACK parameter includes a HARQ-ACK bit position.

For multiple HARQ-ACK bit sequences falling within the same time unit, a mapping relationship between the multiple HARQ-ACK bit sequences and X combination HARQ-ACK bit sequences is determined according to the N types of information. In the embodiment, X is a positive integer, and the HARQ-ACK parameter includes a combination HARQ-ACK bit sequence.

For multiple downlink channels whose HARQ-ACKs fall within the same time unit, a mapping relationship between HARQ-ACKs of the multiple downlink channels and multiple combination HARQ-ACK bit sequences is determined according to combination values of the N types of information corresponding to the multiple downlink channels. In the embodiment, the HARQ-ACK parameter includes a combination HARQ-ACK bit sequence.

In the case where the number F of HARQ-ACK bit sequences falling within the same time unit exceeds a predetermined threshold, HARQ-ACK bit sequences sent in the time unit are determined according to the priority of values of the N types of information. In the embodiment, the number of the sent HARQ-ACK bit sequences is less than F, and the HARQ-ACK parameter includes a HARQ-ACK bit sequence.

In the case where the number F of HARQ-ACK bit sequences falling within the same time unit exceeds a predetermined threshold, the number G of HARQ-ACK bit sequences sent in the time unit later than the preceding time unit is determined according to the priority of values of the N types of information. In the embodiment, G is less than or equal to F, and the HARQ-ACK parameter includes a HARQ-ACK bit sequence.

In the case where the number of uplink channels satisfying the predetermined feature and included in one time unit exceeds a predetermined threshold, HARQ-ACK bit sequences sent in the time unit are determined according to the priority of values of the N types of information. In the embodiment, the HARQ-ACK parameter includes a HARQ-ACK bit sequence.

One combination HARQ-ACK bit sequence is determined according to an information value loop rule of the N types of information. In the embodiment, the HARQ-ACK parameter includes a HARQ-ACK bit sequence.

The maximum number of combination HARQ-ACK bit sequences included in one time unit is determined according to the number of values of predetermined-type information among the N types of information. The HARQ-ACK parameter includes a combination HARQ-ACK bit sequence. In the case where the predetermined-type information includes more than two types of information, the number of values of the predetermined-type information includes the number of combination values of the predetermined-type information. In the case where the N types of information include a time unit where a HARQ-ACK is located, the set-type information does not include the time unit where the HARQ-ACK is located.

Different HARQ-ACK bit sequences among the multiple HARQ-ACK bit sequences correspond to different combination values of the N types of information; or downlink channel elements corresponding to different HARQ-ACK bit sequences correspond to different combination values of the N types of information.

In an embodiment, for multiple HARQ-ACK bit sequences falling within the same time unit, the arrangement sequence of the multiple HARQ-ACK bit sequences in one combination HARQ-ACK bit sequence is determined according to the N types of information in one of the manners below.

In the case where the N types of information include first-type information and second-type information, the multiple HARQ-ACK bit sequences first increase progressively according to the first-type information and then increase progressively according to the second-type information so that the arrangement sequence of the multiple HARQ-ACK bit sequences in one combination HARQ-ACK bit sequence is obtained.

In the case where the N types of information include first-type information and second-type information, the multiple HARQ-ACK bit sequences first increase progressively according to the second-type information and then increase progressively according to the first-type information so that the arrangement sequence of the multiple HARQ-ACK bit sequences in one combination HARQ-ACK bit sequence is obtained.

In the case where the N types of information include first-type information, the multiple HARQ-ACK bit sequences increase progressively according to the first-type information so that the arrangement sequence of the multiple HARQ-ACK bit sequences in one combination HARQ-ACK bit sequence is obtained.

In the case where the N types of information include second-type information, the multiple HARQ-ACK bit sequences increase progressively according to the second-type information so that the arrangement sequence of the multiple HARQ-ACK bit sequences in one combination HARQ-ACK bit sequence is obtained.

In an embodiment, for multiple HARQ-ACK bit sequences falling within the same time unit, a mapping relationship between the multiple HARQ-ACK bit sequences and X combination HARQ-ACK bit sequences is determined according to the N types of information. X is a positive integer in one of the manners below.

HARQ-ACK bit sequences corresponding to the same first-type information among the multiple HARQ-ACK bit sequences are mapped to one combination HARQ-ACK bit sequence.

HARQ-ACK bit sequences corresponding to the same second-type information among the multiple HARQ-ACK bit sequences are mapped to one combination HARQ-ACK bit sequence.

HARQ-ACK bit sequences corresponding to the same first-type information among the multiple HARQ-ACK bit sequences are mapped to one combination HARQ-ACK bit sequence according to the loop order of the second-type information.

HARQ-ACK bit sequences corresponding to the same second-type information among the multiple HARQ-ACK bit sequences are mapped to one combination HARQ-ACK bit sequence according to the loop order of the first-type information.

In the case where the second-type information corresponding to the multiple HARQ-ACK bit sequences is equal to a third predetermined value, the multiple HARQ-ACK bit sequences are mapped to different combination HARQ-ACK bit sequences.

HARQ-ACK bit sequences having a non-empty intersection between PUCCH resources corresponding to the multiple HARQ-ACK bit sequences are mapped to one combination HARQ-ACK bit sequence, where a PUCCH resource corresponding to one HARQ-ACK bit sequence is acquired by information indicated in a PDCCH of a predetermined number among multiple PDCCHs corresponding to the one HARQ-ACK bit sequence.

In an embodiment, X satisfies at least one of the features below.

In the case where the number D of HARQ-ACK bit sequences included in one time unit is less than a fourth predetermined value, X is equal to D.

In the case where the number D of HARQ-ACK bit sequences included in one time unit is greater than or equal to a fourth predetermined value, X is less than D.

In the case where the number E of channel elements satisfying the predetermined feature and included in one time unit is less than a fifth predetermined value, X is equal to D.

In the case where the number E of channel elements satisfying the predetermined feature and included in one time unit is greater than or equal to a fifth predetermined value, X is less than D.

The value of X is determined according to an intersection between PUCCH resources corresponding to the multiple HARQ-ACK bit sequences, where a PUCCH resource corresponding to one HARQ-ACK bit sequence is acquired by information indicated in a PDCCH of a predetermined number among multiple PDCCHs corresponding to the one HARQ-ACK bit sequence.

The channel elements satisfying the predetermined feature include one of the following: a PUCCH, a PUCCH including a HARQ-ACK, a PUSCH, a PUSCH including a HARQ-ACK, channel elements between which an intersection is empty, or channel elements between which a time domain resource intersection is empty.

In an embodiment, a combination HARQ-ACK bit sequence satisfies at least one of the features below.

One combination HARQ-ACK bit sequence is included in one feedback resource.

X combination HARQ-ACK bit sequences are included in X feedback resources.

X combination HARQ-ACK bit sequences are included in X feedback resources in the same time unit.

One combination HARQ-ACK bit sequence includes one HARQ-ACK codebook consisting of multiple HARQ-ACK subcodebooks, where one HARQ-ACK bit sequence includes one HARQ-ACK subcodebook.

One combination HARQ-ACK bit sequence includes a combination HARQ-ACK codebook consisting of multiple HARQ-ACK codebooks, where one HARQ-ACK bit sequence includes one HARQ-ACK codebook.

In an embodiment, the method further includes, in the case where one feedback resource includes HARQ-ACK information of C downlink channels and C is greater than 1, determining sixth-type information according to fifth-type information.

In this embodiment, the sixth-type information includes at least one of the following: a position where the HARQ-ACK information of the C downlink channels is located in HARQ-ACK information included in the one feedback resource; a position where the HARQ-ACK information of the C downlink channels is located in HARQ-ACK information included in one HARQ-ACK bit set; a feedback resource where the HARQ-ACK of the C downlink channels is located; or a processing sequence of DAIs corresponding to the C downlink channels.

In this embodiment, C is a positive integer greater than 1, and the C downlink channels correspond to one combination value of a second-type information set.

In an embodiment, the second-type information set includes at least one of the following information: a PDCCH monitoring occasion, a serving cell where a PDSCH is located, a time unit where a HARQ-ACK is located, the N types of information, a candidate PDSCH type, a feedback resource where a HARQ-ACK is located, or a HARQ-ACK bit set containing a HARQ-ACK. In this embodiment, the PDSCH is a PDSCH corresponding to the downlink channels, the HARQ-ACK parameter includes the sixth-type information, and the N types of information include the fifth information.

In an embodiment, the fifth-type information includes at least one of the following information: a calculation mode of DAIs corresponding to the C downlink channels, where the calculation mode includes separate calculation and unified calculation; information about a PDCCH corresponding to the downlink channels; or information about the downlink channels.

In an embodiment, the information about the PDCCH includes at least one of the following: control resource set (CORESET) index information of the PDCCH, search space index information of the PDCCH, candidate PDCCH index information of the PDCCH, quasi co-location (QCL) information of a demodulation reference signal of the PDCCH, or serving cell index information of the PDCCH.

In an embodiment, in the case where the target parameter includes the HARQ-ACK parameter, the N types of information satisfy at least one of the following:

A correspondence exists between B values of the N types of information and S sets of the HARQ-ACK parameter, where S is less than or equal to B, and B is a positive integer.

At least two values of the second-type information correspond to different HARQ-ACK parameters.

In an embodiment, the HARQ-ACK parameter includes at least one of the following: a parameter for acquisition of HARQ-ACK bits included in a HARQ-ACK bit set corresponding to a value of the second-type information; a parameter for acquisition of a HARQ-ACK bit sequence included in a HARQ-ACK bit set corresponding to a value of the second-type information; an uplink feedback resource where a HARQ-ACK bit is located; or a HARQ-ACK codebook type that includes a semi-static HARQ-ACK codebook and a dynamic HARQ-ACK codebook.

In an embodiment, the method further includes at least one of the following: a correspondence is determined between Z PDSCHs and W groups of HARQ-ACK information, where the W groups of HARQ-ACK information are included in one HARQ-ACK feedback unit; one HARQ-ACK feedback unit includes at most W groups of HARQ-ACK information for one time domain resource of a downlink transport domain, where the W groups of HARQ-ACK information correspond to Z PDSCHs in the one time domain resource of the downlink transport domain; or in the case where a number Z1 of PDSCHs whose time domain resources have an intersection is greater than 1, the maximum number of TBs included in the Z1 PDSCHs is less than a predetermined value, where the Z1 PDSCHs belong to one frequency domain bandwidth or include PDSCHs belonging to different frequency domain bandwidths.

In an embodiment, the one HARQ-ACK feedback unit includes one of the following: one HARQ-ACK bit set or one time unit including a HARQ-ACK, where one group of HARQ-ACK information corresponds to one TB.

In an embodiment, Z is greater than or equal to 1, and in the case where Z is greater than 1, a time domain resource intersection between the PDSCHs is non-empty.

In an embodiment, W satisfies at least one of the features below.

W is less than the sum of respective maximum numbers of TBs included in the Z PDSCHs, where among PDSCHs whose maximum number of TBs is greater than 1 among the Z PDSCHs, no configuration exists between two groups of HARQ-ACK information corresponding to one PDSCH so that a bundling operation is required.

The maximum number of TBs included in the Z1 PDSCHs is less than the predetermined value, where the predetermined value is acquired according to at least one of the following information: the number of combination values of the N types of information or the maximum number of simultaneously received TBs.

In an embodiment, the channel parameter includes at least one of the following: the maximum number of received PDSCHs in one type of candidate PDSCHs; the maximum number of received PDSCHs between which a time domain intersection is non-empty; the maximum total number of code words included in PDSCHs between which a time domain intersection is non-empty; the maximum number of code words included in one PDSCH; the maximum number of PDCCHs included in one PDCCH monitoring occasion and used for scheduling PDSCHs in the same carrier component (CC); the maximum number of channels included in one time unit, where the channels include at least one of the following channels: a downlink channel, an uplink channel, a downlink data channel, a downlink control channel, an uplink data channel or an uplink control channel; the maximum number of received PDSCHs between which a time domain resource intersection is non-empty and of which radio network temporary identifiers (RNTIs) are different; the number of groups of HARQ-ACK information directed at one type of candidate PDSCHs and included in one HARQ-ACK feedback unit, where one group of HARQ-ACK information corresponds to one transport block or one PDSCH, and the one HARQ-ACK feedback unit includes one of the following: one HARQ-ACK feedback time unit, one HARQ-ACK bit set, or one feedback channel including a HARQ-ACK; information about a relationship between time domain resources occupied by E PDSCHs, where E is a positive integer greater than or equal to 2; whether a transmission configuration indicator (TCI) pool corresponding to one frequency domain bandwidth satisfies the following condition: no TCI in the TCI pool includes a quasi co-location reference signal associated with a QCL-TypeD; or parameter information of the same PUCCH resource index.

In an embodiment, the PDSCHs between which the time domain resource intersection is non-empty include one of the following: PDSCHs belonging to one serving cell or PDSCHs belonging to at least two serving cells.

In an embodiment, the number of transmission repetitions of a PDSCH in one slot is associated with at least one of the following: the number of PDSCHs whose radio network temporary identifiers (RNTIs) are different; or the maximum number of received PDSCHs in one type of candidate PDSCHs.

In this embodiment, two parameters are associated with each other in the following manner: An acquisition parameter of one parameter includes the other type of parameter. For example, an acquisition parameter of the number of PDSCHs whose RNTIs are different and/or an acquisition parameter of the maximum number of received PDSCHs in one type of candidate PDSCHs includes the number of transmission repetitions of a PDSCH in one slot. That is, the number of the PDSCHs is determined according to the number of transmission repetitions of a PDSCH in one slot.

In an embodiment, in the case where the channel parameter includes the information about the relationship between the time domain resources occupied by the E PDSCHs, the first target parameter determination module is configured in at least one of the manners below.

A predetermined condition needs to be satisfied between the time domain resources occupied by E PDSCHs corresponding to the same value of the first-type information.

The predetermined condition does not need to be satisfied between time domain resources occupied by multiple PDSCHs corresponding to different values of the first-type information.

In an embodiment, the predetermined condition includes at least one of the following:

A time domain resource intersection between the E PDSCHs is empty, where the E PDSCHs correspond to one or more HARQ-ACK processes of one serving cell.

In the case where HARQ-ACK information of PDSCH1 is located in a first feedback time unit and HARQ-ACK information of PDSCH2 is located in a feedback time unit earlier than the first feedback time unit, the start position of PDSCH2 is not later than the start position of PDSCH1, where PDSCH1 and PDSCH2 belong to the E PDSCHs, and the E PDSCHs belong to one serving cell. The feedback time unit includes one of the following: one slot including HARQ-ACK information, one subslot including HARQ-ACK information, one subframe including HARQ-ACK information, or another feedback time unit. The feedback time unit includes an uplink transport domain.

In the case where the end position of PDCCH4 is later than the end position of PDCCH3, the start position of PDSCH4 is not earlier than the end position of PDSCH3, where PDCCH3 schedules PDSCH3, PDCCH4 schedules PDSCH4, PDSCH3 and PDSCH4 belong to the E PDSCHs, and the E PDSCHs correspond to E HARQ-ACK processes of one serving cell.

A time domain resource intersection between PDSCH5 whose scrambling RNTI is a first-type RNTI and PDSCH6 scrambled by a CS-RNTI is empty, where PDSCH5 and PDSCH6 belong to the E PDSCHs, the E PDSCHs belong to a primary serving cell, and the first-type RNTI includes a cell RNTI (C-RNTI) and a modulation and coding scheme C-RNTI (MCS-C-RNTI).

A time domain resource intersection between PDSCH7 whose scrambling RNTI is a second-type RNTI and PDSCH8 scrambled by an RA-RNTI is empty, where PDSCH7 and PDSCH8 belong to the E PDSCHs, the E PDSCHs belong to one serving cell, and the second-type RNTI includes a C-RNTI, an MCS-C-RNTI and a CS-RNTI.

In an RRC_IDLE mode and an RRC_INACTIVE mode, an intersection between the E PDSCHs whose scrambling RNTI is a third-type RNTI is allowed to be non-empty, where the third-type RNTI includes a system information RNTI (SI-RNTI), a paging RNTI (P-RNTI), a random access RNT (RA-RNTI) and a temporary cell RNTI (TC-RNTI).

In an embodiment, in the case where the channel parameter includes parameter information of one PUCCH resource index, the target parameter is determined according to the N types of information in the manner below.

Each of different combination values of the N types of information corresponds to one parameter set of the one PUCCH resource index, where the one parameter set of the one PUCCH resource index includes at least one of the following information: spatial relationship information, power information or timing advance information.

In an embodiment, the target parameter is determined according to the N types of information in one of the manners below.

The target parameter is determined according to the maximum number among numbers of respective values of Q types of information.

The target parameter is determined according to the product of numbers of respective values of Q types of information.

The target parameter is determined according to the minimum value between a first value and a predetermined threshold, where the first value is the maximum number among numbers of respective values of Q types of information.

The target parameter is determined according to the minimum value between a second value and a predetermined threshold, where the second value is the product of numbers of respective values of Q types of information.

The target parameter is determined according to the number of combination values of Q types of information.

In the above embodiment, Q is a positive integer less than or equal to N.

In an embodiment, the Q types of information satisfy at least one of the following:

The Q types of information belong to the N types of information.

In the case where the N types of information include a time unit where HARQ-ACK information of a downlink channel is located, the Q types of information do not include the time unit where the HARQ-ACK of the downlink channel is located.

In an embodiment, the N types of information include one of the following: at least one of first-type information or second-type information; or a time unit where HARQ-ACK information of a downlink channel is located and at least one of first-type information or second-type information.

In an embodiment, the first-type information satisfies at least one of the features below.

The first-type information is acquired by RRC signaling.

The first-type information is acquired according to group information corresponding to a CORESET. The group information corresponding to the CORESET includes group information configured in the CORESET or group information obtained according to a predetermined rule.

Different information values of the first-type information correspond to different CORESET group information.

Different values of the first-type information correspond to different communication nodes, where the communication nodes include at least one of the following: a receiving node of a HARQ-ACK; or a sending node of a downlink channel corresponding to the HARQ-ACK.

The first-type information is acquired according to a downlink control channel element index, where the downlink control channel element index includes at least one of the following: a CORESET index, a search space index or a candidate PDCCH index.

The first-type information is associated with a HARQ-ACK codebook type, where the HARQ-ACK codebook type includes a semi-static HARQ-ACK codebook and a dynamic HARQ-ACK codebook.

In an embodiment, the second-type information satisfies at least one of the features below.

The second-type information is acquired according to information included in a PDCCH.

The second-type information is acquired according to information about a control channel. The information about the control channel includes at least one of the following: a downlink control information format, a downlink control information size, a radio network temporary identifier, search space index information of downlink control information, CORESET index information, or downlink control information.

The second-type information is acquired according to a type of the downlink channel, where different values of the second-type information correspond to different types of the downlink channel.

The second-type information is acquired according to the PDSCH information.

The information about the PDSCH includes at least one of the following: the number of time domain symbols occupied by the PDSCH; the number of slots occupied by the PDSCH; scrambling sequence generation parameter information of the PDSCH; demodulation reference signal information of the PDSCH; quasi co-location reference signal information corresponding to a demodulation reference signal of the PDSCH; process number information of the PDSCH; or the position of a time domain symbol occupied by the PDSCH.

In an embodiment, the first-type information and the second-type information satisfy at least one of the features below.

The first-type information and the second-type information are acquired in different manners. For example, the first-type information and the second-type information are acquired in different signaling manners. For example, the first-type information is configured in RRC signaling, and the second-type information is configured in a physical layer dynamic control channel.

One first-type set corresponding to one information value of the first-type information includes at least two set elements, and the at least two set elements correspond to different second-type information values. For example, one information value of the first-type information corresponds to one CORESET group, one piece of second-type information corresponds to an RNTI set containing RNTIs of PDCCHs, and one CORESET group includes PDCCHs corresponding to different second-type information, that is, one CORESET group includes PDCCHs belonging to different RNTI sets. For example, one information value of the first-type information corresponds to downlink channel set 1, and downlink channels included in downlink channel set 1 may correspond to different second-type information.

One information value of the first-type information corresponds to one first-type downlink control channel element, and the first-type downlink control channel element includes at least two second-type downlink control channel elements, where two second-type downlink channel elements correspond to different second-type information values.

In the case where the number of values of the first-type information is 1, the N types of information include the second-type information.

In the case where the number of values of the second-type information is 1, the N types of information include the first-type information.

In the case where a time domain resource intersection between two PDSCHs corresponding to different values of the first-type information is non-empty, a frequency domain resource intersection between the two PDSCHs is non-empty.

In the case where a time domain resource intersection between two PDSCHs corresponding to different values of the second-type information is non-empty, a frequency domain resource intersection between the two PDSCHs is empty.

In the case where a time and frequency resource intersection between two PDSCHs corresponding to different values of the first-type information is non-empty, the two PDSCHs are received at the intersection.

In the case where a time and frequency resource intersection between two PDSCHs corresponding to different values of the second-type information is non-empty, only one of the two PDSCHs is received at the intersection.

Different values of the first-type information correspond to two types of PDSCHs, and a set difference between time domain symbol number sets of the two types of PDSCHs in one slot is empty.

Different values of the first-type information correspond to two types of PDSCHs, and each of the two types of PDSCHs corresponds to one channel scrambling parameter.

Different values of the second-type information correspond to two types of PDSCHs, and the two types of PDSCHs share one channel scrambling parameter.

The first-type information is associated with the second-type information.

In an embodiment, the first-type information is associated with the second-type information in one of the manners below.

The first-type information is associated with the second-type information in terms of configuration; or the first-type information and the second-type information corresponding to PDSCHs whose HARQ-ACKs fall within a same time unit are associated with each other.

In an embodiment, the first-type information is associated with the second-type information in at least one of the manners below.

A value of one type of information is obtained according to a value of the other type of information.

A value range of one type of information is obtained according to a value or a value range of the other type of information.

Certain value combinations of the two types of information are unable to exist simultaneously.

Certain value combinations of the two types of information are unable to be configured simultaneously.

Configuration information of one type of information includes the other type of information corresponding to the one type of information.

A correspondence between the two types of information is determined according to at least one of signaling information or an agreed rule.

The maximum number of combination values of the two types of information is not greater than a predetermined value.

One type of information is determined according to the number of values of the other type of information.

In an embodiment, the mapping relationship satisfies at least one of the features below.

Each information value of each of Q types of information corresponds to one first-type set.

Each combination value of the N types of information corresponds to one first-type set.

An intersection between first-type sets corresponding to different information values of each of Q types of information is empty.

A set difference between first-type sets corresponding to different information values of each of Q types of information is non-empty.

An intersection between first-type sets corresponding to different combination values of the N types of information is empty.

A set difference between first-type sets corresponding to different combination values of the N types of information is non-empty.

Each of different information values of each of Q types of information corresponds to one first-type set in one time unit.

Each of different combination values of Q types of information corresponds to the first-type set in one time unit.

In an embodiment, Q is a positive integer less than or equal to N.

The Q types of information satisfy at least one of the following:

The Q types of information belong to the N types of information.

In the case where the N types of information include a time unit where a HARQ-ACK of a downlink channel is located, the Q types of information do not include the time unit where the HARQ-ACK of the downlink channel is located.

In an embodiment, the first-type set includes at least one of the following: a downlink channel set, a HARQ-ACK bit set, an uplink channel set including HARQ-ACK information, or a downlink control channel element set. The HARQ-ACK information is about a downlink channel, and a downlink control channel element in the downlink control channel element set corresponds to the downlink channel corresponding to the HARQ-ACK information.

In an embodiment, the method further includes determining a time interval between a PDSCH and a feedback resource where a HARQ-ACK of the PDSCH is located according to the end position of the PDSCH in a predetermined number of transmission repetitions of the PDSCH in one time unit. In the case where the number of time units occupied by the PDSCH is greater than 1, the one time unit is the last time unit where the PDSCH is located. A predetermined number of transmission repetitions include the last transmission repetition.

In an embodiment, higher-layer signaling includes at least one of RRC signaling or medium access control-control element (MAC-CE) signaling. The RRC signaling includes at least one of the following control signaling: system control signaling, proprietary control signaling or broadcast control signaling. The higher-layer signaling may be control signaling other than physical layer control signaling. The physical layer control signaling includes control signaling transmitted in a PDCCH, such as DCI. For example, the higher-layer signaling may also include control signaling that is not RRC signaling or MAC-CE signaling and that is present in a future system.

In an embodiment, the time unit may be a slot or a subslot. One slot includes one or more subslots. Alternatively, the number of subslots included in one slot is obtained according to signaling information and/or a predetermined rule. Alternatively, one time unit is a predetermined number of slots. The predetermined number may be an integer greater than 1. Alternatively, one time unit is one subframe, or may be other time unit form. The form of the time unit is not limited in this embodiment.

In an embodiment, candidate PDSCHs may be classified in the manner shown in FIG. 1 or in other manners. The classification manner is not limited in this embodiment. PDSCHs in one type of candidate PDSCHs fall within one time unit.

In an embodiment, HARQ-ACK information corresponding to one type of candidate PDSCHs includes one of the following: HARQ-ACK information corresponding to a PDSCH received by a terminal in the one type of candidate PDSCHs; or default HARQ-ACK information corresponding to the one type of candidate PDSCHs in the case where no PDSCH in the one type of candidate PDSCHs is received.

In an embodiment, control information included in a PDCCH is DCI. Control information included in a PDCCH may also be a sequence. Different sequences indicate different control information.

In an embodiment, an occasion of one search space or CORESET includes a PDCCH in only the one search space or CORESET. In contrast, one PDCCH occasion may include PDCCHs in more than one CC or PDCCHs in more than one search space or CORESET. The PDCCH occasion is classified according to the start time domain symbol where a PDCCH is located.

In an embodiment, one frequency domain bandwidth includes at least one of the following: one carrier component, one serving cell, one BWP or one physical resource block (PRB).

In an embodiment, one CC is one serving cell, parameters for channels and/or signals included in different serving cells may be configured independently of each other, and frequency domain carriers where different serving cells are located may be configured independently of each other.

In an embodiment, HARQ-ACK information of one PDSCH includes one or more HARA-ACK bits, and the number HARQ-ACK bits included in HARQ-ACK information of one PDSCH is determined according to at least one of the following parameters: the number of configured code words; whether a bundling operation is performed between HARQ-ACK information of two code words; or the number of code block groups (CBGs) included in each code word.

In an embodiment, the position where HARQ-ACK information of a PDCCH releasing an SPS PDSCH is located in one HARQ-ACK codebook is the same as the position where the SPS PDSCH is located in the one HARQ-ACK codebook. In this embodiment, in the process of obtaining HARQ-ACK information of the PDCCH releasing the SPS PDSCH, the position where HARQ-ACK information of the PDCCH releasing the SPS PDSCH is located in one HARQ-ACK codebook is determined according to a time domain resource of the SPS PDSCH and a candidate PDSCH type to which the SPS PDSCH belongs.

In an embodiment, when the number of PDSCHs is calculated, a PDCCH releasing an SPS PDSCH is counted as a PDSCH. A PDSCH corresponding to the PDCCH releasing the SPS PDSCH is the SPS PDSCH, even if a terminal does not need to receive the SPS PDSCH corresponding to the PDCCH releasing the SPS PDSCH.

In an embodiment, one piece of information is acquired according to the other piece of information in the following manner: the value of the one piece of information is the value of the other piece of information; or an acquisition parameter of the one piece of information includes the other piece of information.

In an embodiment, a dynamic HARQ-ACK codebook is also referred to as a type-II HARQ-ACK codebook, and a semi-static HARQ-ACK codebook is also referred to as a type-I HARQ-ACK codebook. The two types of codebooks can also be distinguished from each other by other names. One difference between the two types of codebooks is whether there is a DAI indication field in a PDCCH scheduling a PDSCH.

In an embodiment, a HARQ-ACK corresponding to a PDCCH includes a HARQ-ACK of a PDSCH scheduled by the PDCCH; or a HARQ-ACK corresponding to a PDCCH releasing an SPS PDSCH.

In an embodiment, the downlink channel includes at least one of the following: a PDSCH; or a PDCCH releasing an SPS PDSCH.

In an embodiment, a serving cell corresponding to a PDCCH includes one of the following: a serving cell where the PDCCH is located; or a serving cell corresponding to a PDSCH scheduled by the PDCCH.

In an embodiment, a combination value of the N types of information includes combination information composed of respective values of the N types of information. In the case where N is equal to 1, the combination value of the N types of information is one value of one type of information. For example, in the case where N=3, one combination value of the N types of information includes {one value of first-type information, one value of second-type information, one value of third-type information}; and in the case where N=1, one combination value of the N types of information includes {one value of first-type information}.

In an embodiment, a feedback resource includes a HARQ-ACK feedback resource, for example, a PUCCH or a PUSCH.

Figure 3:
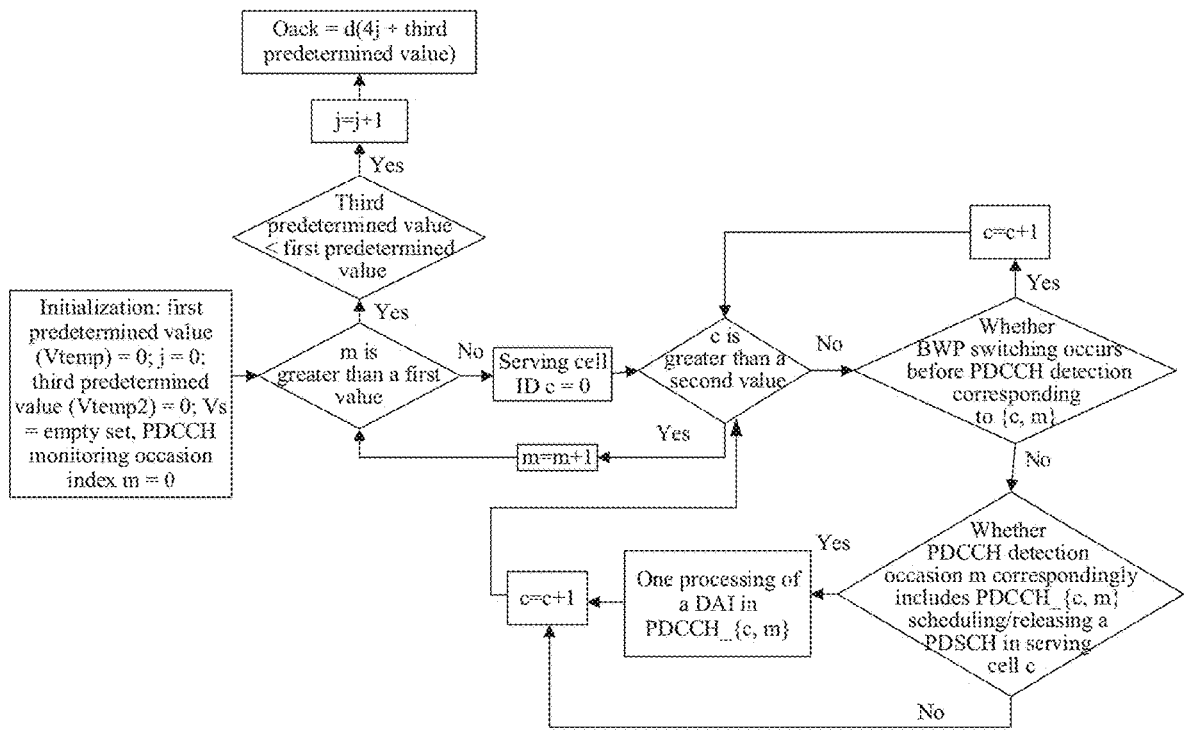
FIG. 3 is a diagram illustrating the process of acquiring a dynamic HARQ-ACK codebook according to an embodiment.

FIG. 3 is a diagram illustrating the process of acquiring a dynamic HARQ-ACK codebook according to an embodiment. In this embodiment, in the case where a dynamic HARQ-ACK codebook (or a dynamic HARQ-ACK sub-codebook) is determined in one feedback resource, the process of acquiring HARQ-ACK bits included in the dynamic HARQ-ACK codebook is shown in FIG. 3. The second value in FIG. 3 is the number of serving cells included in a serving cell set configured for a terminal or the number of serving cells included in the serving cell set corresponding to the dynamic HARQ-ACK codebook. The first value is the number of PDCCH monitoring occasions included in a PDCCH monitoring occasion set where multiple PDCCHs corresponding to the HARQ-ACK included in the dynamic HARQ-ACK codebook are located. Oack in FIG. 3 indicates the number of HARQ-AC bits included in the dynamic HARQ-ACK codebook. In FIG. 3, one $\{c, m\}$ corresponds to only one PDCCH; as c and m increase progressively, DAIs in multiple PDCCHs are sequentially processed; and Vtemp (that is, a first predetermined value), Vtemp2 (that is, a third predetermined value) and j (that is, a second predetermined value) are continuously updated and accumulated.

Figure 4:
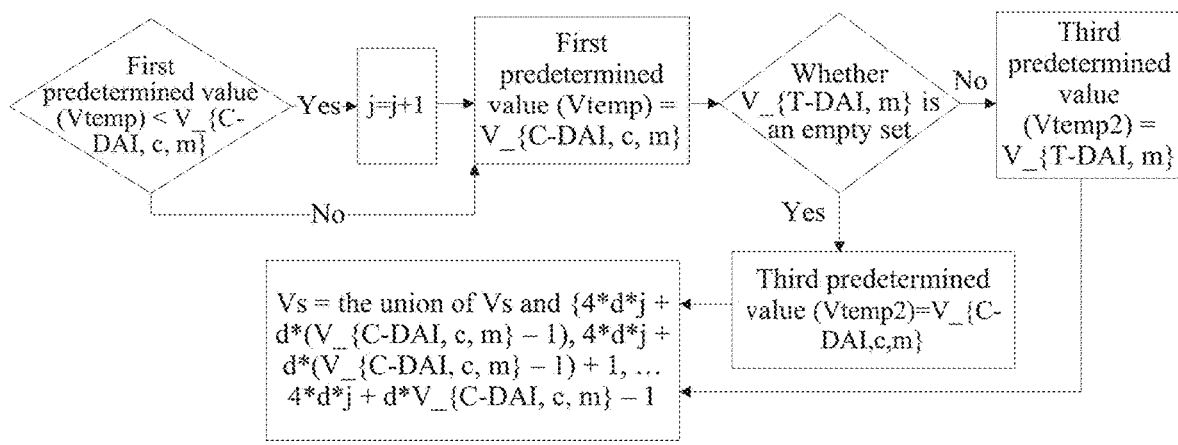
FIG. 4 is a diagram illustrating one processing of a downlink assignment index in one PDCCH according to an embodiment.

FIG. 4 is a diagram illustrating one processing of a DAI in one PDCCH according to an embodiment. For example, the one processing of a DAI in one PDCCH may be one processing of a DAI in one PDCCH corresponding to {PDCCH monitoring occasion m, serving cell c where the PDSCH is located}. In FIG. 4, d denotes the number of HARQ-ACK bits included in HARQ-ACK information of one PDSCH. In the case where the one PDSCH includes two TBs and bundling is needed for HARQ-ACK information of the two TBs, d=1. In the case where the one PDSCH includes two TBs and bundling is not needed for HARQ-ACK information of the two TBs, d=2. In the case where the number of CBGs included in TBs of one PDSCH is greater than 1, d=N_TB*N_CBG. N_TB denotes the number of TBs. N_CBG includes the maximum number of CBGs included in one TB. The PDSCH includes two TBs. Only one of the TBs is capable of being enabled. HARQ-ACK information of the other TB is a default value. In FIG. 4, the position of HARQ-ACK information of the PDSCH corresponding to PDCCH_$\{c, m\}$ is $\{4*d*j+d*(V\_\{C\text{-}DAI, c, m\}-1), 4*d*j+d*(V\_\{C\text{-}DAI, c, m\}-1)+1, \ldots, 4*d*j+d*(V\_\{C\text{-}DAI, c, m\})-1\}$. $V\_\{C\text{-}DAI, c, m\}$ denotes the C-DAI in the DAI in PDCCH_$\{c, m\}$. $V\_\{C\text{-}DAI, m\}$ denotes the T-DAI in the DAI in PDCCH$\{c, m\}$ or the T-DAI corresponding to PDCCH monitoring occasion m. Vs in FIG. 4 is a fourth predetermined set.

In an embodiment, a PDCCH corresponding to a HARQ-ACK or a PDCCH scheduling a HARQ-ACK includes a PDCCH scheduling a PDSCH corresponding to a HARQ-ACK or a PDCCH releasing an SPS PDSCH. The HARQ-ACK is HARQ-ACK information about the PDCCH.

In an embodiment, one HARQ-ACK bit set includes one of the following: a HARQ-ACK codebook; a HARQ-ACK subcodebook; a HARQ-ACK bit sequence; a set composed of HARQ-ACK bits included in one or more uplink feedback resources; or a set composed of continuous or non-continuous HARQ-ACK bits included in one uplink feedback resource.

In an embodiment, one PUCCH resource set includes one of the following: a set composed of one or more PUCCH resources or a set composed of one or more PUCCH sets. Each PUCCH set is associated with one uplink control information (UCI) load range. An intersection between UCI load ranges associated with different PUCCH sets in one PUCCH resource set is empty.

In an embodiment, two communication nodes schedule PDSCHs for the same user equipment (UE) in the same BWP.

Figure 5:
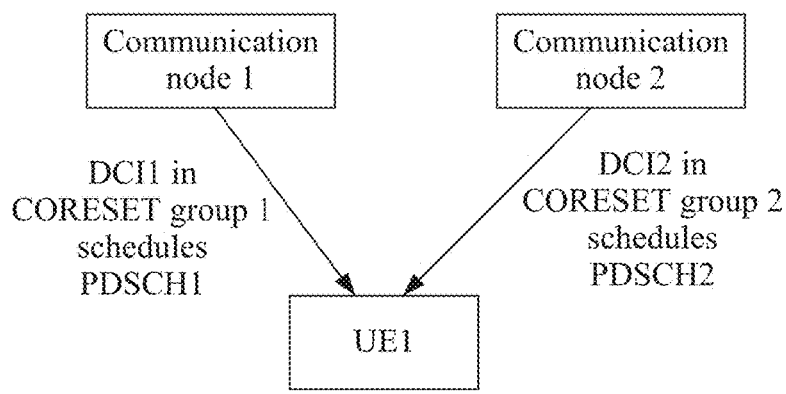
FIG. 5 is a diagram illustrating that two communication nodes schedule PDSCHs for the same terminal in the same bandwidth part through downlink assignment indexes in different control resource set groups according to an embodiment.

FIG. 5 is a diagram illustrating that two communication nodes schedule PDSCHs for the same terminal in the same bandwidth part through downlink assignment indexes in different control resource set groups according to an embodiment. As shown in FIG. 5, communication node 1 schedules PDSCH1 through DCI1, and communication node 2 schedules PDSCH2 through DCI2. In the absence of an ideal backhaul between the two communication nodes, the two communication nodes schedule PDSCH1 and PDSCH2 independently of each other. Resources occupied by PDSCH1 and PDSCH2 may or may not overlap. One HARQ-ACK codebook is constructed for a PDSCH sent by each communication node. Then the HARQ-ACK codebook is fed back to the each communication node. In this manner, interaction information between the two communication nodes is reduced.

In an embodiment, one communication node corresponds to different types of PDSCHs. HARQ-ACKs corresponding to different types of PDSCHs need to satisfy different features. HARQ-ACKs of the different types of PDSCHs are placed in different HARQ-ACK codebooks and then fed back to a serving node. For example, data carried by different types of PDSCHs need to satisfy different delay requirements. The delay requirement of PDSCH of type 1 is higher than that of PDSCH of type 2. The HARQ-ACK of the type of PDSCH with a higher delay requirement needs to be fed back to the serving node as soon as possible, and the HARQ-ACK needs to be fed back to a base station at a lower code rate. Therefore, the HARQ-ACKs of the two types of PDSCHs may be placed in different HARQ-ACK codebooks and fed back to the serving node. In addition to different delay requirements, other requirements may be different, or at least two requirements may be different. For example, information bits included in different types of PDSCHs belong to different sets, or modulation and coding schemes (MCSs) corresponding to different types of PDSCHs belong to different sets.

In an embodiment, there may be at most 4 PDSCHs in each type of subsequent PDSCH in FIG. 1, and each communication node in each type of candidate PDSCHs may schedule two PDSCHs, that is, PDSCH of type 1 and PDSCH of type 2. This scheduling manner is different from Rel-15. In Rel-15, a terminal desires to receive at most one PDSCH for each type of candidate PDSCHs in FIG. 1. This embodiment provides, in the case where HARQ-ACKs of the 4 PDSCHs are fed back in the same slot, a basis for how a terminal determines the HARQ-ACK codebook (that is, the HARQ-ACK bit set) where HARQ-ACK bits corresponding to the respective PDSCHs are located and how the terminal determines the uplink channel information of the respective HARQ-ACK codebooks.

In this embodiment, first-type information is introduced into a CORESET. Different first-type information may be used for distinguishing between different communication nodes. Different first-type information may also be used for distinguishing between different HARQ-ACK codebooks. Different HARQ-ACK codebooks are fed back to different communication nodes. Further, the second-type information is introduced to distinguish between at least one of the following: different types of PDSCHs, different HARQ-ACK codebooks, or a set of PUCCH resource sets (one set of PUCCH resources sets corresponds to a PUCCH set including the HARQ-ACK bits). Different combination values of (first-type information, second-type information) correspond to different HARQ-ACK codebooks. The same combination values of (first-type information, second-type information) correspond to the same HARQ-ACK codebooks. For example, PDSCH of type 1 under communication node 1 corresponds to HARQ-ACK codebook 11 (this HARQ-ACK codebook corresponds to that first-type information=0, second-type information=0), PDSCH of type 2 under communication node 1 corresponds to HARQ-ACK codebook 21 (this HARQ-ACK codebook corresponds to that first-type information=0, second-type information=1), PDSCH of type 1 under communication node 2 corresponds to HARQ-ACK codebook 12 (this HARQ-ACK codebook corresponds to that first-type information=1, second-type information=0), and PDSCH of type 2 under communication node 2 corresponds to HARQ-ACK codebook 22 (this HARQ-ACK codebook corresponds to that first-type information=1, second-type information=1).

In an embodiment, first-type information is configured in a CORESET, CORESETs corresponding to the same first-type information may be referred to as one CORESET group, and CORESETs corresponding to different first-type information belong to different CORESET groups. The first-type information may be explicitly configured in the CORESET, or different values of the first-type information may be indicated by whether the first-type information is enabled in the CORESET. For example, the configuration in which the first-type information is enabled in the CORESET indicates that the first-type information is 1, and the configuration in which the first-type information is disabled in the CORESET indicates that the first-type information is 0; or that the first-type information is configured in the CORESET indicates that the first-type information is 1, and that the first-type information is not configured in the CORESET indicates that the first-type information is 0.

The second-type information may be information about a control channel or the PDSCH information. Different values of the same type of information of a control channel correspond to different values of the second-type information, and/or different values of the same type of information of a data channel correspond to different values of the second-type information. For example, information of a control channel includes one or more of the following: a DCI format (for example, different DCI formats correspond to different second-type information values); a DCI size (for example, different DCI sizes correspond to different second-type information values); an RNTI (for example, different RNTIs correspond to different second-type information values); a search space ID of DCI; a CORESET ID of DCI (different CORESET IDs correspond to different second-type information values, or second-type information value=mod (CORESET ID, 2), where mod (x, y) denotes the remainder of a division of x by y); or information included in DCI (that is, the DCI explicitly includes a second-type information value, where this information value and other information in the DCI may be jointly encoded, or this information value may be a separate bit field). For example, the information about the PDSCH includes at least one of the following: the number of time domain symbols and/or slots occupied by the PDSCH (for example, a PDSCH of which the number of time domain symbols and/or slots is less than a predetermined value corresponds to one value in the second-type information, and a PDSCH of which the number of time domain symbols and/or slots is greater than or equal to the predetermined value corresponds to another value in the second-type information); the position of a time domain symbol occupied by the PDSCH; scrambling sequence generation parameter information of the PDSCH; demodulation reference signal information of the PDSCH; quasi co-location reference signal information corresponding to a demodulation reference signal of the PDSCH; or process number information of the PDSCH, for example, PDSCHs having different process number sets are of different types, that is, different process number sets correspond to different second-type information values.

Figure 6:
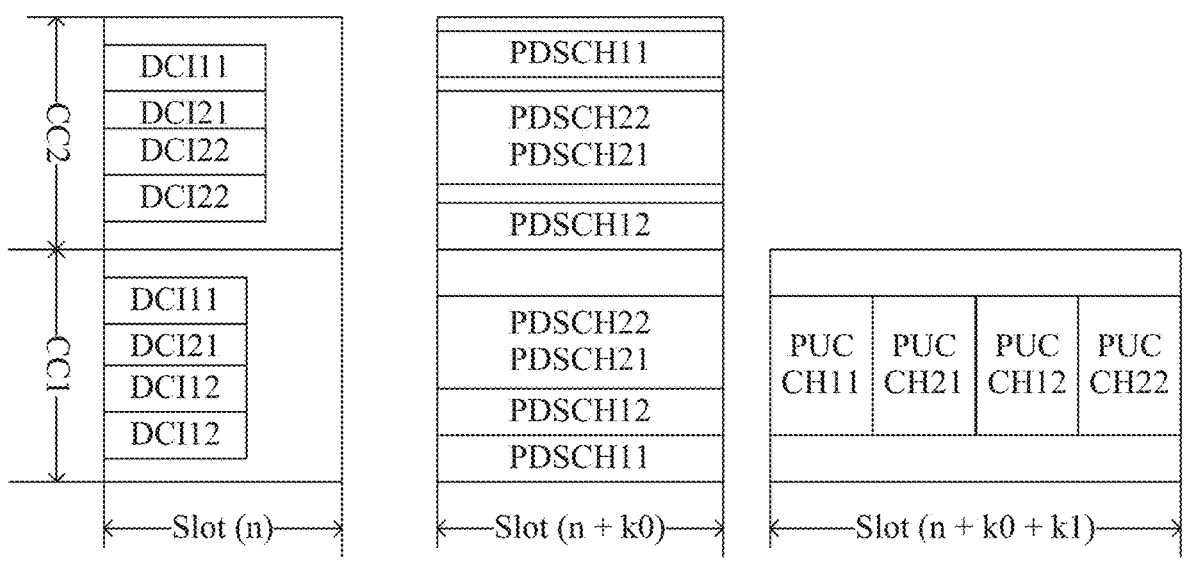
FIG. 6 is a diagram illustrating that PUCCH resources where HARQ-ACK information corresponding to PDSCHs whose HARQ-ACKs fall within the same time unit is located are acquired according to combination values according to an embodiment.

FIG. 6 is a diagram illustrating that PUCCH resources where HARQ-ACK information corresponding to PDSCHs whose HARQ-ACKs fall within the same time unit is located are acquired according to combination values according to an embodiment. In this embodiment, as shown in FIG. 6, DCI(i) in slot (n) schedules PDSCH(i). i belongs to {11, 21, 12, 22}. All HARQ-ACK information of PDSCH (i) needs to be fed back in slot (n+k0+k1) but needs to be fed back in different PUCCHs. That is, HARQ-ACK information of different types of PDSCHs sent by different communication nodes needs to be fed back in different PUCCHs. In this embodiment, which PDSCH's HARQ-ACK information should be fed back in which PUCCH is determined according to first-type information and second-type information.

In FIG. 6, different PDSCHs correspond to different combination values of (first-type information, second-type information). For example, (first-type information, second-type information) corresponding to PDSCH (i)=mod(i, 10)−1, floor(i/10)−1. First-type information corresponding to PDSCH (i) may be acquired according to first-type information configured in a CORESET containing DCI(i) scheduling PDSCH(i). The second-type information corresponding to PDSCH(i) is acquired in one or more of the following manners: The second-type information corresponding to PDSCH(i) is acquired according to at least one of the DCI format, the RNTI or the DCI size of DCI(i) scheduling PDSCH(i); the second-type information corresponding to PDSCH(i) is acquired according to at least one of the search space ID or the CORESET ID of DCI(i); or the second-type information corresponding to PDSCH(i) is acquired according to information about PDSCH(i). The information about the PDSCH(i) includes at least one of the following: the number of time domain symbols and/or slots occupied by the PDSCH(i); scrambling sequence generation parameter information of the PDSCH(i); demodulation reference signal information of the PDSCH(i); quasi co-location reference signal information corresponding to a demodulation reference signal of the PDSCH(i); process number information of the PDSCH; or the position of a time domain symbol occupied by the PDSCH(i). For example, the value of the second-type information corresponding to PDSCH(i) is acquired according to the time domain symbol set containing the start position symbol of PDSCH(i), where different time domain symbol sets correspond to different second-type information values. After (first-type information, second-type information) corresponding to PDSCH(i) is acquired, HARQ-ACK information of PDSCHs(i) corresponding to the same combination value of (first-type information, second-type information) is included in the HARQ-ACK codebook corresponding to this combination value of (first-type information, second-type information), HARQ-ACK information of PDSCHs(i) corresponding to different combination values of (first-type information, second-type information) is included in different HARQ-ACK codebooks, and different HARQ-ACK codebooks are fed back in different PUCCH resources. HARQ-ACK information of PDSCHs(i) corresponding to the same combination value of (first-type information, second-type information) is included in the same HARQ-ACK codebook. In PDCCHs scheduling the PDSCHs corresponding to the same combination value of (first-type information, second-type information), HARQ-ACK information scheduling the PDSCHs needs to be fed back in the same time unit, for example, the same slot, the same subslot or the same subframe. For example, all HARQ-ACK information of PDSCH(i) needs to be fed back in slot (n+k0+k1)

As shown in FIG. 6, HARQ-ACK information of PDSCHs corresponding to the same combination value of (first-type information, second-type information) in different CCs needs to be included in one HARQ-ACK codebook. In an embodiment, one HARQ-ACK codebook in slot (n+k0+k1) may include HARQ-ACK information corresponding to PDSCHs in multiple slots. HARQ-ACK information included in one HARQ-ACK codebook may correspond to multiple PDSCHs. The multiple PDSCHs may belong to different slots, different CCs, but the multiple PDSCHs correspond to the same combination value of (first-type information, second-type information). In the case where the PDSCHs have corresponding PDCCHs, PDCCHs corresponding to the PDSCHs indicate that feedback resources where HARQ-ACK information of the PDSCHs are located fall within the same time unit. In the case where two PDSCHs correspond to the same combination value of (first-type information, second-type information), but PDCCHs scheduling the two PDSCHs indicate that HARQ-ACK feedback resources of the two PDSCHs are in different time units, then HARQ-ACK bits of the two PDSCHs do not need to be included in the same HARQ-ACK codebook.

For example, one PUCCH in slot (n+k0+k1) includes HARQ-ACK information of PDSCHs in multiple slots. For example, the HARQ-ACK codebook in slot (n+k0+k1) includes HARQ-ACK information of PDSCHs in {slot (n+k0), slot (n1+k01), slot (n2+k02), slot (n3+k03)}. In this case, PDCCHs scheduling the PDSCHs indicate that HARQ-ACK information of the PDSCHs needs to be fed back in the same time unit slot (n+k0+k1). In FIG. 6, a PDCCH scheduling a PDSCH is in the same CC as the PDSCH. In this embodiment, a PDCCH scheduling a PDSCH may also be in a different CC than the PDSCH. In an embodiment, for a semi-static codebook, the method of classifying candidate PDSCHs in FIG. 1 may be used. In FIG. 6, PDSCHs(i) in one CC belong to the same type of candidate PDSCHs, where i belongs to {11, 21, 12, 22}.

In an embodiment, in the case where HARQ-ACKs of multiple PDSCHs need to be fed back in the same time unit, the HARQ-ACK codebook and PUCCH resource where the multiple PDSCHs are located are determined according to combination values of (first-type information, second-type information) corresponding to the multiple PDSCHs. If two PDSCHs correspond to the same first-type information but different second-type information, HARQ-ACKs of the two PDSCHs need to be included in different HARQ-ACK codebooks and/or different PUCCH resources. Alternatively, if the two PDSCHs correspond to the same second-type information but different first-type information, HARQ-ACKs of the two PDSCHs need to be included in different HARQ-ACK codebooks and/or different PUCCH resources. In this embodiment, HARQ-ACKs of PDSCHs are in the same HARQ-ACK codebook and/or the same PUCCH resource, where the PDSCHs have the same combination value of (first-type information, second-type information, time unit), and HARQ-ACKs of PDSCHs that are different in at least one type of first-type information, second-type information or time unit are in different HARQ-ACK codebooks and/or different PUCCH resources.

Figure 7:
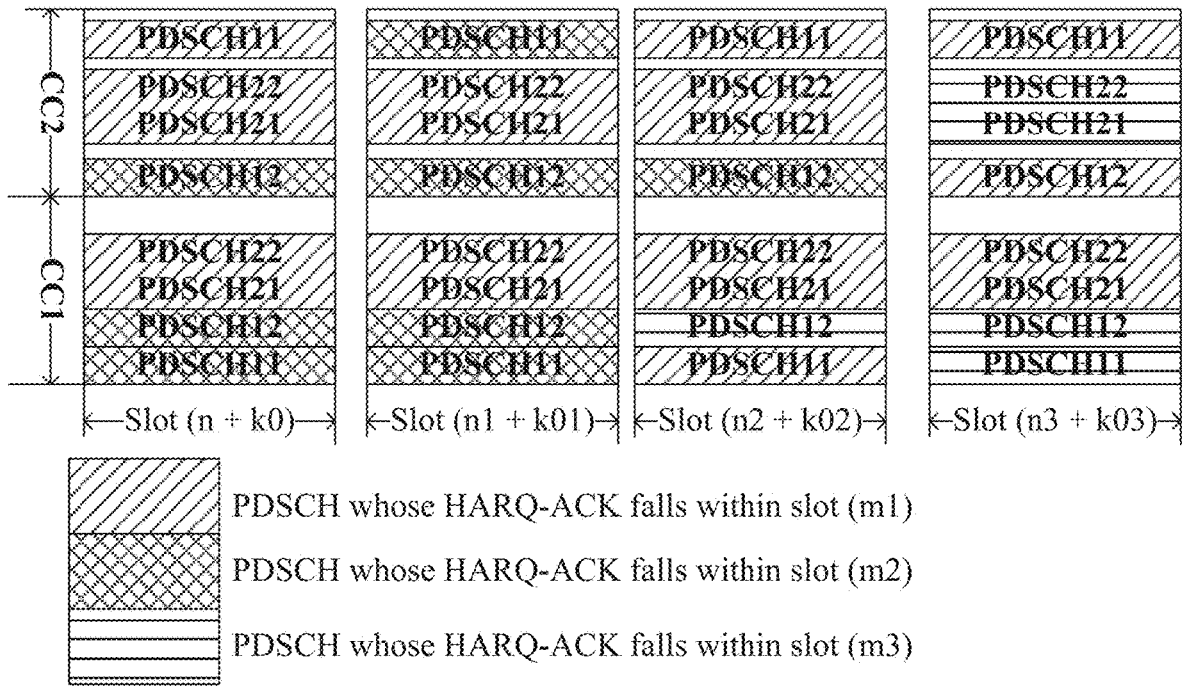
FIG. 7 is a diagram illustrating that HARQ-ACKs of PDSCHs having the same combination value but having HARQ-ACKs that fall within different slots are not included in the same HARQ-ACK codebook or the same PUCCH resource according to an embodiment.

FIG. 7 is a diagram illustrating that HARQ-ACKs of PDSCHs having the same combination value but having HARQ-ACKs that fall within different slots are not included in the same HARQ-ACK codebook or the same PUCCH resource according to an embodiment. As shown in FIG. 7, according first-type information and the second-type information corresponding to the each PDSCH, at least one of the following information corresponding to HARQ-ACK information of each PDSCH of PDSCHs whose HARQ-ACKs fall within the same slot is determined: a HARQ-ACK codebook containing the HARQ-ACK information; or a PUCCH or PUSCH resource where the HARQ-ACK information is located. In FIG. 7, HARQ-ACKs of PDSCHs whose HARQ-ACKs fall within different slots are not included in the same HARQ-ACK codebook even if the PDSCHs are the same in terms of both first-type information and second-type information.

Figure 8:
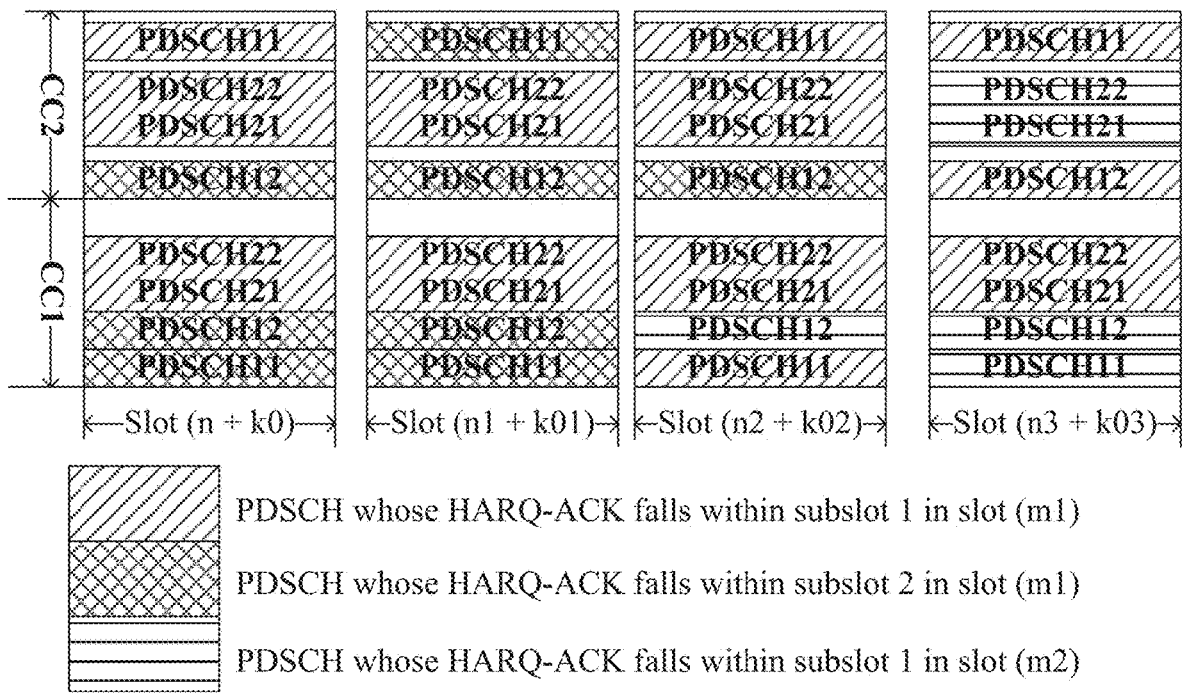
FIG. 8 is a diagram illustrating that HARQ-ACKs of PDSCHs having the same combination value but having HARQ-ACKs that fall within different subslots are not included in the same HARQ-ACK codebook or the same PUCCH resource according to an embodiment.

FIG. 8 is a diagram illustrating that HARQ-ACKs of PDSCHs having the same combination value but having HARQ-ACKs that fall within different subslots are not included in the same HARQ-ACK codebook or the same PUCCH resource according to an embodiment. As shown in FIG. 8, the HARQ-ACK codebook and PUCCH/PUSCH resource where HARQ-ACK information of each PDSCH of PDSCHs whose HARQ-ACKs fall within the same subslot is located are determined according to first-type information and second-type information corresponding to the each PDSCH. In FIG. 8, HARQ-ACKs of PDSCHs whose HARQ-ACKs fall within different subslots are not included in the same HARQ-ACK codebook even if the PDSCHs are the same in terms of both first-type information and second-type information.

In FIGS. 7 and 8, PDSCHs in different shadows are in different HARQ-ACK codebooks or different PUCCHs, and the HARQ-ACK codebook and/or PUCCH resource where HARQ-ACK information of each PDSCH of PDSCHs in the same shadow is determined according to whether the PDSCHs correspond to the same combination value of (first information, second information).

In the preceding embodiment, in the process of acquiring a semi-static HARQ-ACK codebook, it is assumed that a terminal can receive at most 4 actually scheduled PDSCHs in each type of candidate PDSCHs of FIG. 1. In another embodiment, although the maximum number of PDSCHs actually received by the terminal in each type of candidate PDSCHs is less than 4, the 4 HARQ-ACK codebooks (corresponding to 4 combination values of (first-type information, second-type information)) each includes HARQ-ACK information of a PDSCH in each type of candidate PDSCHs, or only a specified codebook among the preceding 4 codebooks includes HARQ-ACK bits in one type of candidate PDSCHs.

For example, in FIG. 1, in the case where the terminal needs to feed back 4 HARQ-ACK codebooks in the time unit of slot (n+k0+k1), but the terminal receives only PDSCH11 and PDSCH12 in one type of candidate PDSCHs, then ARQ-ACK codebook 11 includes HARQ-ACK information of PDSCH11, HARQ-ACK codebook 12 includes HARQ-ACK information of PDSCH12, and each of HARQ-ACK codebook 21 and HARQ-ACK codebook 22 includes default HARQ-ACK information, for example, NACK information, of the one type of candidate PDSCHs; or each of HARQ-ACK codebook 11 and HARQ-ACK codebook 21 includes HARQ-ACK information of PDSCH11, and each of HARQ-ACK codebook 12 and HARQ-ACK codebook 22 includes HARQ-ACK information of PDSCH12. For example, each of HARQ-ACK codebook 12 and HARQ-ACK codebook 22 includes no HARQ-ACK information of the one type of candidate PDSCHs, that is, also includes no default information; and only HARQ-ACK codebook 11 includes HARQ-ACK information of PDSCH11, and only HARQ-ACK codebook 12 includes HARQ-ACK information of PDSCH12.

In an embodiment, in the case where the terminal receive no PDSCH corresponding to a first combination value of (first-type information, second-type information) in one type of candidate PDSCHs, for example, PDSCH22, then whether HARQ-ACK codebook 22 includes HARQ-ACK information of the one type of candidate PDSCHs may be determined according to a first predetermined rule. The first predetermined rule includes determining, according to a first parameter, the inclusion state of whether the HARQ-ACK bit set corresponding to the first combination value includes the HARQ-ACK information corresponding to the one type of candidate PDSCHs. The first parameter includes at least one of the following: the number of HARQ-ACK bit sets included in one time unit; the number of HARQ-ACK bit sets included in one feedback resource; a relationship between the first combination value and a combination value of the N types of information corresponding to a received PDSCH in the one type of candidate PDSCHs; or the number of received PDSCHs in the one type of candidate PDSCHs. The state of whether the HARQ-ACK bit set corresponding to the first combination value of the N types of information includes the HARQ-ACK information corresponding to the one type of candidate PDSCHs includes at least one of the following: the HARQ-ACK bit set corresponding to the first combination value includes default HARQ-ACK information of the one type of candidate PDSCHs; the HARQ-ACK bit set corresponding to the first combination value does not include default HARQ-ACK information of the one type of candidate PDSCHs; or the HARQ-ACK bit set corresponding to the first combination value includes HARQ-ACK information of another PDSCH of the one type of candidate PDSCHs, where a combination value of the N types of information corresponding to the another PDSCH is different from the first combination value.

In an embodiment, the inclusion state may be determined in one of the manners below.

Mode one: If the number of HARQ-ACK codebooks included in the time unit where HARQ-ACK codebook 22 is located is greater than 1, HARQ-ACK codebook 22 does not include default HARQ-ACK information for the one type of candidate PDSCHs; otherwise, HARQ-ACK codebook 22 includes default HARQ-ACK information of the one type of candidate PDSCHs.

Mode two: If the number of HARQ-ACK codebooks included in the PUCCH resource where HARQ-ACK codebook 22 is located is greater than 1, HARQ-ACK codebook 22 does not include default HARQ-ACK information for the one type of candidate PDSCHs, where one PUCCH feedback resource may include multiple HARQ-ACK codebooks; otherwise, HARQ-ACK codebook 22 includes default HARQ-ACK information of the one type of candidate PDSCHs.

Mode three: If a PDSCH corresponding to a second combination value is received in the one type of candidate PDSCHs, such as PDSCH12, each of HARQ-ACK codebook 12 and PDSCH codebook 22 includes HARQ-ACK information of PDSCH12, where a correspondence is predefined between the second combination value 12 and the first combination value 22; if PDSCH11 is received, but PDSCH12 is not received, HARQ-ACK codebook 22 includes default HARQ-ACK information for the one type of candidate PDSCHs; or if PDSCH11 is received, but PDSCH12 is not received, HARQ-ACK codebook 22 does not include default HARQ-ACK information for the one type of candidate PDSCHs.

Mode four: If the number of PDSCHs received in the one type of candidate PDSCHs is greater than a predetermined value (for example, 2), the HARQ-ACK codebook corresponding to the first combination value does not include default HARQ-ACK information for the one type of candidate PDSCHs; otherwise, the HARQ-ACK codebook corresponding to the first combination value includes the default value.

In an embodiment, in the case where the number of PDSCHs received by a terminal in one type of candidate PDSCHs is 0, that is, no PDSCH is received, then each of the 4 HARQ-ACK codebooks includes default HARQ-ACK information for the one type of candidate PDSCHs. In another embodiment, only a PDSCH having a predetermined index among the 4 HARQ-ACK codebooks includes HARQ-ACK information of the one type of candidate PDSCHs. For example, only HARQ-ACK codebook 11 includes the default value, or only HARQ-ACK codebook 11 and HARQ-ACK codebook 12 include the default value.

In an embodiment, that HARQ-ACK information of one PDSCH falls within one subslot (or one slot) indicates that a PUCCH/PUSCH where the HARQ-ACK information is located falls within one subslot (or slot), or the start time domain symbol of the PUCCH/PUSCH where the HARQ-ACK is located falls within one subslot (or slot). In this case, one PUCCH/PUSCH may occupy resources in one or more subslots (or one or more slots).

In FIGS. 7 and 8, {slot (n+k0), slot (n1+k01), slot (n2+k02), slot (n3+k03)} increase progressively in the time domain. That is, slot (n1+k01) is later than slot (n+k0), slot (n2+k02) is later than slot (n1+k01), and so on. Where a PDSCH in slot (nj+k0j) is scheduled by a PDCCH in slot (nj), where j belongs to {1, 2, 3}. FIGS. 7 and 8 show, by way of example, that all slots are the same in terms of distribution of resources occupied by PDSCHs. In practice, slots are generally different in terms of distribution of resources occupied by PDSCHs. FIGS. 7 and 8 also show, by way of example, distribution of frequency domain resources occupied by PDSCHs. In practice, frequency domain resources occupied by PDSCHs may be distributed in other manners.

FIG. 9 is a diagram illustrating separate calculations of DAI information corresponding to different combination values according to an embodiment. In this embodiment, as shown in FIG. 9, PDSCHi-(C-DAI, T-DAI) indicates the value of (C-DAI, T-DAI) included in the PDCCH scheduling PDSCH(i). DAIs corresponding to dynamic HARQ-ACK codebooks corresponding to different (first-type information, second-type information) are counted separately. DAI indicates information about the number of PDSCHs having the same combination value of (first-type information, second-type information). C-DAI (that is, the first two bits of the DAI indication field) information in the DAI in a PDCCH scheduling a PDSCH (or a PDCCH releasing an SPS PDSCH) indicates the number of PDCCHs having the same combination value of (first-type information, second-type information) until (PDCCH monitoring occasion, serving cell) corresponding to the PDSCH, that is, the accumulative number of PDSCHs that are scheduled by a serving cell and that have the same combination value of (first-type information, second-type information). The PDCCH includes at least one of a PDCCH scheduling a PDSCH or a PDCCH releasing an SPS PDSCH. T-DAI (that is, the last two bits of the DAI indication field) information in the DAI in a PDCCH scheduling a PDSCH (or a PDCCH releasing an SPS PDSCH) indicates the number of PDSCHs having the same combination value of (first-type information, second-type information) until the monitoring occasion where the PDCCH is located, that is, the total number of PDSCHs that are scheduled by a serving cell and that have the same combination value of (first-type information, second-type information).

In this embodiment, the C-DAI varies with (PDCCH monitoring occasion, serving cell) in one PDCCH monitoring occasion, the T-DAI varies with the PDCCH monitoring occasion, and PDSCHs having the same (first-type information, second-type information) in the same PDCCH monitoring occasion correspond to the same T-DAI. The serving cell in (PDCCH monitoring occasion, serving cell) corresponding to the one PDCCH is acquired in the following manner: the serving cell where the PDCCH is located or the serving cell where the PDSCH scheduled by the PDCCH is located. In this case, a PDCCH corresponding to a PDSCH in CC1 and a PDCCH corresponding to a PDSCH in CC2 may be located in the same PDCCH monitoring occasion in CC1. The latter acquisition manner has a higher flexibility. HARQ-ACKs of the preceding PDSCHs fall within the same time unit. In FIG. 9, DAIs of PDSCHs corresponding to different combination values of (first-type information, second-type information) are counted separately.

In another embodiment, as shown in FIG. 10, DAIs of PDSCHs corresponding to the different combination values are counted in a uniform manner. In this embodiment, it is specified that when calculating a dynamic codebook, the values of DAIs of PDSCHs corresponding to different combination values of (first-type information, second-type information) are sequentially processed by a terminal in ascending order of first-type information indexes and in descending order of second-type information indexes. FIG. 10 illustrates an example in which DAIs are sequentially processed first in ascending order of second-type information and then in descending order of first-type information. Alternatively, in the case where DAIs are counted in a uniform manner, for PDSCHs having the same monitoring occasion, having HARQ-ACK falling within the same time unit and corresponding to PDSCHs in the same CC, the arrangement sequence of HARQ-ACKs of the PDSCHs in a HARQ-ACK codebook is obtained according to C-DAIs. That is, the processing sequence of DAIs in PDCCHs corresponding to PDSCHs having the same combination value of (PDCCH monitoring occasion, time unit where HARQ-ACK is located, CC where PDSCH is located) needs to be prespecified. In this case, PDCCHs corresponding to the same combination value of {c, m} need to be sequentially processed in ascending order of first-type information and in descending order of second-type information.

Figure 11:
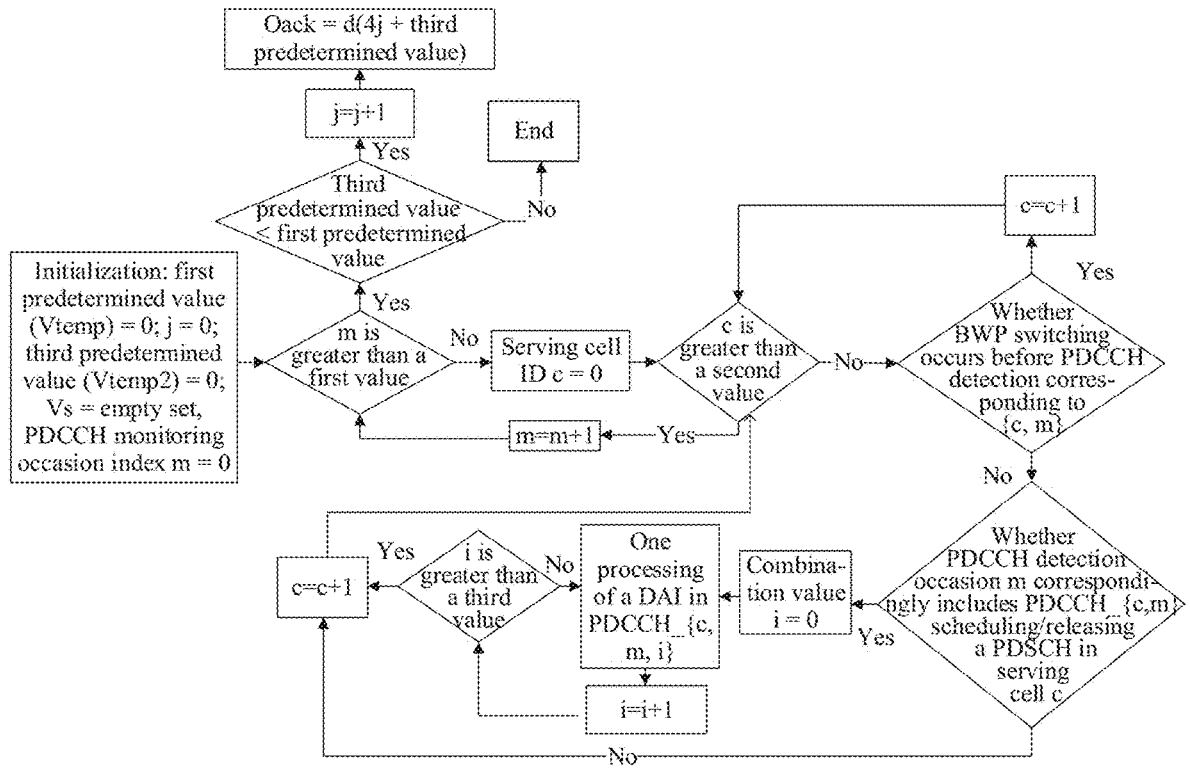
FIG. 11 is a diagram illustrating that in the case where multiple PDCCHs scheduling PDSCHs in the same serving cell exist in one PDCCH monitoring occasion, DAI is processed according to a combination value index of the N types of information according to an embodiment.

FIG. 11 is a diagram illustrating that in the case where multiple PDCCHs scheduling PDSCHs in the same serving cell exist in one PDCCH monitoring occasion, DAI is processed according to a combination value index of the N types of information according to an embodiment. As shown in FIG. 11, PDCCH_(c, m, i) indicates a PDCCH whose combination value of {first-type information, second-type information} is i, whose scheduled PDSCH is in serving cell c (or whose released SPS PDSCH is in serving cell c) and which is located in PDCCH monitoring occasion m. The increase of combination value indexes in the figure may be first progressive increase of first-type information and then progressive increase of second-type information. In FIG. 11, the third value is the maximum value of the number of combination values of {first-type information, second-type information}, for example, 4. However, if a terminal detects no PDCCH corresponding to i, skipping is performed; and then the DAI in PDCCH corresponding to i+1 is processed.

In an embodiment, in the case where DAIs of PDSCHs corresponding to different (first-type information, second-type information) are counted separately, a PUCCH resource where a HARQ-ACK codebook corresponding to each (first-type information, second-type information) is located is determined by the last PDCCH of PDCCHs corresponding to multiple PDSCHs corresponding to the HARQ-ACK codebook. Indexes of the PDCCHs first increase progressively in one PDCCH monitoring occasion according to serving cells where the PDSCHs are located and then increase progressively according to PDCCH monitoring occasions.

In an embodiment, if DAIs of PDSCHs corresponding to different (first-type information, second-type information) are counted in a uniform manner, and in one PDCCH monitoring occasion, for one CC, only one piece of DCI schedules PDSCHs in this CC, then in this CC, PDSCHs corresponding to different (first-type information, second-type information) are in different PDCCH monitoring occasions, and a PUCCH resource where one HARQ-ACK codebook is located is determined by the last PDCCH of multiple corresponding PDCCHs in the HARQ-ACK codebook. Indexes of the PDCCHs first increase progressively in one PDCCH monitoring occasion according to serving cells where the PDSCHs are located and then increase progressively according to PDCCH monitoring occasions.

In an embodiment, if DAIs of PDSCHs corresponding to different (first-type information, second-type information) are counted in a uniform manner, and in one PDCCH monitoring occasion, for one CC, more than one piece of DCI schedules PDSCHs in this CC, where the PDSCHs scheduled by the more than one piece of DCI correspond to different combination values of (first-type information, second-type information), then a PUCCH resource where one HARQ-ACK codebook is located is determined by the last PDCCH of multiple corresponding PDCCHs in the HARQ-ACK codebook. In this case, at least one of the first-type information or the second-type information needs to be introduced in the calculation of indexes of the PDCCHs. For example, indexes of the PDCCHs first increase progressively in one PDCCH monitoring occasion according to the first-type information of the PDSCHs, then increase progressively according to the second-type information, then increase progressively according to serving cells where the PDSCHs are located, and then increase progressively according to PDCCH monitoring occasions.

In an embodiment, in the case where a dynamic HARQ-ACK is enabled, in one PDCCH monitoring occasion, a terminal receives at most one PDCCH in the same type of PDCCH. When the terminal receives more than one PDCCH that schedules PDSCHs in one PDCCH monitoring occasion, among the more than one PDCCH, different PDCCHs are different in terms of at least one piece of information in a first-type information set. The same type of PDSCH or the same type of PDCCH corresponds to the same information in a first-type information set. Different types of PDSCHs or different types of PDCCHs are different in terms of at least one type of information in a first-type information set. In this embodiment, the maximum number of PDCCHs received by a terminal in one PDCCH monitoring occasion and scheduling PDSCHs having HARQ-ACKs that fall within the same time unit is the number A of different combination values of information in the first-type information set. For example, the first-type information set includes (information 1, information 2), there are 4 possible values of information 1, there are 3 possible values of information 2, and the values of information 1 and the values of information 2 can be combined arbitrarily, then the number A of different combination values of information in the first-type information set is 4*3=12. In one PDCCH monitoring occasion, the total number A of PDCCHs scheduling PDSCHs received by the terminal and HARQ-ACKs of these PDSCHs are fed back in the same time unit.

In an embodiment, the first-type information set includes the following information: (first-type information, second-type information, a time unit where a HARQ-ACK of a PDSCH is located, a CC where a PDSCH is located). That is, the maximum number of PDCCHs received by a terminal in one PDCCH monitoring occasion and scheduling PDSCHs having HARQ-ACKs that fall within the same time unit is N_CC*4. N_CC indicates the number of CCs and the number of combination values of the first-type information and the second-type information is 4. The total number A of PDCCHs scheduling PDSCHs received by the terminal may exceed N_CC*4. For example, HARQ-ACKs of these PDSCHs are fed back in different time units.

Figure 12:
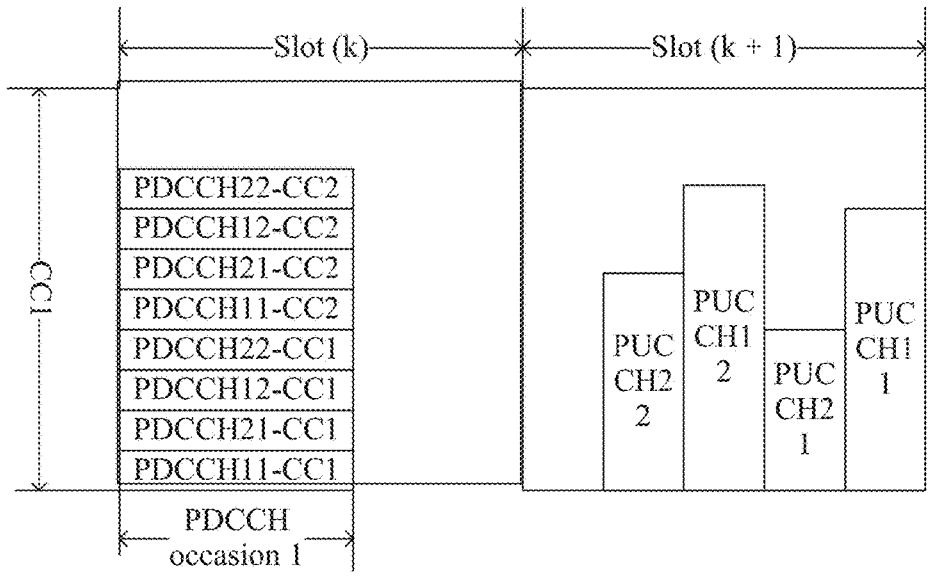
FIG. 12 is a diagram illustrating that the maximum number of PDCCHs received by a terminal in one PDCCH monitoring occasion and scheduling PDSCHs having HARQ-ACKs that fall within the same time unit is directly proportional to the product of the number of carrier components and the number of HARQ-ACK codebooks according to an embodiment.

FIG. 12 is a diagram illustrating that the maximum number of PDCCHs received by a terminal in one PDCCH monitoring occasion and scheduling PDSCHs having HARQ-ACKs that fall within the same time unit is directly proportional to the product of the number of carrier components and the number of HARQ-ACK codebooks according to an embodiment. As shown in FIG. 12, the terminal needs to feed back HARQ-ACK codebooks corresponding to (first-type information=mod(i, 10)−1, second-type information=floor(i/10)−1) in PUCCH (i) in slot (k+1). As shown in FIG. 12, HARQ-ACK information falls into multiple PDCCHs corresponding to multiple PDSCHs of slot (k+1). The number of PDCCHs belonging to PDCCH monitoring occasion 1 in slot (k) is N_CC*4 at most. In FIG. 12, the number of N_CCs is 2, such as CC1 and CC2. A PDCCH is present in only one of the two CCs. In this embodiment, a PDCCH may be present in each CC in one PDCCH occasion. In FIG. 12, the maximum number of PDCCHs received by a terminal in one PDCCH monitoring occasion and scheduling PDSCHs having HARQ-ACKs that fall within the same time unit is directly proportional to the product of the number of carrier components and the number of HARQ-ACK codebooks corresponding to different values of (first-type information, second-type information).

In an embodiment, the first-type information set includes the following information: a time unit where a HARQ-ACK corresponding to a PDSCH is located and a CC where the PDSCH is located. In this manner, the maximum number of PDCCHs received by a terminal in one PDCCH monitoring occasion and scheduling PDSCHs having HARQ-ACKs that fall within the same time unit is directly proportional to the number of CCs. PDCCHs having HARQ-ACKs that fall within the same time unit, having different combination values of (first-type information, second-type information) and belonging to the same CC can only be located in different PDCCH monitoring occasions.

Figure 13:
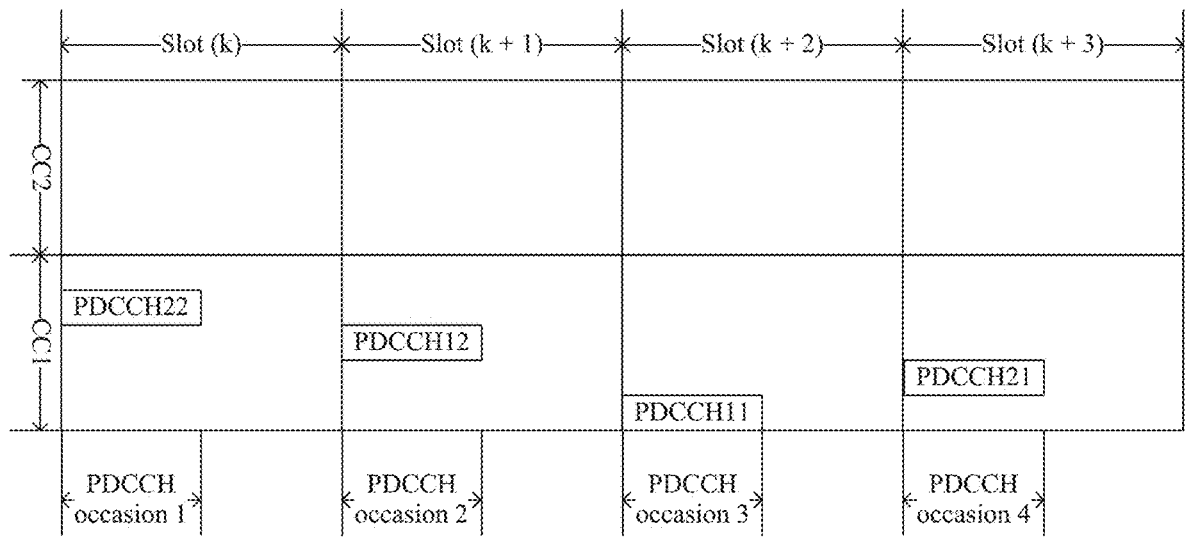
FIG. 13 is a diagram illustrating that PDCCHs corresponding to PDSCHs having HARQ-ACKs that fall within the same time unit, having different combination values and belonging to the same carrier component are located in different PDCCH monitoring occasions according to an embodiment.

FIG. 13 is a diagram illustrating that PDCCHs corresponding to PDSCHs having HARQ-ACKs that fall within the same time unit, having different combination values and belonging to the same carrier component are located in different PDCCH monitoring occasions according to an embodiment. As shown in FIG. 13, HARQ-ACKs of PDSCHs(i) scheduled by PDCCHs(i) need to be fed back in the same time unit, so the PDCCHs(i) are located in different PDCCH occasions.

Figure 14:
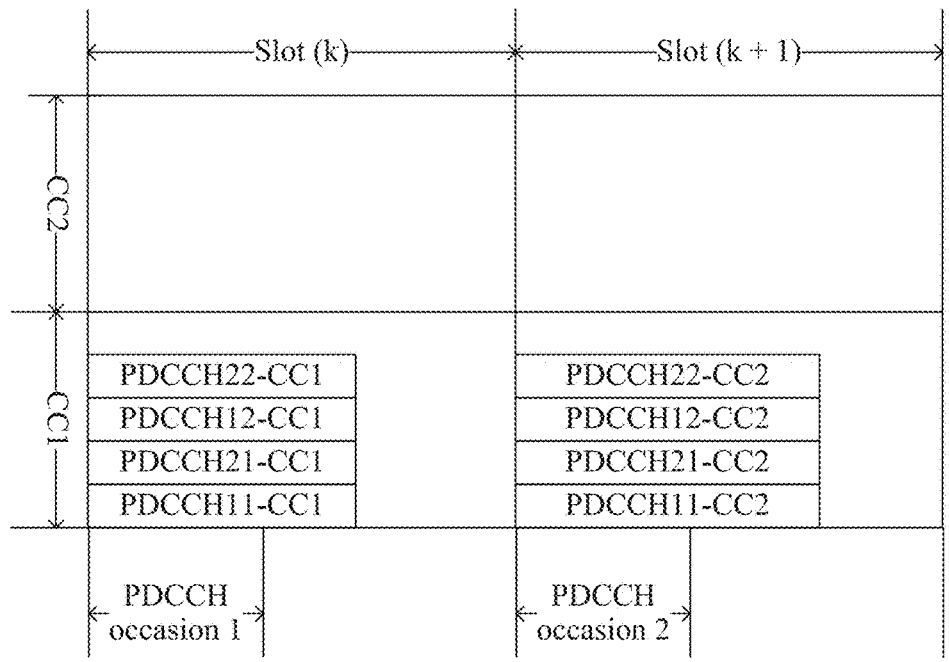
FIG. 14 is a diagram illustrating that PDCCHs corresponding to PDSCHs having HARQ-ACKs that fall within the same time unit and belonging to different CCs are located in different PDCCH monitoring occasions of CC1 according to an embodiment.

FIG. 14 is a diagram illustrating that PDCCHs corresponding to PDSCHs having HARQ-ACKs that fall within the same time unit and belonging to different CCs are located in different PDCCH monitoring occasions of CC1 according to an embodiment. As shown in FIG. 14, PDSCH (i)-CC(j) indicates PDCCH(i) scheduling a PDSCH in CC(j).

In an embodiment, the first-type information set includes the following information: first-type information, second-type information, a time unit where a HARQ-ACK corresponding to a PDSCH is located and a CC where the PDSCH is located. In this manner, the maximum number of PDCCHs received by a terminal in one PDCCH monitoring occasion and scheduling PDSCHs having HARQ-ACKs that fall within the same time unit is directly proportional to the product of the number of CCs configured with PDCCHs and the number of HARQ-ACK codebooks. PDSCHs having HARQ-ACKs that fall within the same time unit, scheduled by PDCCHs in the same CC and belonging to different CCs can only be located in different PDCCH monitoring occasions. As shown in FIG. 14, in the case where a PDCCH in CC1 can schedule both a PDSCH in CC1 and a PDSCH in CC2 and no PDCCH is present in CC2, then the maximum number of PDCCHs belonging to CC1, received by a terminal in one PDCCH monitoring occasion, and scheduling PDSCHs having HARQ-ACKs that fall within the same time unit is 4. PDCCHs corresponding to PDSCHs having HARQ-ACKs that fall within the same time unit and belonging to different CCs of CC1 and CC2 can only be located in different PDCCH monitoring occasions in CC1.

In an embodiment, the first-type information set includes the following information: a time unit where a HARQ-ACK corresponding to a PDSCH is located and a CC where the PDSCH is located. In this manner, the maximum number of PDCCHs received by a terminal in one PDCCH monitoring occasion and scheduling PDSCHs having HARQ-ACKs that fall within the same time unit is directly proportional to the number of CCs configured with PDCCHs. PDSCHs having HARQ-ACKs that fall within the same time unit, scheduled by PDCCHs in the same CC and belonging to different CCs can only be located in different PDCCH monitoring occasions. In addition, PDCCHs corresponding to PDSCHs having HARQ-ACKs that fall within the same time unit, belonging to the same CC and corresponding to different (first-type information, second-type information) can only be located in different PDCCH monitoring occasions.

In an embodiment, the number of HARQ-ACK codebooks is determined according to at least one of the number of possible values of the first-type information or the number of possible values of the second-type information. For example, the number of HARQ-ACK codebooks is equal to the number of possible values of the first-type information*the number of possible values of the second-type information. In another embodiment, the number of HARQ-ACK codebooks is equal to the maximum number of combination values of (first-type information, second-type information). Alternatively, the number of HARQ-ACK codebooks is equal to max (the number of possible values of the first-type information, the number of possible values of the second-type information). The number of HARQ-ACK codebooks may be acquired according to other parameters in other manners. In this embodiment, the multiple HARQ-ACK codebooks are fed back in the same time unit or in different time units. In the preceding embodiments, PDSCHi is PDSCH(i), and PDCCHi is PDCCH(i), where i belongs to $\{11, 21, 12, 22\}$.

In an embodiment, HARQ-ACKs of PDSCHs having HARQ-ACKs that fall within the same time unit and corresponding to different (first-type information, second-type information) are placed in different HARQ-ACK codebooks. Different HARQ-ACK codebooks are fed back in different PUCCH resources. The different PUCCH resources including the different HARQ-ACK codebooks may be in the mode of time-division multiplexing. In this case, the number of PUCCH resources including HARQ-ACKs in one time unit is relatively large.

In an embodiment, HARQ-ACKs of PDSCHs corresponding to combination values of different (first-type information, second-type information) are combined in one HARQ-ACK codebook before being fed back. For example, each (first-type information, second-type information) corresponds to one sub-HARQ-ACK codebook, that is, one HARQ-ACK bit set or one HARQ-ACK bit sequence. The arrangement sequence of sub-HARQ-ACK codebooks corresponding to different combination values of (first-type information, second-type information) in one HARQ-ACK codebook (that is, the HARQ-ACK bit set or the one HARQ-ACK bit sequence) is determined according to signaling information and/or an agreed rule.

In an embodiment, the arrangement sequence of sub-HARQ-ACK codebooks corresponding to different (first-type information, second-type information) in one HARQ-ACK codebook is determined according to first a progressive increase of the first-type information and then a progressive increase of the second-type information. For example, one HARQ-ACK codebook needs to include 4 sub-HARQ-ACK codebooks corresponding to combination values of (first-type information, second-type information). The arrangement sequence of the 4 sub-HARQ-ACK codebooks in the HARQ-ACK codebook is [sub-HARQ-ACK codebook corresponding to (first-type information=0, second-type information=0), sub-HARQ-ACK codebook corresponding to (first-type information=1, second-type information=0), sub-HARQ-ACK codebook corresponding to (first-type information=0, second-type information=1), sub-HARQ-ACK codebook corresponding to (first-type information=1, second-type information=1)].

In an embodiment, the arrangement sequence is determined according to first a progressive increase of the first-type information and then a progressive increase of the second-type information. For example, one HARQ-ACK codebook needs to include 4 sub-HARQ-ACK codebooks corresponding to combination values of (first-type information, second-type information). The arrangement sequence of the 4 sub-HARQ-ACK codebooks in the HARQ-ACK codebook is [sub-HARQ-ACK codebook corresponding to (first-type information=0, second-type information=0), sub-HARQ-ACK codebook corresponding to (first-type information=0, second-type information=1), sub-HARQ-ACK codebook corresponding to (first-type information=1, second-type information=0), sub-HARQ-ACK codebook corresponding to (first-type information=1, second-type information=1)].

In an embodiment, one PUCCH resource/PUSCH resource includes HARQ-ACK information of PDSCHs corresponding to different combination values of (first-type information, second-type information), each combination value of (first-type information, second-type information) corresponds to one sub-HARQ-ACK codebook, and one HARQ-ACK codebook/one PUCCH resource/PUSCH resource includes multiple sub-HARQ-ACK codebooks.

In an embodiment, one PUCCH resource/PUSCH resource includes HARQ-ACK information of PDSCHs corresponding to different combination values of (first-type information, second-type information), each combination value of (first-type information, second-type information) corresponds to one sub-HARQ-ACK codebook (that is, the HARQ-ACK bit set or the HARQ-ACK bit sequence), and one PUCCH/PUSCH includes a HARQ-ACK codebook corresponding to different combination values of (first-type information, second-type information) (that is, a bit sequence included in one PUCCH/PUSCH is the combination HARQ-ACK bit sequence). In this embodiment, the arrangement sequence of combination values of (first-type information, second-type information) in one PUCCH or PUSCH is determined in one of the preceding arrangement manners.

In an embodiment, one PUCCH resource/PUSCH resource includes HARQ-ACK information of PDSCHs corresponding to different combination values of (first-type information, second-type information), and in the process of acquiring the HARQ-ACK information included in one PUCCH/PUSCH, a loop of the first-type information and a loop of the second-type information are introduced. It may be determined by the signaling information and the predetermined rule that a loop of the first-type information is followed by a loop of the second-type information, or a loop of the second-type information is followed by a loop of the first-type information.

In this embodiment, only one HARQ-ACK codebook needs to be constructed in one time unit, or only one PUCCH or PUSCH in one time unit includes HARQ-ACK information, or both of the preceding two can be achieved, thereby improving the communication efficiency.

In this embodiment, HARQ-ACKs of PDSCHs corresponding to different (first-type information, second-type information) in one time unit are combined in one HARQ-ACK codebook/one uplink HARQ-ACK feedback resource, where one HARQ-ACK feedback resource includes a PUCCH or a PUSCH.

In an embodiment, HARQ-ACKs of PDSCHs corresponding to different (first-type information, second-type information) in one time unit are included in X HARQ-ACK codebooks (that is, the combination HARQ-ACK bit sequence)/included in X uplink HARQ-ACK feedback resources (that is, a bit sequence included in one uplink HARQ-ACK feedback resource is the combination bit sequence). Here X is less than or equal to the total number of combination values of (first-type information, second-type information). For example, X is less than or equal to 4. Therefore, it is necessary to confirm a mapping relationship between HARQ-ACKs of Y PDSCHs having HARQ-ACKs that fall within the same time unit and X HARQ-ACK codebooks or X uplink HARQ-ACK feedback resources.

Figure 15:
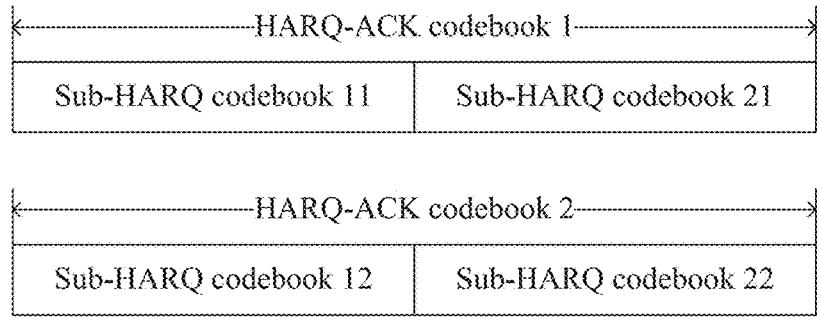
FIG. 15 is a diagram illustrating that HARQ-ACKs of PDSCHs having the same first-type information are combined in one HARQ-ACK codebook according to an embodiment.

FIG. 15 is a diagram illustrating that HARQ-ACKs of PDSCHs having the same first-type information are combined in one HARQ-ACK codebook according to an embodiment. In this embodiment, for a mapping relationship between HARQ-ACKs of Y PDSCHs having HARQ-ACKs that fall within the same time unit and X HARQ-ACK codebooks and/or X uplink HARQ-ACK feedback resources, the X HARQ-ACK codebooks/the X uplink HARQ-ACK feedback resources correspond to X first-type information values. As shown in FIG. 15, X=2, HARQ-ACK codebook 1 and/or uplink HARQ-ACK feedback resource 1 corresponds to that the first-type information value=0, and HARQ-ACK codebook 2 and/or uplink HARQ-ACK feedback resource 2 corresponds to that the first-type information value=1. That is, each HARQ-ACK codebook and/or uplink HARQ-ACK feedback resource corresponds to one first-type information value. A loop of second-type information is introduced in the process of acquiring HARQ-ACK information included in each HARQ-ACK codebook and/or uplink HARQ-ACK feedback resource. That is, one HARQ-ACK codebook and/or one uplink HARQ-ACK feedback resource includes sub-HARQ-ACKs (that is, the HARQ-ACK bit sequence or the HARQ-ACK bit set) corresponding to different second-type information.

Figure 16:
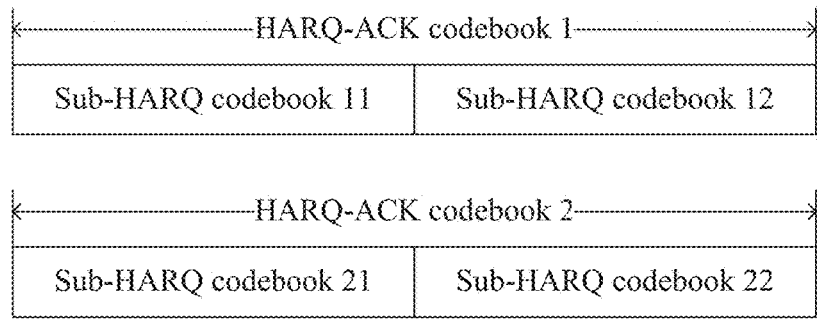
FIG. 16 is a diagram illustrating that HARQ-ACKs of PDSCHs having the same second-type information are combined in one HARQ-ACK codebook according to an embodiment.

FIG. 16 is a diagram illustrating that HARQ-ACKs of PDSCHs having the same second-type information are combined in one HARQ-ACK codebook according to an embodiment. In this embodiment, for determining a mapping relationship between HARQ-ACKs of Y PDSCHs having HARQ-ACKs that fall within the same time unit and X HARQ-ACK codebooks and/or X uplink HARQ-ACK feedback resources, the X HARQ-ACK codebooks and/or the X uplink HARQ-ACK feedback resources correspond to X second-type information values. As shown in FIG. 16, X=2, HARQ-ACK codebook 1 and/or uplink HARQ-ACK feedback resource 1 corresponds to that the second-type information value=0, and HARQ-ACK codebook 2 and/or uplink HARQ-ACK feedback resource 2 corresponds to that the second-type information value=1. That is, each HARQ-ACK codebook and/or uplink HARQ-ACK feedback resource corresponds to one second-type information value. A loop of first-type information is introduced in the process of acquiring HARQ-ACK information included in each HARQ-ACK codebook and/or uplink HARQ-ACK feedback resource. That is, one HARQ-ACK codebook and/or one uplink HARQ-ACK feedback resource includes sub-HARQ-ACKs corresponding to different first-type information.

In an embodiment, the mapping relationship may be determined according to at least one of signaling information notified by a serving node or a rule predetermined by a terminal. For example, a semi-static HARQ-ACK codebook and a dynamic HARQ-ACK codebook use different mapping relationships.

In this embodiment, the number of possible values of the first-type information is the same as the number of possible values of the second-type information. The number of possible values of the first-type information may also be different from the number of possible values of the second-type information.

In this embodiment, at most X HARQ-ACK codebooks need to be constructed in one slot (or one time unit), or at most X PUCCHs/PUSCHs in one time unit include HARQ-ACK information, or both of the preceding two can be achieved. Here the number of X is determined according to the number of possible values of the first-type information and the number of possible values of the second-type information.

In an embodiment, X is also determined according to PUCCH resources where HARQ-ACKs indicated in PDCCHs scheduling PDSCHs are located. For example, it is only when PUCCH resources where HARQ-ACKs indicated in PDCCHs scheduling PDSCHs overlap each other that HARQ-ACKs corresponding to different second-type information values are combined in one PUCCH resource according to the preceding first mapping mode before being fed back, or HARQ-ACKs corresponding to different first-type information values are combined in one PUCCH resource according to the preceding second mapping mode before being fed back. In such a time unit, the value of X may be greater than 2.

Figure 17:
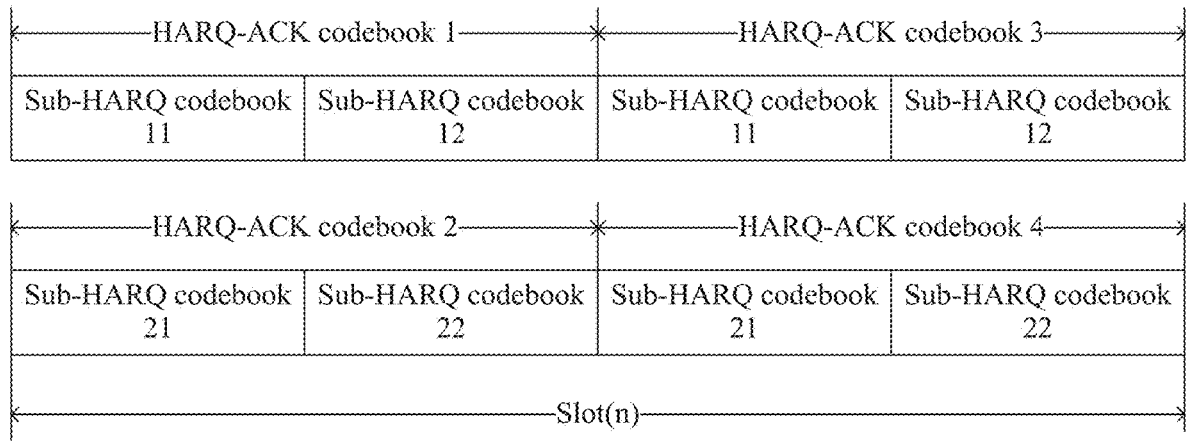
FIG. 17 is a diagram illustrating that HARQ-ACKs of PDSCHs are combined in one HARQ-ACK codebook according to an embodiment.

FIG. 17 is a diagram illustrating that HARQ-ACKs of PDSCHs are combined in one HARQ-ACK codebook according to an embodiment. As shown in FIG. 17, 4 HARQ-ACK codebooks/4 PUCCHs in one time unit include HARQ-ACK information, and PUCCH resources where HARQ-ACK(i) is located are in the mode of time division, where i={1, 2, 3, 4}. HARQ-ACK(1) and HARQ-ACK(3) correspond to the same first-type information value, and HARQ-ACK(2) and HARQ-ACK(4) correspond to the same first-type information value. Alternatively, HARQ-ACK(1) and HARQ-ACK(3) correspond to the same second-type information value, and HARQ-ACK(2) and HARQ-ACK(4) correspond to the same second-type information value. The intersection between PUCCH resources corresponding to sub-HARQ-ACK codebooks in the same HARQ-ACK codebook is non-empty.

In an embodiment, third-type information is determined according to first-type information and/or second-type information. The third-type information (that is, the channel parameter) includes at least one of the following information: the maximum number of received PDSCHs in one type of candidate PDSCHs; the maximum number of received PDSCHs between which a time domain intersection is non-empty; the maximum total number of code words included in PDSCHs between which a time domain intersection is non-empty; the maximum number of PDCCHs included in one PDCCH monitoring occasion and used for scheduling PDSCHs in the same carrier component (CC), that is, the PDSCHs scheduled by the multiple PDCCHs belong to the same CC, where the one type of candidate belongs to one frequency domain bandwidth; or the maximum number of received PDSCHs between which a time domain resource intersection is non-empty and of which radio network temporary identifiers (RNTIs) are different. The PDSCHs between which the time domain resource intersection is non-empty include one of the following: PDSCHs belonging to one serving cell or PDSCHs belonging to at least two serving cells.

In an embodiment, when the number of PDSCHs is calculated, the release signaling of an SPS PDSCH corresponds to one PDSCH. The PDSCH corresponding to the release signaling of the SPS PDSCH is an SPS PDSCH, even if a terminal does not need to receive the SPS PDSCH due to the release signaling of the SPS PDSCH.

In an embodiment, the third-type information is determined according to the first-type information and the second-type information, specifically according to the maximum of the number of pieces of different first-type information and the number of pieces of different second-type information. For example, if a service node configures 2 pieces of first-type information and 1 piece of second-type information for a terminal, the third-type information=max (2, 1)=2. Alternatively, a service node configures 1 piece of first-type information and 2 pieces of second-type information for a terminal, then the third-type information=max(1, 2)=2. Alternatively, a service node configures 1 piece of first-type information and 1 piece of second-type information for a terminal, then the third-type information=max(1, 1)=1. The number of pieces of m-th-type indication information is 1. When a base station configures only 1 piece of m-th-type indication information for a terminal or when no m-th-type indication information is configured by default, m belongs to {one, two}, and the number of pieces of m-th-type indication information is 1.

In an embodiment, the third-type information is determined according to the first-type information and the second-type information, specifically according to the product of the number of pieces of different first-type information and the number of pieces of different second-type information. For example, if a service node configures 2 pieces of first-type information and 1 piece of second-type information for a terminal, the third-type information=2*1=2. Alternatively, if a service node configures 1 piece of first-type information and 2 pieces of second-type information for a terminal, the third-type information=1*2=2. Alternatively, if a service node configures 2 pieces of first-type information and 2 pieces of second-type information for a terminal, the third-type information=2*2=4.

In an embodiment, a third-type information value is determined in the manner described in the preceding embodiment, and the minimum of the third-type information and the predetermined threshold is used as the final third-type information value. For example, the predetermined threshold=3, and a service node configures 2 pieces of first-type information and 2 pieces of second-type information for a terminal. In this case, it is determined in the manner described in the preceding embodiment that if the third-type information=4, the minimum of (4, 3), that is, 3, is used as the final third-type information value. The maximum of the third-type information and the predetermined threshold is used as the final third-type information value. For example, the predetermined threshold=3, and a base station configures 1 piece of first-type information and 2 pieces of second-type information for a terminal. In this case, it is determined that if the third-type information=2, the maximum of (2, 3), that is, 2, is used as the final third-type information value.

In an embodiment, it can be specified that when m-th-type indication information is not configured or is not enabled, the value of the m-th-type indication information is the default value, for example, 0, and the number of pieces of the m-th-type indication information is equal to 1. For example, when the number of values of the second-type information is equal to 1, that the third-type information is acquired according to the first-type information and the second-type information in above may also be referred to as that the third-type information is acquired according to the first-type information. For example, when the number of values of the second-type information is equal to 1, that the third-type information is acquired according to the first-type information in above and the second-type information may also be referred to as that the third-type information is acquired according to the second-type information.

In an embodiment, an acquisition parameter of the third-type information includes fourth-type information, where the fourth-type information is PDSCH information or information about a PDCCH. For example, the PDSCH information includes at least one of the following information: scrambling sequence generation parameter information of the PDSCH; process number information of the PDSCH; uplink control channel resource information of a HARQ-ACK where the PDSCH is located; demodulation reference signal port information of the PDSCH; quasi co-location reference signal set information corresponding to a demodulation reference signal of the PDSCH; or rate matching information of the PDSCH. For example, the information about the PDCCH includes at least one of the following information: a CORESET group containing a CORESET where the PDCCH is located, a higher-layer configuration parameter of downlink control information in a predetermined format, and mapping table information between a predetermined bit field value in the PDCCH and indication content. An acquisition parameter of the third-type information includes fourth-type information. The third-type information is determined according to the number of sets of fourth-type information. For example, in the case where the number of sets of the fourth-type information configured in one frequency domain bandwidth is B, then the third-type information is greater than or equal to B, or the third-type information is proportional to B.

In an embodiment, the third-type information is obtained according to a value agreed between a service node and a terminal or is determined according to signaling information sent by the service node. For example, the service node notifies the third-type information through the signaling information, and/or the terminal sends the third-type information value to the service node through capability information. In an embodiment, an acquisition parameter of the third-type information includes one or more types of the following information: first-type information, second-type information, fourth-type information, signaling information notified by a serving node, a fixed value, or capability information sent by a terminal.

In an embodiment, the first-type information is associated with the second-type information. In this embodiment, the first-type information is associated with the second-type information in one of the manners below. A value of one type of information is obtained according to a value of the other type of information. A value range of one type of information is obtained according to a value or a value range of the other type of information. Certain value combinations of the two types of information are unable to exist simultaneously or are unable to be configured simultaneously. Configuration information of information 1 includes information 2 corresponding to information 1. A correspondence between the two types of information is determined according to at least one of signaling information or an agreed rule. The maximum number of combination values of the two types of information is not greater than a predetermined value. One type of information is determined according to the number of values of the other type of information.

In an embodiment, the first-type information is associated with the second-type information in terms of configuration. For example, in the case where the first-type information and the second-type information are configured, when 2 second-type information values cannot be configured when 2 first-type information values are configured. Optionally, the configured effective multiple time units are the same in terms of such configuration. The multiple time units are the same in terms of the set of valid combination values of the first-type information and the second-type information.

In an embodiment, the first-type information is associated with the second-type information in the following manner: The first-type information and the second-type information corresponding to PDSCHs having HARQ-ACKs that fall within the same time unit are associated with each other. For example, a serving node may configure 2 pieces of first-type information or 2 pieces of second-type information. However, when 2 pieces of first-type information correspond to PDSCHs having HARQ-ACKs that fall within the same time unit, the same goes to the second-type information. Alternatively, for example, a base station may configure 2 pieces of first-type information and may also configure 2 pieces of second-type information, but the number of combination values of (first-type information, second-type indication) corresponding to PDSCHs having HARQ-ACKs that fall within the same time unit cannot exceed 3.

In an embodiment, it can be specified that when m-th-type indication information is not configured or is not enabled, the value of the m-th-type indication information is the default value, for example, 0, and the number of pieces of the m-th-type indication information is equal to 1. m belongs to {one, two}

In an embodiment, when the number of combination values of (first-type information, second-type indication) corresponding to PDSCHs having HARQ-ACKs that fall within the same time unit exceeds a predetermined threshold, HARQ-ACKs of PDSCHs corresponding to different combination values of (first-type information, second-type indication) are combined and then fed back in one uplink channel.

In an embodiment, when the total number of combination values of (first-type information, second-type information) corresponding to PDSCHs having HARQ-ACKs that fall within the same time unit does not exceed the predetermined threshold (for example, 2), PDSCHs corresponding to different (first-type information, second-type information) are in different HARQ-ACK codebooks and are fed back in different PUCCHs. For example, the total number is 2, and corresponding combination values of (first-type information, second-type information) belong to {(0, 0), (0, 1)}. In this case, HARQ-ACKs of PDSCHs corresponding to combination values of (first-type information, second-type information) that belong to {(0, 0)} are combined and then fed back in one PUCCH, and HARQ-ACKs of PDSCHs corresponding to combination values of (first-type information, second-type information) that belong to {(0, 1)} are fed back in another PUCCH. In an embodiment, two PUCCHs are in the one time unit. In an embodiment, the time domain resource intersection between the two PUCCHs is empty.

In an embodiment, when the total number of combination values of (first-type information, second-type information) corresponding to PDSCHs having HARQ-ACKs that fall within the same time unit exceeds the predetermined threshold (for example, 2), HARQ-ACKs of PDSCHs corresponding to combination values of (first-type information, second-type information) are combined and then fed back in one channel. For example, in the case where the total number is 3, and corresponding combination values of (first-type information, second-type information) belong to {(0, 0), (0, 1), (1, 0)}, then HARQ-ACKs of PDSCHs that are the same in terms of first-type information and are different in terms of second-type information are combined and then fed back in one PUCCH and/or combined in one HARQ-ACK codebook. For example, HARQ-ACKs of PDSCHs corresponding to combination values of (first-type information, second-type information) that belong to {(0, 0), (0, 1)} are combined and then fed back in one PUCCH, and HARQ-ACKs of PDSCHs corresponding to combination values of (first-type information, second-type information) that belong to {(1, 0)} are combined and then fed back in another PUCCH. In an embodiment, two PUCCHs are in the one time unit. In an embodiment, the time domain resource intersection between the two PUCCHs is empty.

In this embodiment, in the case where the total number is greater than a predetermined value, HARQ-ACKs of PDSCHs that are the same in terms of first-type information and are different in terms of second-type information are combined and then fed back in one PUCCH and/or combined in one HARQ-ACK codebook.

In another embodiment, in the case where the total number is greater than a predetermined value, HARQ-ACKs of PDSCHs that are the same in terms of second-type information and are different in terms of first-type information are combined and then fed back in one PUCCH and/or combined into one HARQ-ACK codebook. Other combination modes are not ruled out in this embodiment. When the total number exceeds a predetermined value, the combination mode may be a fixed combination mode specified between a serving node and a terminal or may be determined according to signaling information.

In an embodiment, whether combination is needed is determined according to whether PUCCH resources where HARQ-ACKs indicated in PDCCHs scheduling PDSCHs overlap each other. For example, those that overlap each other are combined, and those that do not overlap each other are not combined.

In an embodiment, the preceding combination scheme is also suitable for channel state information (CSI). When the total number of combination values of (first-type information, second-type information) corresponding to CSI reporting of CSIs whose uplink feedback falls within the same time unit exceeds a second predetermined threshold, CSIs in CSI reporting corresponding to different combination values of (first-type information, second-type information) are combined. The combined CSI is fed back in one piece of uplink information. For example, when the total number is less than or equal to a second predetermined threshold, CSIs corresponding to different combination values of (first-type information, second-type information) are fed back in different PUCCHs; and when the total number exceeds the predetermined threshold, CSIs corresponding to the same first-type information but different second-type information are combined and then fed back in one PUCCH, or CSIs corresponding to the same second-type information but different first-type information are combined and then fed back in one PUCCH. The first-type information corresponding to CSI reporting is acquired according to the first-type information configured in the CORESET where the DCI that triggers the CSI reporting is located. The second-type information corresponding to CSI reporting is acquired according to information configured in the CSI reporting or according to DCI information that triggers the CSI reporting. For example, the second-type information is acquired according to a DCI format/a DCI size/an RNTI, or the second-type information corresponding to the CSI reporting is explicitly indicated in the DCI.

In an embodiment, when the number of combination values of (first-type information, second-type indication) corresponding to PDSCHs having HARQ-ACKs that fall within the same time unit exceeds the predetermined threshold, HARQ-ACK information of PDSCHs corresponding to a predetermined combination value of (first-type information, second-type information) is discarded according to the priority principle. Alternatively, HARQ-ACK information of PDSCHs corresponding to a predetermined combination value of (first-type information, second-type information) is not fed back in the same time unit and is fed back in a later time unit until which feedback of the preceding HARQ-ACK information is delayed. This later time unit is determined according to a predetermined rule or signaling information.

In an embodiment, for example, the priority of 4 combination values of (first-type information, second-type information) is specified, and HARQ-ACK information of a PDSCH corresponding to a combination value having a lower priority is discarded according to the priority. Alternatively, HARQ-ACK information of a PDSCH having a lower priority is fed back in a later time unit. For example, in the 4 combination values, the priority corresponding to the second-type information=0 is higher than the priority corresponding to the second-type information=1, that is, the priority of the 4 combination values is (0, 0), (1, 0), (0, 1), (1, 1) from high to low, or the priority corresponding to the first-type information=0 is higher than the priority corresponding to the first-type information=1, that is, the priority of the 4 combination values is (0, 0), (0, 1), (1, 0), (1, 1) from high to low. Other arrangement manners are ruled out in this embodiment.

The preceding scheme of discarding or delaying in this embodiment is also applicable to discarding or delaying of CSIs in CSI reporting corresponding to different combination values of (first-type information, second-type information) when the total number of combination values of (first-type information, second-type information) corresponding to CSI reporting of CSIs whose uplink feedback falls within the same time unit exceeds a second predetermined threshold. For example, when the total number is less than or equal to the second predetermined threshold, CSIs corresponding to combination values of different (first-type information, second-type information) are fed back in different PUCCHs; and when the total number is greater than the second predetermined threshold, a CSI corresponding to a combination value having a lower priority is discarded or reported in a later time unit. The first-type information corresponding to a CSI reporting is acquired according to the first-type information configured in the CORESET where the DCI that triggers the CSI reporting is located. The second-type information corresponding to a CSI reporting is acquired according to information configured in the CSI reporting or according to DCI information that triggers the CSI reporting. For example, the second-type information is acquired according to a DCI format/a DCI size/an RNTI, or the second-type information corresponding to the CSI reporting is explicitly indicated in the DCI.

In an embodiment, at least two types of the following information are associated with each other: HARQ-ACK codebook type information, first-type information, the number of PDSCHs received by a terminal and whose time domain resources in one CC or BWP have an intersection, where the HARQ-ACK codebook type includes a semi-static codebook and a dynamic codebook. The first-type information is associated with the second-type information in one of the manners below. A value of one type of information is obtained according to a value of the other type of information. A value range of one type of information is obtained according to a value or a value range of the other type of information. Certain value combinations of the two types of information are unable to exist simultaneously or are unable to be configured simultaneously. Configuration information of information 1 includes information 2 corresponding to information 1. A correspondence between the two types of information is determined according to at least one of signaling information or an agreed rule. The maximum number of combination values of the two types of information is not greater than a predetermined value. One type of information is determined according to the number of values of the other type of information.

In an embodiment, for example, in the case where it is determined that the number of first-type information values is 1, the HARQ-ACK codebook type cannot be configured as a semi-static codebook.

Alternatively, in the case where it is determined that the number of first-type information values is 1 and the number of PDSCHs whose time domain resources in one CC have an intersection is greater than 1, the HARQ-ACK codebook type cannot be configured as a semi-static codebook.

Alternatively, in the case where the HARQ-ACK codebook type is configured as a semi-static codebook, the number of PDSCHs whose time domain resources in one CC have an intersection cannot be greater than 1.

Alternatively, in the case where the HARQ-ACK codebook type is configured as a semi-static codebook and the number of PDSCHs whose time domain resources in one CC have an intersection is greater than 1, HARQ-ACKs of PDSCHs whose time domain resources in one CC have an intersection fall within different time units.

In an embodiment, sixth-type information is determined according to fifth-type information. The sixth-type information includes at least one of the following: a position where the HARQ-ACK information of the C PDSCHs is located in HARQ-ACK information included in the one feedback resource; a sequence of the HARQ-ACK information of the C PDSCHs in HARQ-ACK information included in one codebook; a feedback resource where the HARQ-ACK of the C PDSCHs is located; a calculation sequence (that is, processing sequence) of DAIs corresponding to the C downlink channels; the value of C; or whether DAIs corresponding to the C PDSCHs are calculated separately or in a uniform manner. The C PDSCHs/PDCCHs are the same in terms of a PDCCH monitoring occasion, a serving cell where a PDSCH is located, a time unit where a HARQ-ACK is located and a combination value of the N types of information. Alternatively, the C PDSCHs/PDCCHs are the same in terms of a candidate PDSCH type, a serving cell where a PDSCH is located, a time unit where a HARQ-ACK is located and a combination value of the N types of information. Here C is a positive integer greater than 1. A candidate PDSCH type is obtained in the manner shown in FIG. 1. One candidate PDSCH type is also referred to as one PDSCH reception occasion. That is, a second-type information set includes a PDCCH monitoring occasion, a serving cell where a PDSCH is located, a time unit where a HARQ-ACK is located and a combination value of the N types of information. Alternatively, a second-type information set includes a candidate PDSCH type, a serving cell where a PDSCH is located, a time unit where a HARQ-ACK is located and a combination value of the N types of information. The N types of information include at least one of first-type information and second-type information. In this embodiment, only one PUCCH resource in one time unit includes HARQ-ACK information; otherwise, information about the time unit where a HARQ-ACK in the second-type information set is located is replaced by a feedback resource where the HARQ-ACK is located or a HARQ-ACK code word or sub-code word where the HARQ-ACK is located.

In an embodiment, the fifth-type information includes information about a PDCCH scheduling a PDSCH. For example, the fifth-type information includes at least one of the following information: first-type information configured in a CORESET where the PDCCH scheduling the PDSCH is located, a CORESET ID of the PDCCH scheduling the PDSCH, a search space ID of the PDCCH scheduling the PDSCH, candidate PDCCH index information of the PDCCH scheduling the PDSCH, quasi co-location information of a demodulation reference signal of the PDCCH scheduling the PDSCH, or a CC index of the PDCCH scheduling the PDSCH. In an embodiment, HARQ-ACKs of the C PDSCHs are fed back in the same time unit.

In an embodiment, the sixth-type information is determined according to the fifth-type information in one of the following manners: The sixth-type information is determined according to the size of the fifth-type information corresponding to the C PDSCHs; or a loop of the fifth-type information is introduced in the process of acquiring the sixth-type information; or the sixth-type information is determined according to the number of pieces of the fifth-type information.

Figure 18:
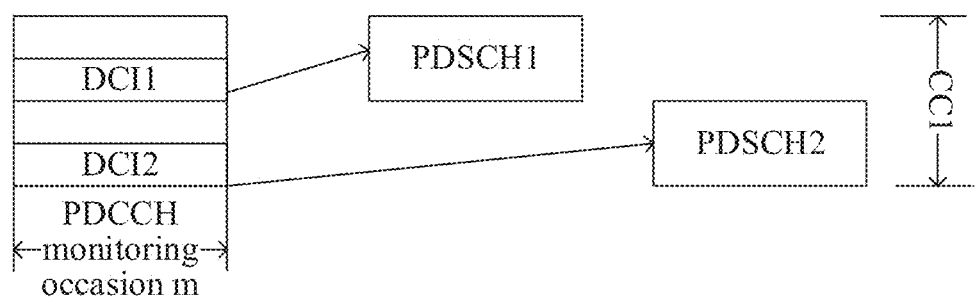
FIG. 18 is a diagram illustrating that DCI corresponding to two PDSCHs having HARQ-ACKs that fall within the same time unit and belonging to the same CC falls within the same PDCCH monitoring occasion according to an embodiment.

FIG. 18 is a diagram illustrating that DCI corresponding to two PDSCHs having HARQ-ACKs that fall within the same time unit and belonging to the same CC falls within the same PDCCH monitoring occasion according to an embodiment.

Figure 19:
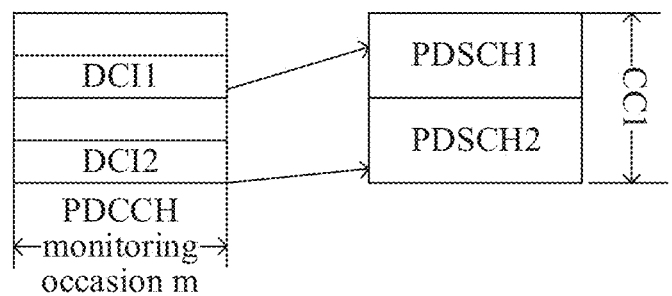
FIG. 19 is a diagram illustrating that DCI corresponding to two PDSCHs having HARQ-ACKs that fall within the same time unit and belonging to the same CC falls within the same PDCCH monitoring occasion according to another embodiment.

FIG. 19 is a diagram illustrating that DCI corresponding to two PDSCHs having HARQ-ACKs that fall within the same time unit and belonging to the same CC falls within the same PDCCH monitoring occasion according to another embodiment. As shown in FIGS. 18 and 19, both PDSCH1 and PDSCH2 are in CC1. HARQ-ACKs of PDSCH1 and PDSCH2 need to be fed back in the same feedback resource in the same uplink time unit. DCI1 schedules PDSCH1. DCI2 schedules PDSCH2. However, the PDCCH monitoring occasion where DCI1 is located is the same as the PDCCH monitoring occasion where DCI2 is located. In this embodiment, sixth-type information corresponding to PDSCH1 and PDSCH2 is determined. For example, the sequence of HARQ-ACK1 corresponding to PDSCH1 and HARQ-ACK2 corresponding to PDSCH2 in HARQ-ACK information included in one feedback resource is determined. For example, the sequence of the two HARQ-ACKs is determined according to the size of fifth-type information corresponding to the two PDSCHs. The calculation sequence of DAIs corresponding to the two PDSCHs is determined according to the size of the fifth-type information corresponding to the two PDSCHs. For example, DAIs of the two PDSCHs are counted in a uniform manner, and the calculation sequence of DAIs corresponding to the two PDSCHs is determined according to the size of the fifth-type information corresponding to the two PDSCHs, or a loop of the fifth-type information is introduced in the process of acquiring a HARQ-ACK codebook. For example, the fifth-type information corresponding to PDSCH1 is relatively small, and in the case where the C-DAI corresponding to PDSCH1 is 2 and the C-DAI corresponding to PDSCH2 is 1, the DAI corresponding to PDSCH1 is calculated first, and then the DAI corresponding to PDSCH2 is calculated. In this case, a terminal considers that there are other PDSCHs corresponding to C-DAI=[3,4] between PDSCH1 and PDSCH2. If the DAI corresponding to PDSCH2 is calculated first and then the DAI corresponding to PDSCH1 is calculated, the terminal considers that there is no other PDSCH between PDSCH1 and PDSCH2. In summary, in this case, it is necessary to determine the calculation sequence of DAIs corresponding to the C PDSCHs. The calculation sequence of DAIs is which DAI is processed first in the process of acquiring a HARQ-ACK codebook. Different calculation sequences cause different PDSCH sequences corresponding to the HARQ-ACK codebook and/or different numbers of HARQ-ACK bits included in the HARQ-ACK codebook.

The time domain resource intersection between PDSCH1 and PDSCH2 in FIG. 18 is non-empty. The time domain resource intersection between PDSCH1 and PDSCH2 in FIG. 19 is empty. In FIGS. 18 and 19, the frequency domain resource intersection between PDSCH1 and PDSCH2 is non-empty. In this embodiment, the frequency domain resource intersection between PDSCH1 and PDSCH2 may be non-empty. That is, the number of PDCCHs corresponding to one (c, m) in FIG. 3 is greater than 1, but combination values of the N types of information corresponding to the PDCCHs are the same, so processing according to FIG. 11 cannot be continued. In an embodiment, the processing sequence of the multiple PDCCHs is determined according to a PDCCH information index.

Figure 20:
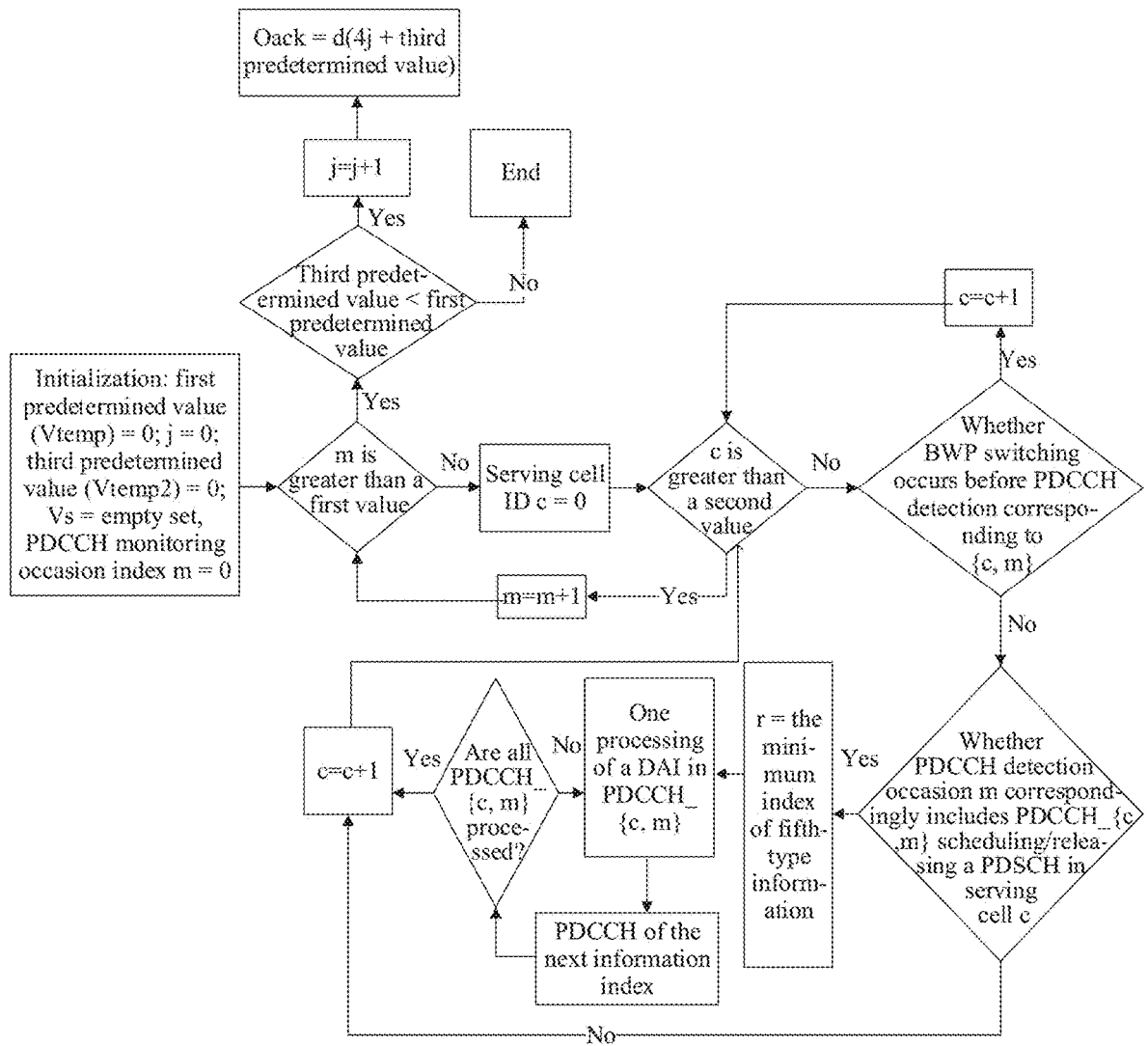
FIG. 20 is a diagram illustrating that in the case where multiple PDCCHs scheduling PDSCHs in the same serving cell exist in one PDCCH monitoring occasion, DAI is processed according to a fifth-type information index according to an embodiment.

FIG. 20 is a diagram illustrating that in the case where multiple PDCCHs scheduling PDSCHs in the same serving cell exist in one PDCCH monitoring occasion, DAI is processed according to a fifth-type information index according to an embodiment. As shown in FIG. 20, six-type information is determined according to the fifth-type information index corresponding to the PDCCHs. C PDSCHs correspond to different fifth-type information, or a set difference between combination values of fifth-type information corresponding to the C PDSCHs cannot be empty. The fifth-type information may also include an index of PDSCH information. The PDSCH information includes at least one of the following: a time domain resource index of the PDSCH; a frequency domain resource index of the PDSCH; a demodulation reference signal information index of the PDSCH; or a quasi co-location reference signal information index corresponding to a demodulation reference signal of the PDSCH. Therefore, the processing sequence of DAIs in multiple PDCCHs corresponding to one (c, m) in FIG. 20 may be determined according to the information about the PDSCHs. Therefore, the processing sequence of DAIs in the multiple PDCCHs may be determined according to information about PDSCHs. The PDSCHs are different in terms of the PDSCH information. In FIG. 20, r denotes the fifth-type information index, for example, information about multiple PDCCHs or information about multiple PDSCHs corresponding to the multiple PDCCHs.

In an embodiment, the feedback resource where the HARQ-ACK of the C PDSCHs is located is determined according to the fifth-type information in the following manner: The PUCCH feedback resource where one HARQ-ACK bit set is located is acquired according to PUCCH resource information indicated in a PDCCH satisfying a predetermined feature among multiple PDCCHs corresponding to multiple groups of HARQ-ACK information included in the one HARQ-ACK bit set. An acquisition parameter of the PDCCH satisfying the predetermined feature includes the fifth-type information. For example, the PDCCH satisfying the predetermined feature includes a PDCCH having the largest index among the multiple PDCCHs. An acquisition parameter of the indexes of the multiple PDCCHs includes the fifth-type information.

In an embodiment, in a case where the C PDSCHs/PDCCHs are the same in terms of a PDCCH monitoring occasion, a serving cell where a PDSCH is located and a time unit where a HARQ-ACK is located, the HARQ-ACK information is included in a dynamic HARQ-ACK codebook. The C PDSCHs/PDCCHs are the same in terms of a candidate PDSCH type, a serving cell where a PDSCH is located and a time unit where a HARQ-ACK is located, where the HARQ-ACK information is included in a semi-static HARQ-ACK codebook.

In an embodiment, it is determined whether the number of PDSCHs that are the same in terms of a PDCCH monitoring occasion, a serving cell where a PDSCH is located and a time unit where a HARQ-ACK is located is greater than 1 or whether the number of PDSCHs that are the same in terms of a candidate PDSCH type, a serving cell where a PDSCH is located and a time unit where a HARQ-ACK is located is greater than 1, that is, whether the value of C is greater than 1. When the value of C is greater than 1, the sixth-type information is determined according to the fifth-type information.

In an embodiment, for acquisition of a semi-static codebook, when the number of received PDSCHs in one type of candidate PDSCHs in one CC is less than a third predetermined value, for example, when only one PDSCH is received or when no PDSCH is received, seventh-type information needs to be determined according to signaling information and/or a predetermined rule. Here the seventh-type information includes at least one of the following information: which semi-static codebook includes HARQ-ACK information corresponding to the one type of candidate PDSCHs in the one CC; or the number of groups of HARQ-ACK information corresponding to the one type of candidate PDSCHs and included in one HARQ-ACK semi-static codebook, where one group of HARQ-ACK information corresponds to one PDSCH, or one group of HARQ-ACK information corresponds to one TB.

In an embodiment, the third predetermined value corresponding to the one CC is acquired according to at least one of the following information: a fixed value, the number of pieces of first-type information, the number of pieces of second-type information, the number of combination values of (first-type information, second-type information), or the number of sets of the same type of information. The third predetermined value corresponding to one CC is acquired according to the preceding information corresponding to the one CC.

In an embodiment, the seventh-type information is determined according to the maximum number of received PDSCHs in one type of candidate PDSCHs in one CC or according to terminal-received PDSCHs whose time domain resources have an intersection.

In an embodiment, the seventh-type information is determined according to the maximum number of code words (CWs) included in PDSCHs in one type of candidate PDSCHs or according to the maximum total number of CWs included in terminal-received PDSCHs whose time domain resources have an intersection.

Figure 21:
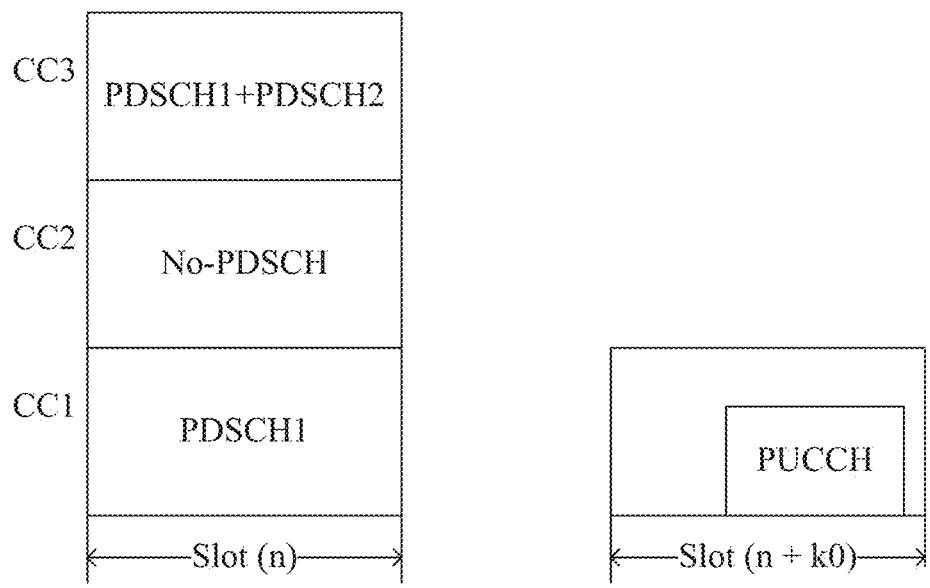
FIG. 21 is a diagram illustrating that in the case where the number of received PDSCHs in one CC is less than a third predetermined value, a HARQ-ACK codebook or subcodebook including default HARQ-ACK information in the CC is determined according to an embodiment.

FIG. 21 is a diagram illustrating that in the case where the number of received PDSCHs in one CC is less than a third predetermined value, a HARQ-ACK codebook or subcodebook including default HARQ-ACK information in the CC is determined according to an embodiment. In an embodiment, for example, the obtained third predetermined value is 2. As shown in FIG. 21, a terminal receives PDSCH1 in CC1 and PDSCH1 and PDSCH2 in CC3 in slot (n). PDCCHs scheduling these PDSCHs indicate that HARQ-ACKs of these PDSCHs need to be fed back in the same time unit, for example, slot (n+k0) shown in FIG. 21. It is needed to determine how the HARQ-ACK codebook of PDSCH2 not received in CC1 is fed back and determine how HARQ-ACK information of a PDSCH in CC2 in which no PDSCH is received is fed back. Here the feedback is a semi-static codebook feedback.

In an embodiment, a HARQ-ACK codebook corresponding to each type of PDSCH among PDSCHs(i) is obtained according to the corresponding i. That is, each i corresponds to one HARQ-ACK codebook. Here i=1, 2. Alternatively, each i corresponds to one sub-HRQ-ACK codebook, and one PUCCH/PUSCH resource includes multiple sub- HARQ-ACK codebooks. In short, each i corresponds to one HARQ-ACK codebook (or sub-HARQ-ACK codebook, that is, the HARQ-ACK bit set). Here i corresponds to a continuous segment of HARQ-ACK information. In this embodiment, one i may correspond to non-continuous HARQ-ACK information in one HARQ-ACK codebook.

In an embodiment, one manner of determining seventh-type information is as follows: If a terminal receives no PDSCH corresponding to predetermined i in one CC, the HARQ-ACK codebook (or sub-HARQ-ACK codebook) corresponding to i includes the default HARQ-ACK feedback of the PDSCH corresponding to the predetermined i. The i set corresponding to the CC includes the predetermined i. Different CCs correspond to the same i set. In FIG. 21, it is determined that PDSCHs corresponding to i=1, 2 are received in CC1, CC2 and CC3. HARQ-ACK codebook 1 (or sub-HARQ-ACK codebook 1) includes HARQ-ACK information of PDSCH1 in CC1. HARQ-ACK codebook 2 (or sub-HARQ-ACK codebook 2) includes HARQ-ACK information of PDSCH2 in CC1, for example, the default NACK, even if the terminal receives no PDSCH2 in CC1. HARQ-ACK codebook 1 (or sub-HARQ-ACK codebook 1) includes HARQ-ACK information of PDSCH1 in CC2, for example, the default NACK, even if the terminal receives no PDSCH1 in CC2. HARQ-ACK codebook 2 (or sub-HARQ-ACK codebook 2) includes HARQ-ACK information of PDSCH2 in CC2, for example, the default NACK, even if the terminal receives no PDSCH2 in CC2.

Figure 22:
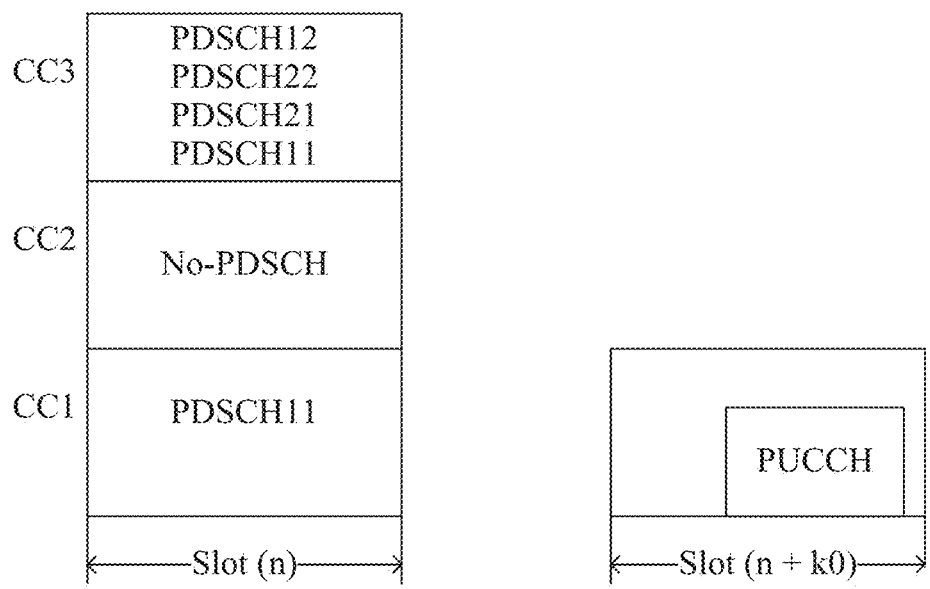
FIG. 22 is a diagram illustrating that in the case where the number of received PDSCHs in one CC is less than a third predetermined value, a HARQ-ACK codebook or subcodebook including default HARQ-ACK information in the CC is determined according to another embodiment.

FIG. 22 is a diagram illustrating that in the case where the number of received PDSCHs in one CC is less than a third predetermined value, a HARQ-ACK codebook or subcodebook including default HARQ-ACK information in the CC is determined according to an embodiment. In FIG. 22, it is determined that {CC1, CC2, CC3} receive PDSCHs corresponding to i={11, 12, 21, 22}. HARQ-ACK codebook 11 (or sub-HARQ-ACK codebook 11) includes HARQ-ACK information of PDSCH11 in CC1. HARQ-ACK codebook m (or sub-HARQ-ACK codebook m) includes the default HARQ-ACK information of PDSCH(m) in CC1, even if a terminal receives no PDSCH(m) in CC1. Here m={12, 21, 22}. HARQ-ACK codebook i (or sub-HARQ-ACK codebook i) includes the default HARQ-ACK information of PDSCH(i) in CC2, for example, the default NACK, even if the terminal receives no PDSCH in CC2.

In an embodiment, in the process of determining seventh-type information, different CCs may correspond to different i sets. For example, in FIG. 21, it is determined that PDSCHs corresponding to i=1, 2 are received in {CC1, CC3} while only PDSCH corresponding to i=1 is received in CC2. That is, the i set corresponding to CCs of {CC1, CC3} is {1,2}. The i set corresponding to CC 2 is {i=1}. In FIG. 21, HARQ-ACK codebook 2 (or sub-HARQ-ACK codebook 2) does not include HARQ-ACK information of PDSCH2 in CC 2, for example, the default NACK. For example, in FIG. 22, it is determined that PDSCHs corresponding to i belonging to {11, 21, 12, 22} are received in CC1, only PDSCH corresponding to i=11 is received in CC2, and only PDSCHs corresponding to i belonging to {11, 21} are received in CC1. Therefore, unlike the preceding first mode, only HARQ-ACK codebook 11 (or sub-HARQ-ACK codebook 11) includes the default HARQ-ACK information of PDSCH(11) in CC2, and other codebooks do not include the default HARQ-ACK information of a PDSCH in CC2. Only HARQ-ACK codebook 21 (or sub-HARQ-ACK codebook 21) includes the default HARQ-ACK information of PDSCH(21) in CC1. HARQ-ACK codebooks {12, 22} (or sub-HARQ-ACK codebooks {12, 22}) do not include the default HARQ-ACK information of a PDSCH in CC1.

In an embodiment, the seventh-type information is also determined according to the maximum number of PDSCHs that are received in one CC and whose time domain resources have an intersection. The maximum number of PDSCHs that are received in one CC and whose time domain resources have an intersection is less than or equal to the number of elements included in the i set corresponding to the CC.

In an embodiment, the seventh-type information is also determined according to the number of sets of the same type of parameters corresponding to one frequency domain bandwidth. For example, in the case where only one parameter set of the same type of parameters is configured in one BWP (for example, one PDSCH scrambling parameter set is configured in one BWP, where the same type of parameters are PDSCH scrambling parameters, that is, channel scrambling sequence generation parameters), then one HARQ-ACK feedback unit includes HARQ-ACK information of the same type of candidate PDSCHs in the BWP. For example, in the case where 2 parameter sets of the same type of parameters are configured in one BWP (for example, 2 channel scrambling parameter sets are configured in one BWP), then one HARQ-ACK feedback unit includes HARQ-ACK information of the same type of candidate PDSCHs in the BWP. The one HARQ-ACK feedback unit includes one of the following: one HARQ-ACK bit set, one time unit including a HARQ-ACK, or one channel resource containing HARQ-ACK bits. One group of HARQ-ACK information corresponds to one TB. For example, the same type of parameter includes a channel parameter or a signal parameter. For example, the same type of parameter includes at least one of the following parameters: process number set information, downlink data channel information, demodulation reference signal information, quasi co-location reference signal information, TCI state list information, uplink data channel information, uplink control channel resource group, rate matching information, measurement reference signal information, scrambling sequence generation parameter, timing advance information, aperiodic measurement reference signal information, power information, downlink control channel resource group, semi-persistent transmitted downlink data channel information, or mapping table information between a predetermined bit field value in DCI and indication content.

Figure 23:
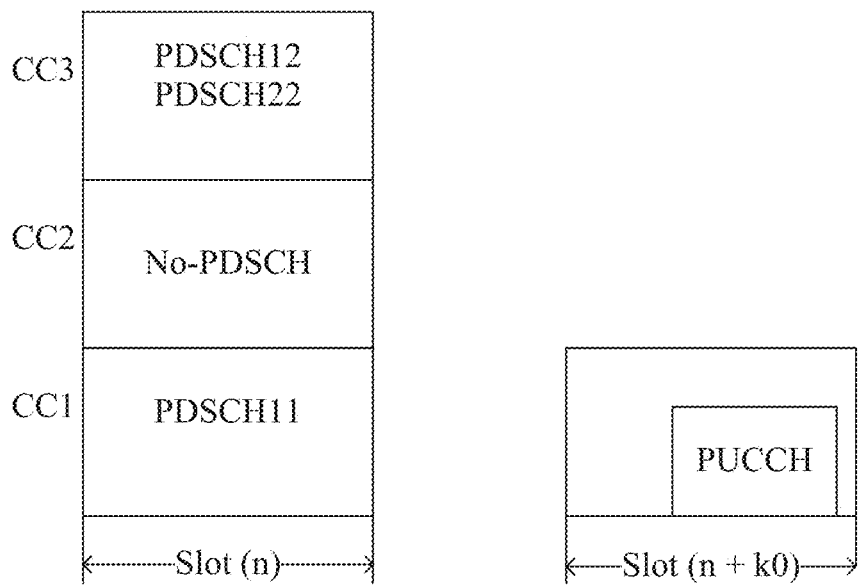
FIG. 23 is a diagram illustrating that in the case where the number of received PDSCHs in one CC is less than a third predetermined value, a HARQ-ACK codebook or subcodebook including default HARQ-ACK information in the CC is determined according to another embodiment.

FIG. 23 is a diagram illustrating that in the case where the number of received PDSCHs in one CC is less than a third predetermined value, a HARQ-ACK codebook or subcodebook including default HARQ-ACK information in the CC is determined according to an embodiment. As shown in FIG. 23, although PDSCHs corresponding to i belonging to {11, 21, 12, 22} can be received in CC3, the maximum number of PDSCHs received by a terminal in one type of candidate PDSCHs is 2. Therefore, in the case where two PDSCHs have been received in CC3, only HARQ-ACK codebook i corresponding to i corresponding to a received PDSCH includes HARQ-ACK information of a PDSCH in CC3. Another HARQ-ACK codebook (or another sub-HARQ-ACK codebook) does not include HARQ-ACK information in CC3. In CC1, HARQ-ACK codebook 11 (or sub-HARQ-ACK codebook 11) includes HARQ-ACK information of PDSCH11, HARQ-ACK codebook m (or sub-HARQ-ACK codebook m) includes the default HARQ-ACK information in CC1, and another HARQ-ACK codebook (or sub-HARQ-ACK codebook) does not include the default HARQ-ACK information in CC1. Here m is a predetermined value, or m is obtained according to (i) corresponding to a PDSCH that has been received. In CC2, only two HARQ-ACK codebooks (or sub-HARQ-ACK codebooks) include the default NACK information in CC2. The indexes of the two HARQ-ACKs (or sub-HARQ-ACK codebooks) are predetermined values or are notified through signaling information.

In an embodiment, the seventh-type information may also be determined according to the maximum total number of CWs included in PDSCHs that are received in one CC and whose time domain resources have an intersection. For example, each PDSCH can include 2 CWs at most. The number of actually included CWs is dynamically indicated. However, the maximum total number of CWs included in PDSCHs that are received in one CC and whose time domain resources have an intersection is 2. For example, in FIG. 23, in the case where PDSCH11 is received in CC1 and PDSCH11 actually includes 2 CWs, then in the candidate PDSCH type to which PDSCH11 belongs, the terminal cannot receive other PDSCHs. Therefore, only HARQ-ACK codebook 11 (or sub-HARQ-ACK codebook 11) includes HARQ-ACK information in CC1, and HARQ-ACK codebooks {21, 12, 22} (or sub-HARQ-ACK codebooks {21, 12, 22}) do not include the default HARQ-ACK information in CC1. PDSCH12 and PDSCH22 were received in CC3. Both PDSCH12 and PDSCH22 can include 2 CWs, but when the time domain resources of PDSCH12 and PDSCH22 have an intersection, each of PDSCH12 and PDSCH22 includes one CW. Therefore, HARQ-ACK codebook 12 (or sub-HARQ-ACK codebook 12) includes only HARQ-ACK information corresponding to one CW in PDSCH12, or HARQ-ACKs of the two CWs of PDSCH12 are considered to be bundled at this time. HARQ-ACK codebook 22 (or sub-HARQ-ACK codebook 22) includes only HARQ-ACK information corresponding to one CW in PDSCH22, or HARQ-ACKs of the two CWs of PDSCH22 are considered to be bundled at this time. That is, the total number of CWs of HARQ-ACK information that needs to be fed back for one PDSCH is determined according to the total number of CWs included in PDSCHs whose time domain resources have an intersection.

In an embodiment, in one time unit, HARQ-ACK information corresponding to at most W CWs of one type of candidate PDSCHs is included in one time unit. Here the W CWs belong to one PDSCH or belong to different PDSCHs. For example, W=2. That is, for example, at most 2 PDSCHs in one type of candidate PDSCHs are received, but at most 2 CWs can be received, so regardless of whether the number of actually received PDSCHs in one type of candidate PDSCHs is 1 or 2, for the one type of candidate PDSCHs, one time unit/one HARQ-ACK codebook corresponds to at most two groups of HARQ-ACK information. One group of HARQ-ACK information corresponds to the one CW or one TB.

In an embodiment, the i set corresponding to one CC may be determined by the number of sets of the same type of information corresponding to one CC (or the currently activated BWP of one CC). For example, when one CC (or BWP) corresponds to two sets of values of the same type of information, the i set corresponding to the CC includes {1, 2}; and when one CC (or BWP) corresponds to one set of values of the same type of information, the i set corresponding to the CC includes the index of the corresponding set of values, such as {1} or {2}. The number of sets of the same type of information corresponding to one CC may be the number of sets of the same type of information configured in one CC or may be determined according to a predetermined rule. The same type of information includes at least one of the following: PDSCH information, information about a PDCCH, information about a PUCCH, first-type information or second-type information. For example, the same type of information includes PDSCH scrambling sequence parameter information, and the same type of information is a PUCCH super set. One super set includes one or more PUCCH sets. If one CC corresponds to two super sets, the i set corresponding to the CC includes {1, 2}. If one CC corresponds to only one super set, the i set corresponding to the CC includes {1} or {2}. Whether it is {1} or {2} is determined according to the index of a corresponding super set.

In an embodiment, i in PDSCH(i) may be first-type information corresponding to PDSCH(i), second-type information corresponding to PDSCH(i), or a combination value of first-type information corresponding to PDSCH(i) and second-type information corresponding to PDSCH(i). The i set corresponding to one CC is one of the following sets corresponding to the CC: a first-type information set, a second-type information set, or a set of combination values of (first type information, second type information). In FIG. 21, i corresponds to one of the following: two pieces of first-type information, second-type information, or two combination values of (first type information, second type information).

In an embodiment, different combination values of the N types of information correspond to different HARQ-ACK parameters. For example, a HARQ-ACK parameter is configured for different combination values of the N types of information separately. The HARQ-ACK parameter includes at least one of the following parameters: parameter one, parameter two or parameter three.

Parameter one is a HARQ-ACK codebook type. The codebook type includes a semi-static HARQ-ACK codebook (that is, type-I HARQ-ACK codebook) and a dynamic HARQ-ACK codebook (that is, type-II HARQ-ACK codebook).

The second parameter is a parameter for acquisition of HARQ-ACK bits included in one HARQ-ACK bit set. For example, at least one of the following parameters is required for acquisition of a semi-static HARQ-ACK codebook: a set of time intervals between a PDSCH and a HARQ-ACK codebook corresponding to the PDSCH; a time domain resource set of PDSCHs; time slot structure information; the maximum number of CBGs included in one TB; whether HARQ-ACK feedback bits corresponding to two TBs or CWs of one PDSCH are bundled; the maximum number of TBs or CWs included in one PDSCH; information for acquisition of a candidate PDSCH set corresponding to a HARQ-ACK codebook currently to be transmitted; a time domain repetition factor of a PDSCH; or a parameter for an semi-persistent transmitted PDSCH.

Parameter three is a parameter for acquisition of an uplink feedback resource where a HARQ-ACK bit set is located.

In an embodiment, the N types of information include at least one of the following: first-type information, second-type information, time unit information or a feedback resource set. Different combination values of the N types of information correspond to different HARQ-ACK bit sets. A HARQ-ACK set may be one of the following: a HARQ-ACK codebook, a HARQ-ACK subcodebook, a HARQ-ACK bit sequence, or a set of HARQ-ACK bits included in an uplink feedback resource. For example, a codebook type that may be a dynamic codebook or a static codebook is configured for each of the 4 types of codebooks corresponding to (first-type information, second-type information)

belonging to {(0, 0), (0, 1), (1, 0), (1, 1)} separately. For example, HARQ-ACK codebooks corresponding to (first-type information, second-type information) belonging to {(0, 0), (0, 1)} may be configured as dynamic codebooks, and HARQ-ACK codebooks corresponding to (first-type information, second-type information) belonging to {(1, 0), (1, 1)} may be configured as semi-static codebooks; and HARQ-ACK codebooks corresponding to (first-type information, second-type information) belonging to {(0, 0), (1, 0)} may be configured as dynamic codebooks, and HARQ-ACK codebooks corresponding to (first-type information, second-type information) belonging to {(0, 1), (1, 1)} may be configured as semi-static codebooks. Another configuration mode may also be used. In brief, a correspondence is established between first-type information and/or second-type information a and HARQ-ACK codebook type. The codebook type includes a semi-static HARQ-ACK codebook (that is, type-I HARQ-ACK codebook) and a dynamic HARQ-ACK codebook (that is, type-II HARQ-ACK codebook).

In an embodiment, the construction methods of HARQ-ACK codebooks corresponding to different (first-type information, second-type information) and transmitted in one uplink BWP are different. For example, HARQ-ACK codebooks corresponding to (first-type information, second-type information) belonging to {(0, 0), (1, 0)} are configured as dynamic codebooks, and these two types of codebooks are constructed by using a dynamic codebook construction method; and HARQ-ACK codebooks corresponding to (first-type information, second-type information) belonging to {(0, 1), (1, 1)} are configured as semi-static codebooks, and these two types of codebooks are constructed by using a semi-static codebook construction method. In this manner, different second-type information can correspond to different codebook types. For example, a service with a higher delay requirement uses a dynamic codebook to reduce the HARQ-ACK construction time; and a service with a lower delay requirement uses a semi-static codebook to reduce a DCI load and/or to reduce power consumption of a terminal. In this case, a PDCCH corresponding to a PDSCH whose HARQ-ACK belongs to a dynamic codebook needs to include a DAI, and a PDCCH corresponding to a PDSCH whose HARQ-ACK belongs to a semi-static codebook does not need to include a DAI. In an embodiment, both types of PDCCHs include DAI information, even if a PDCCH corresponding to a semi-static codebook does not need to include a DAI. In another embodiment, only a PDCCH corresponding to a dynamic codebook includes a DAI, and a PDCCH corresponding to a semi-static codebook does not include a DAI. At this time, although the PDCCH overhead can be saved, the complexity of blind detection of the terminal is increased. This is because the number of DAI loads is increased. Here the PDCCH corresponding to the PDSCH is the PDCCH scheduling the PDSCH.

In an embodiment, Z PDSCHs whose time domain resources in one frequency domain bandwidth have an intersection correspond to W groups of HARQ-ACK information. Each group of HARQ-ACK information corresponds to one CW (or one TB). W denotes the maximum total number of CWs included in PDSCHs whose time domain resources have an intersection.

In an embodiment, each PDSCH of the Z PDSCHs whose time domain resources have an intersection can include at most 2 CWs. For example, when sent alone, the each PDSCH can include at most 2 CWs. However, when the time domain resources occupied by the Z PDSCHs have an intersection, the maximum number of CWs included in the Z PDSCHs is W. Here W is less than or equal to the sum of respective maximum numbers of CWs that can be included in the Z PDSCHs.

In an embodiment, DCI1 schedules PDSCH1, DCI2 schedules PDSCH2, DCI1 includes two groups of {NDI, MCS, RV} indication fields that correspond to two CWs included in PDSCH1, and DCI2 includes two groups of {NDI, MCS, RV} indication fields that correspond to two CWs included in PDSCH2. When PDSCH1 and PDSCH2 are sent separately, each of PDSCH1 and PDSCH2 can include at most 2 CWs. However, when a time domain resource intersection between PDSCH1 and PDSCH2 is not empty, each of PDSCH1 and PDSCH2 can include only one CW. Therefore, for one BWP, HARQ-ACK information corresponding to at most two CWs needs to be fed back in time resources. These 2 CWs belong to one PDSCH (such as PDSCH1 or PDSCH2) or come from two PDSCHs (one CW in PDSCH1 and one CW in PDSCH2). Although each of PDSCH1 and PDSCH2 can include at most 2 PDSCHs, that is, PDSCH1 and PDSCH2 can include at most 4 PDSCHs in total, PDSCH1 and PDSCH2 can include at most 2 PDSCHs in total when the time domain resources of PDSCH1 and PDSCH2 have an intersection.

In an embodiment, each of PDSCH1 and PDSCH2 is configured to include at most 2 CWs. Moreover, HARQ-ACKs corresponding to two CWs included in one PDSCH are not bundled. When a time domain resource intersection between PDSCH1 and PDSCH2 is not empty, it is needed to feed back one group of HARQ-ACK information for each CW. Each group of HARQ-ACK information includes one or more HARQ-ACK bits, depending on the number of CBGs included in one CW. If HARQ-ACK information corresponding to PDSCH1 and PDSCH2 is not determined according to W, 4 groups of HARQ-ACK information that correspond to 2 CWs of PDSCH1 and 2 CWs of PDSCH2 need to be fed back. Although 2 of the 4 groups of HARQ-ACK information have no corresponding PDSCH, only the default value can be fed back. If HARQ-ACK information corresponding to PDSCH1 and PDSCH2 is determined according to W, only 2 groups of HARQ-ACK information need to be fed back for PDSCH1 and PDSCH2. The two groups of HARQ-ACK information correspond to one actually sent CW in PDSCH1 and one actually sent CW in PDSCH2. A correspondence between the W groups of HARQ-ACKs and the Z PDSCHs needs to be determined through signaling information and/or a predetermined rule. For example, the W groups of HARQ-ACKs correspond to W actually received CWs in a CW set with first an increase of CW indexes and then an increase of PDSCH indexes. If the number of actually received CWs is less than W, such as W1, the first W1 groups of HARQ-ACKs among the W groups of HARQ-ACKs correspond to the actually received W1 CWs in the CW set, and the remaining W-W1 groups of HARQ-ACKs correspond to the default value.

In this embodiment, HARQ-ACK information of the Z PDSCHs may be fed back in the same time unit or may be fed back in different time units.

In an embodiment, in the process of determining HARQ-ACK information included in a semi-static codebook, for one type of candidate PDSCHs, it is first determined that the number Y of CWs corresponding to a HARQ-ACK group already exists in the one type of PDSCH, and if the value of Y is greater than or equal to a predetermined value, this type of candidate PDSCHs are skipped. The number Y of CWs corresponding to a HARQ-ACK group already exists in at least one of the following manner: Another HARQ-ACK codebook includes a HARQ-ACK group corresponding to the one type of candidate PDSCHs; or the current HARQ-ACK codebook already includes a HARQ-ACK group corresponding to the one type of candidate PDSCHs.

In an embodiment, in the process of determining a dynamic HARQ-ACK codebook, a method similar to the preceding process of acquiring a semi-static codebook may be adopted, except that the preceding one type candidate PDSCH is equivalent to one type of PDSCH whose time domain resources have an intersection or multiple PDSCHs in the same time domain symbol.

In an embodiment, the maximum number of PDSCHs received by the terminal in one type of candidate PDSCHs is determined according to the number R of transmission repetitions of a PDSCH within one slot.

In an embodiment, each block as shown in FIG. 1 corresponds to one row of PDSCH time domain resource allocation, that is, corresponds to one indication value of a bit field located in DCI and used for notification of a time domain resource of a PDSCH. In FIG. 1, this bit field has 4 bits. Each of the first 9 indication values corresponds to a respective one of blocks 1 to 9 in FIG. 1. If the number R of transmission repetitions of a PDSCH in one block is greater than 1, the repeatedly transmitted PDSCHs are counted as one PDSCH when the maximum number of PDSCHs received by the terminal in one type of candidate PDSCHs is calculated.

Figure 24:
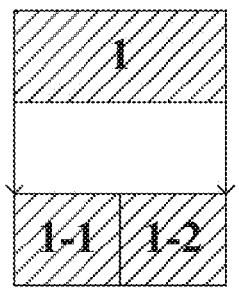
FIG. 24 is a diagram illustrating that the number of transmission repetitions of one candidate PDSCH is 2 according to an embodiment.

FIG. 24 is a diagram illustrating that the number of transmission repetitions of one candidate PDSCH is 2 according to an embodiment. As shown in FIG. 24, when block 1 of FIG. 1 includes {1-1, 1-2}, that is, when a time domain resource occupied by one PDSCH is block 1 of FIG. 1, the PDSCH is repeatedly transmitted twice in block 1.

In an embodiment, the repeatedly transmitted PDSCHs are counted as R PDSCHs when the maximum number of PDSCHs received by a terminal in one type of candidate PDSCHs is calculated. In this embodiment, assuming that PDSCHs have the same number R of transmission repetitions, the maximum number of PDSCHs received by a terminal in one type of candidate PDSCHs is a multiple of R. For example, the maximum number of PDSCHs received by a terminal in one type of candidate PDSCHs is one of the following: {R*number of first-type information values, R*the number of second-type information values, R*the number of combination values of (first-type information, second-type information)}. In this embodiment, PDSCHs may correspond to different values of R. For example, R corresponding to each PDSCH is notified through the second-type information. A PDSCH with a higher delay requirement corresponds to larger R. A PDSCH with a lower delay requirement corresponds to smaller R. The high layer configures two Rs, for example, {R1, R2}. It is determined, though the second-type information, whether the number of transmission repetitions corresponding to one PDSCH is R1 or R2. Alternatively, the higher layer configures one R, and it is determined, though the second-type information, whether the number of transmission repetitions corresponding to one PDSCH is R or 1. In this case, the maximum number of PDSCHs received by a terminal in one type of candidate PDSCHs is the total number of PDSCHs received by the terminal in the one type of candidate PDSCHs, where repeatedly transmitted PDSCHs are counted as one PDSCH.

In an embodiment, HARQ-ACK codebook information is obtained according to the number R of transmission repetitions of a PDSCH.

In an embodiment, when R is greater than 1, the PDSCHs repeatedly transmitted for R times correspond to the same group of HARQ-ACK information, or only the HARQ-ACK codebook corresponding to the last transmission repetition includes HARQ-ACK information of the PDSCHs repeatedly transmitted for R times, and a HARQ-ACK codebook corresponding to another transmission repetition includes the default NACK information of the PDSCHs repeatedly transmitted for R times, or a HARQ-ACK codebook corresponding to another transmission repetition does not include the default NACK information of the PDSCHs repeatedly transmitted for R times.

In an embodiment, the number R of transmission repetitions of one PDSCH includes one of the following: the number of transmission repetitions within one slot, or the number of transmission repetitions between slots, or the total number of transmission repetitions within one slot and between slots. When the number R of transmission repetitions of the PDSCH is the total number of transmission repetitions within one slot and between slots, transmission repetition indexes of R transmission repetitions of the PDSCH increase first within a slot and then between slots.

In an embodiment, the HARQ-ACK information and/or PUCCH resource of the PDSCH is determined according to the number R of transmission repetitions of the PDSCH within one slot.

In an embodiment, when the number R of transmission repetitions of the PDSCH within one slot is greater than 1, the position of the subslot where the HARQ-ACK of the PDSCH is located is obtained according to a time domain resource where a predetermined number of transmission repetitions among the R transmission repetitions is located. For example, the subslot where the HARQ-ACK is located is determined according to the subslot where the last transmission repetition among the R transmission repetitions is located.

Figure 25:
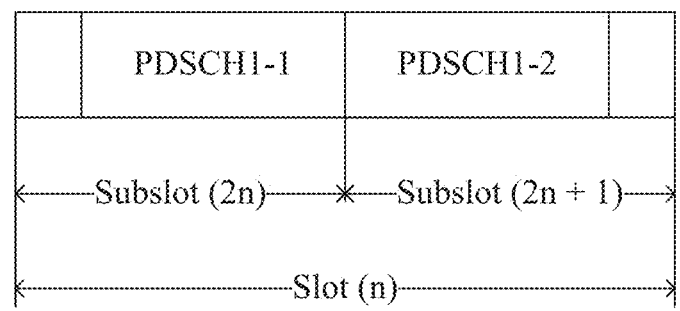
FIG. 25 is a diagram illustrating a time interval between a PDSCH and a HARQ-ACK feedback resource according to an embodiment.
Figure 26:
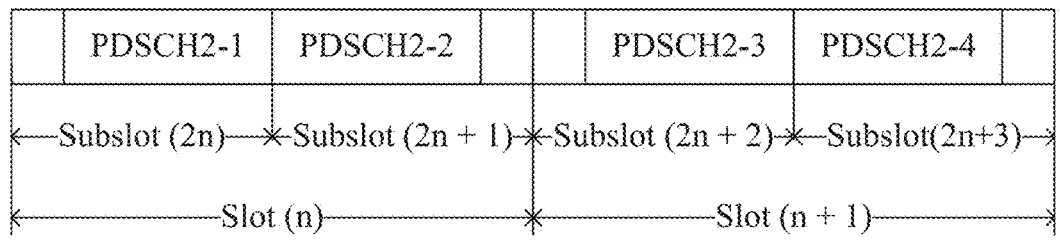
FIG. 26 is a diagram illustrating that a time interval between a PDSCH and a HARQ-ACK feedback resource includes a time interval between the end position of the last transmission repetition of the PDSCH and the HARQ-ACK feedback resource according to an embodiment.

FIG. 25 is a diagram illustrating a time interval between a PDSCH and a HARQ-ACK feedback resource according to an embodiment. As shown in FIG. 25, for example, PDSCH1 is repeatedly transmitted twice within one slot, that is, PDSCH1-1 and PDSCH1-2 in FIG. 25. A PDCCH scheduling PDSCH1 indicates that the interval between PDSCH1 and the time domain resource where the HARQ-ACK of PDSCH1 is located is k1 subslots. According to the subslot where the last transmission repetition PDSCH1-2 among the two transmission repetitions is located, that is, subslot (2n+1), the subslot where the HARQ-ACK of PDSCH1 is located is subslot (2n+1+k1). As shown in FIG. 26, PDSCH2 is repeatedly transmitted twice in one slot and is repeatedly transmitted in two consecutive slots, that is, PDSCH2 is repeatedly transmitted 4 times in total, that is, {PDSCH2-1, PDSCH2-2, PDSCH2-3, PDSCH2-4} in the figure. A PDCCH scheduling PDSCH2 indicates that the interval between PDSCH2 and the time domain resource where the HARQ-ACK of PDSCH2 is located is k2 subslots. According to the subslot where the last transmission repetition PDSCH2-4 among the 4 transmission repetitions is located, that is, subslot (2n+3), the subslot where the HARQ-ACK of PDSCH2 is located is subslot (2n+3+k2).

In this embodiment, the subslot where the HARQ-ACK of the PDSCH is located is determined according to the subslot where the last transmission repetition among the R transmission repetitions of the PDSCH is located.

In this embodiment, the subslot where the HARQ-ACK of the PDSCH is located is determined according to the subslot where the first transmission repetition among the R transmission repetitions is located. In this embodiment, the subslot where the HARQ-ACK of the PDSCH is located may be determined according to another transmission repetition among the R transmission repetitions.

FIG. 26 is a diagram illustrating that a time interval between a PDSCH and a HARQ-ACK feedback resource includes a time interval between the end position of the last transmission repetition of the PDSCH and the HARQ-ACK feedback resource according to an embodiment. In this embodiment, transmission repetition indexes of R transmission repetitions of a PDSCH increase first within a slot and then between slots. See FIG. 20.

In an embodiment, a terminal determines a PUCCH resource where HARQ-ACK information is located according to PUCCH resource indication (PRI) information indicated in the last PDCCH. The PUCCH resource includes HARQ-ACK information corresponding to one or more PDCCHs. HARQ-ACK information corresponding to one PDCCH includes at least one of HARQ-ACK information of a PDSCH scheduled by the PDCCH or HARQ-ACK information corresponding to a PDCCH releasing an SPS PDSCH.

In an embodiment, the PUCCH resource including the HARQ-ACK information is determined according to the last PDCCH in the following manner: The indexes of the one or more PDCCHs first increase according to eighth-type information among multiple PDCCHs corresponding to the same (PDCCH monitoring occasion, serving cell), then increase according to serving cells in the same PDCCH monitoring occasion, and then increase according to PDCCH monitoring occasions. Then, the PUCCH resource including the HARQ-ACK information is obtained according to the last PDCCH (that is, a PDCCH having the largest index) among the one or more PDCCHs.

In an embodiment, the serving cell is a serving cell where a PDSCH corresponding to a PDCCH is located or a serving cell where a PDCCH is located. In the preceding process of determining the indexes of the PDCCHs, the indexes of the PDCCHs first increase according to eighth-type information, then increase according to serving cells, and then increase according to PDCCH monitoring occasions. In this embodiment, the indexes of the PDCCHs may increase in other manners. For example, the indexes of the PDCCHs first increase according to serving cells, then increase according to PDCCH monitoring occasions, and then increase according to eighth-type information.

In an embodiment, the eighth-type information is one of the following: first-type information, second-type information, a combination value of (first-type information, second-type information), a control channel resource index corresponding to a PDCCH, or PDSCH information.

In an embodiment, the control channel resource index corresponding to a PDCCH includes at least one of the following: a CORESET index, a search space set index, an aggregation level or a candidate PDCCH index. In this embodiment, one search space set includes search spaces corresponding to different aggregation levels, and one search space corresponds to one aggregation level.

In an embodiment, the PDSCH information includes at least one of the following: a time domain resource index of the PDSCH; a frequency domain resource index of the PDSCH; a demodulation reference signal information index of the PDSCH; or a quasi co-location reference signal information index corresponding to a demodulation reference signal of the PDSCH.

In an embodiment, if the number (or the maximum number) of PDCCHs corresponding to the same (PDCCH detection timing, serving cell) among the multiple PDCCHs is equal to 1, the eighth-type information is not introduced in the numbering of the preceding PDCCHs; and if the number (or the maximum number) of PDCCHs corresponding to the same (PDCCH detection timing, serving cell) among the multiple PDCCHs is greater than 1, the eighth-type information is not introduced in the numbering of the preceding PDCCHs. Here the maximum number means the maximum value of the number of PDCCHs in all possible cases. That is, the number of PDCCHs may be equal to 1 in one implementation but may be greater than 1 in other implementations. The maximum number is the maximum value of the number of PDCCHs in all possible implementations. For example, the maximum number of PDCCHs corresponding to the same (PDCCH detection timing, serving cell) among the multiple PDCCHs is acquired according to the maximum number of PDSCHs received in the same time domain symbol of the same BWP. A frequency domain intersection between the PDSCHs in the same time domain symbol is empty or non-empty.

In an embodiment, whether DAIs corresponding to PDSCHs corresponding to different first-type information or different second-type information or different combination values of (first type information, second type information) are calculated separately as shown in FIG. 9 or calculated in a uniform manner as shown in FIG. 10 is associated with the number of predetermined PDCCHs in one PDCCH monitoring occasion. Here the PDCCHs satisfying a predetermined feature satisfy at least one of the following features: PDSCHs scheduled by the PDCCHs belong to one CC; HARQ-ACKs corresponding to PDSCHs scheduled by the PDCCHs are fed back in the same time unit, that is, feedback resources where HARQ-ACKs corresponding to PDSCHs scheduled by the PDCCHs are located fall within the same time unit; or HARQ-ACKs corresponding to PDSCHs scheduled by the PDCCHs are in the same HARQ-ACK bit set. If the number of the PDCCHs satisfying the predetermined feature is equal to 1, DAIs corresponding to PDSCHs corresponding to different first-type information or different second-type information or different combination values of (first type information, second type information) are calculated separately.

In an embodiment, the number of transmission repetitions of a PDSCH in one slot is taken into account during the classification of candidate PDSCHs. For example, during the classification of candidate PDSCHs in FIG. 1, the end position is in accordance with one transmission repetition instead of the end position of one block in FIG. 1. That is, when the number of transmission repetitions in block 1 in FIG. 1 is 2, the middle position in block 1 is the end position. Alternatively, when block 1 is one transmission repetition, the end position of a candidate PDSCH corresponding to block 1 is in accordance with the end position of multiple transmission repetitions. Here the number of transmission repetitions is configured through higher-layer signaling.

In an embodiment, an index of PDSCH information is introduced in the calculation sequence of DAIs (that is, the processing sequence of DAIs). The PDSCH information includes at least one of the following: a time domain resource index of the PDSCH; a frequency domain resource index of the PDSCH; a demodulation reference signal information index of the PDSCH; or a quasi co-location reference signal information index corresponding to a demodulation reference signal of the PDSCH. For example, in FIG. 3, multiple PDCCHs correspond to the same {c, m}. The multiple PDCCHs are located in the same PDCCH monitoring occasion m. The multiple PDCCHs schedule multiple PDSCHs in the same serving cell c. Therefore, it is needed to determine the processing sequence of DAIs in the multiple PDCCHs corresponding to the same {c, m}. Therefore, the processing sequence of DAIs in the multiple PDCCHs may be determined according to information about the PDSCHs. The PDSCHs correspond to different information about the PDSCHs.

In an embodiment, PDSCHs in the same group of PDSCHs satisfy at least one of the features below, and PDSCHs in different groups of PDSCHs do not satisfy at least one of the features below. The same group of PDSCHs corresponds to the same combination value of the N types of information. Different groups of PDSCHs correspond to different combination values of the N types of information. That is, at least one of the features below needs to be satisfied by E PDSCHs corresponding to the same combination value of the N types of information and does not need to be satisfied by E PDSCHs corresponding to different combination values of the N types of information.

Feature one: A time domain resource intersection between the E PDSCHs is empty.

Feature two: The E PDSCHs include PDSCH1 in slot (n). HARQ-ACK information of PDSCH1 is in slot (k). Among the E PDSCHs, HARQ-ACK information of a PDSCH in a slot later than slot (n) does not fall within a slot earlier than slot (k) (that is, the feedback time unit).

Feature three: The E PDSCHs include PDSCH1 in slot (n). HARQ-ACK information of PDSCH1 is in subslot (k). Among the E PDSCHs, HARQ-ACK information of a PDSCH in a slot later than slot (n) does not fall within a subslot earlier than subslot (k) (that is, the feedback time unit).

Feature four: The E PDSCHs include PDSCH1 and PDSCH2. PDCCH1 schedules PDSCH1. PDCCH2 schedules PDSCH2. In the case where the end position of PDCCH2 is later than the end position of PDCCH1, the start position of PDSCH2 is not earlier than the end position of PDSCH1. The E PDSCHs belong to PDSCHs in different HARQ-ACK process numbers in one serving cell.

Feature five: In a primary serving cell, a time domain resource intersection between a PDSCH scrambled by a C-RNTI or an MCS-C-RNTI and a PDSCH scrambled by a CS-RNTI is empty.

Feature six: In the same serving cell, a time domain resource intersection between a PDSCH scrambled by a C-RNTI, an MCS-C-RNTI or a CS-RNTI and a PDSCH scrambled by an RA-RNTI is empty.

Feature seven: In RRC_IDLE and RRC_INACTIVE modes, a time domain resource intersection between two PDSCHs scrambled by an SI-RNTI, a P-RNTI, an RA-RNTI or a TC-RNTI is allowed to be non-empty.

In an embodiment, the E PDSCHs satisfy at least one of the following features: The E PDSCHs belong to one serving cell, each PDSCH has a corresponding process number, or each PDSCH is scheduled by a downlink PDCCH.

The N types of information include at least one of first-type information or second-type information. When the value of N is equal to 1, the combination value of the N types of information is the value of one type of information.

In an embodiment, the number of combination values of the N types of information is associated with the maximum number of code words that can be included in a PDSCH.

For example, when the number of combination values of the N types of information is less than a predetermined value, for example, less than 2, the maximum number of code words included in one PDSCH belongs to {1, 2}; and when the number of combination values of the N types of information is greater than or equal to a predetermined value, for example, equal to 2, the maximum number of code words included in one PDSCH belongs to {1}. That is, the number of code words included in one PDSCH cannot exceed 1 at this time. The preceding constraints are placed to ensure that the number of code words of every PDSCH does not exceed 2 when two TRPs are dynamically scheduled independently of each other.

In an embodiment, a time interval between a PDSCH and a PDCCH scheduling the PDSCH is associated with at least one of the following: a transmission mode set supported by the PDSCH; or a mapping mode between resources occupied by the PDSCH and multiple TCIs corresponding to the PDSCH. When the time interval is less than a predetermined threshold, the transmission mode set supported by the PDSCH is set 1, and the mapping mode between resources occupied by the PDSCH and multiple TCIs corresponding to the PDSCH is mapping mode 1. When the time interval is greater than or equal to a predetermined threshold, the transmission mode set supported by the PDSCH is set 2, and the mapping mode between resources occupied by the PDSCH and multiple TCIs corresponding to the PDSCH is mapping mode 2.

In this embodiment, resources occupied by the PDSCH include one or more of the following: time domain resources, frequency domain resources or demodulation reference signal group resources. The transmission mode includes the following:

Mode one: One TB corresponds to two demodulation reference signal groups, a time and frequency resource intersection between data corresponding to the two demodulation reference signal groups is non-empty, and a time and frequency resource set difference between data corresponding to the two demodulation reference signal groups is empty.

Mode two: One TB corresponds to two demodulation reference signal groups, and a frequency domain resource set difference between data corresponding to the two demodulation reference signal groups is non-empty.

Mode three: The number of transmission repetitions of one TB in one slot is greater than 1.

Mode four: The number of transmission repetitions of one TB among slots is greater than 1.

One demodulation reference signal group corresponds to one TCI (also called one TCI state). One TCI includes quasi co-location reference signals associated with different quasi co-location parameters. Demodulation reference signals in one demodulation reference signal group satisfy a quasi co-location relationship. Demodulation reference signals in different demodulation reference signal groups do not necessarily satisfy a quasi co-location relationship.

In an embodiment, the number of combination values of the N types of information is associated with whether a TCI pool corresponding to a frequency domain bandwidth corresponding to the N types of information satisfies a predetermined condition. The predetermined condition includes that no TCI in the TCI pool includes a quasi co-location reference signal associated with QCL-TypeD (Spatial Rx parameter).

When the number of combination values of the N types of information is greater than a predetermined value (for example, the predetermined value is 1 or another threshold), no TCI in a TCI pool corresponding to a frequency domain bandwidth where a PDSCH corresponding to the N types of information is located includes a quasi co-location reference signal associated with QCL-TypeD, that is, the predetermined condition is satisfied.

The TCI pool corresponding to the frequency domain bandwidth where the PDSCH is located includes one of the following: a TCI pool configured by an RRC to correspond to the frequency domain bandwidth, or a TCI pool activated for the frequency domain bandwidth set by an MAC-CE to correspond to the PDSCH.

Alternatively, whether a TCI pool corresponding to one frequency domain bandwidth needs to satisfy the predetermined condition is determined according to the relationship between the predetermined threshold and the number (or the maximum number) of PDSCHs between which the time domain resource intersection is non-empty in this frequency domain bandwidth. For example, in one BWP/serving cell, when the number of PDSCHs between which the time domain resource intersection is non-empty is greater than the predetermined value (for example, 1), a TCI pool in the BWP/serving cell needs to satisfy the predetermined condition. Otherwise, the TCI pool in the BWP/serving cell does not need to satisfy the predetermined condition. In an embodiment, the TCI pool satisfies the predetermined condition as long as the maximum number of PDSCHs between which the time domain resource intersection is non-empty in one frequency domain bandwidth is greater than the predetermined value. In another embodiment, the TCI pool satisfies the predetermined condition only when the number of actually received PDSCHs between which the time domain resource intersection is non-empty is greater than the predetermined value.

Alternatively, in an embodiment, when the number of actually received PDSCHs between which the time domain resource intersection is non-empty in one frequency domain bandwidth is greater than the predetermined value, the PDSCHs between which the time domain resource intersection is non-empty satisfy a quasi co-location relationship with respect to a Spatial Rx parameter. Alternatively, a set constituted by a quasi co-location relationship of the PDSCHs between which the time domain resource intersection is non-empty with respect to a Spatial Rx parameter can be received by a terminal at the same time.

In an embodiment, one PUCCH resource index corresponds to I parameter sets, where I is an integer greater than 1, and one parameter set includes at least one of the following: spatial relationship information, power information or timing advance information. The spatial relationship information is used for configuration of spatial filter information of a PUCCH resource corresponding to the PUCCH resource index. Which parameter set of the I parameter sets is used by the current PUCCH resource corresponding to the PUCCH resource index scheduled by a PDCCH is determined according to a combination value of the N types of information corresponding to the PDCCH scheduling the PUCCH resource index.

Figure 27:
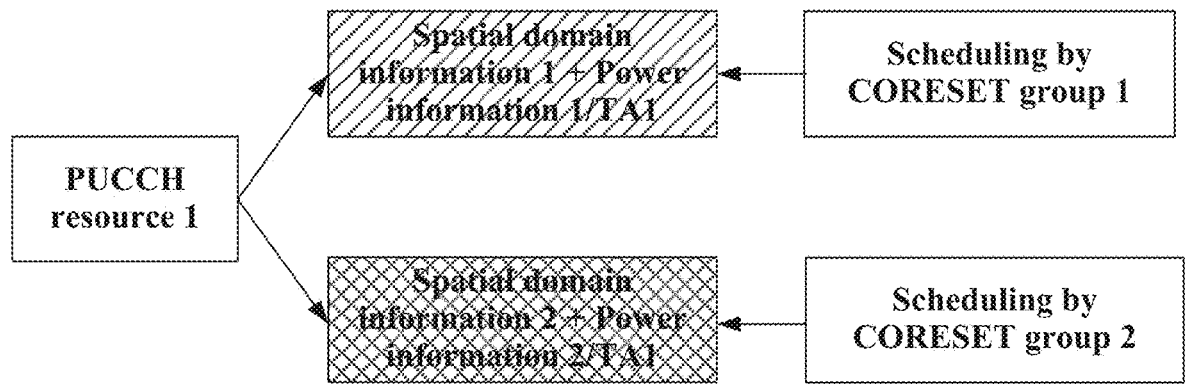
FIG. 27 is a diagram illustrating that one PUCCH resource index corresponds to multiple parameter sets and that a parameter corresponding to one PUCCH resource corresponding to the one PUCCH resource index is determined according to a CORESET group according to an embodiment.

FIG. 27 is a diagram illustrating that one PUCCH resource index corresponds to multiple parameter sets and that a parameter corresponding to one PUCCH resource corresponding to the one PUCCH resource index is determined according to a CORESET group according to an embodiment. As shown in FIG. 27, PUCCH resource 1 corresponds to 2 parameter sets. Which one of the 2 parameter sets constitutes the parameters of the PUCCH resource corresponding to the currently transmitted PUCCH resource 1 is determined according to the CORESET group ID scheduling PUCCH resource 1. PUCCH resource 1 has only one set of other information, for example, time domain symbol information, frequency domain resource, PUCCH format information and demodulation reference signal (DMRS) information. In this manner, different CORESET groups can share one set of PUCCH super configuration, but at least one of the following information may be configured for the same PUCCH resource ID: spatial relationship information, power information or timing advance information. Since only time domain symbol information is configured for one PUCCH resource ID in the PUCCH super set, the same PUCCH resource ID may be configured to be present in different slots so that the same PUCCH resource ID may correspond to multiple actually sent PUCCH resources. A correspondence exists between combination values of the N types of information and the I sets of information. The N types of information include at least one of first-type information or second-type information. When the value of N is equal to 1, the combination value of the N types of information is the value of one type of information.

Figure 28:
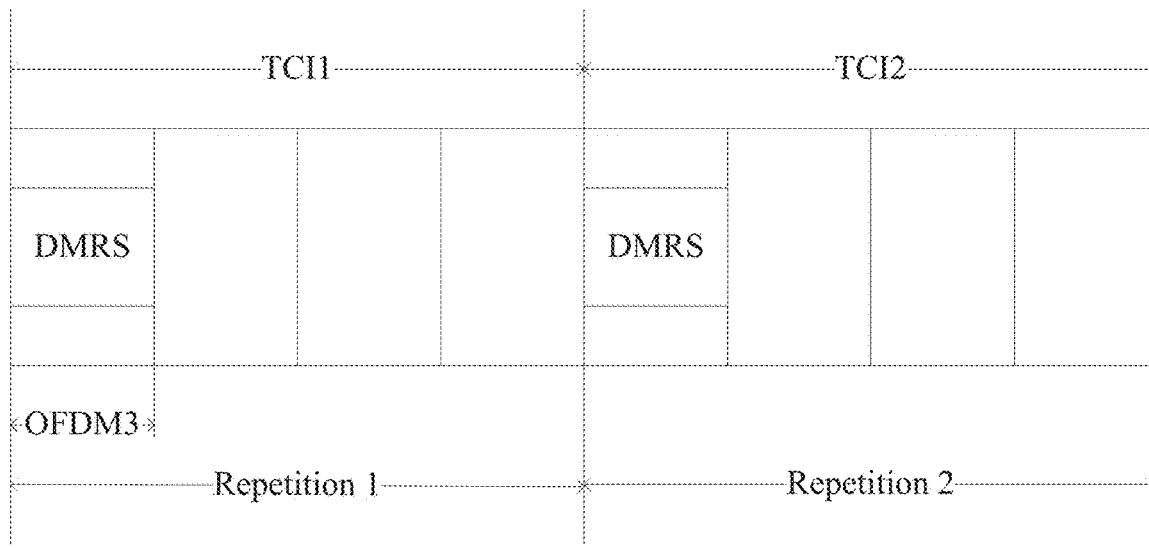
FIG. 28 is a diagram illustrating that the number of transmission repetitions is determined according to the number of TCIs according to an embodiment.

FIG. 28 is a diagram illustrating that the number of transmission repetitions is determined according to the number of TCIs according to an embodiment. In an embodiment, at most 2 repetitions are allowed within one slot. For example, an RRC configures the maximum number of repetitions supportable within one slot and determines the actual number of transmission repetitions within the slot according to the number of TCIs notified in DCI. If the notified number of TCIs is 1, the number of transmission repetitions is 1. If the notified number of TCIs is 2, the number of transmission repetitions within the slot is 2. The number of repetitions within the slot is determined by the number of TCIs. When there are both transmission repetitions within one slot and transmission repetitions between slots, the number of transmission repetitions within one slot cannot be greater than 1. As shown in FIG. 28, the method of this embodiment reduces the DMRS load.

Figure 29:
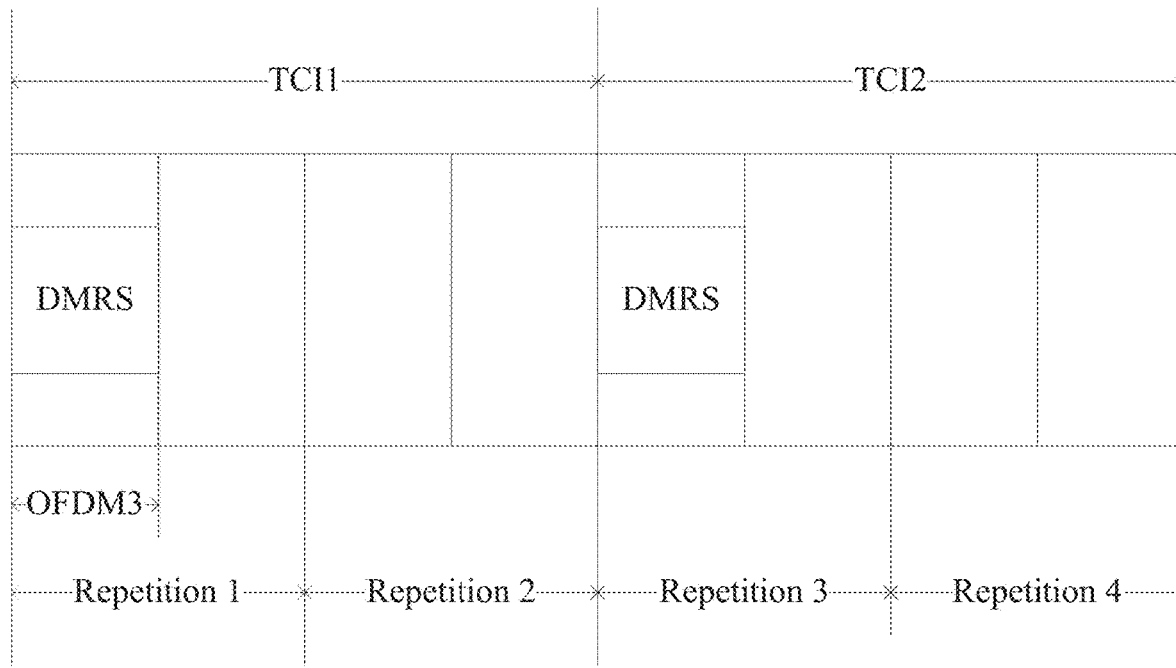
FIG. 29 is a diagram illustrating that a DMRS pattern is determined according to the number of time domain symbols corresponding to one TCI according to an embodiment.

FIG. 29 is a diagram illustrating that a DMRS pattern is determined according to the number of time domain symbols corresponding to one TCI according to an embodiment. In an embodiment, a pattern notified in DCI is a DMRS pattern of a unit including a time domain resource set corresponding to one TCI. The DMRS pattern is repeated in time domain resources of different TCIs, but the number of resource elements (REs) available for each repetition varies with the repetitions. The number of information bits included in a TB in a PDSCH is obtained according to a predetermined number of transmission repetitions. For example, a TBS is calculated according to the number of REs with a DMRS and an MCS notified in DCI, with no repetition of the DMRS. For example, in FIG. 29, rate matching is performed in repetition 2 and in repetition 4 independently of each other.

In an embodiment, it can be specified that when m-th-type indication information is not configured or is not enabled, the value of the m-th-type indication information is the default value, for example, 0, and the number of pieces of the m-th-type indication information is equal to 1, where m belongs to {one, two}. In this case, a combination value of {first-type information, second-type information} may also be referred to as one type of value among them. For example, when the second-type information is not configured or is not enabled, the preceding combination value of {first-type information, second-type information} is equivalent to a first-type information value because the second-type information has only one value. In this case, other information is acquired according to the combination value of {first-type information, second-type information}, that is, other information is acquired according to the first-type information. For example, when the first-type information is not configured or is not enabled, the preceding combination value of {first-type information, second-type information} is equivalent to a second-type information value because the first-type information has only one value. In this case, other information is acquired according to the combination value of {first-type information, second-type information}, that is, other information is acquired according to the second-type information.

In the preceding embodiments, that other information is acquired according to {first-type information, second-type information} is also referred to as that other information is acquired according to first-type information and/or second-type information.

In the preceding embodiments, the uplink feedback resource includes at least one of a PUCCH resource or a PUSCH resource, and the uplink channel includes at least one of a PUCCH or a PUSCH.

In the preceding embodiments, an example is used in which the first-type information has at most 2 values, and the second-type information has at most 2 values. In another embodiment, the first-type information may have more than 2 values, and the second-type information may have more than 2 values.

In the preceding embodiments, the first-type information may be implemented as follows: The first-type information is introduced into a CORESET, different first-type information may be used for distinguishing between different communication nodes, and/or the first-type information may be used for distinguishing between different HARQ-ACK codebooks, and different HARQ-ACK codebooks are fed back to different communication nodes. For example, the first-type information is configured in a CORESET, CORESETs corresponding to the same first-type information may be referred to as one CORESET group, and CORESETs corresponding to different first-type information belong to different CORESET groups. The first-type information may be explicitly configured in a CORESET, or different values of the first-type information may be represented by whether the first-type information is enabled in a CORESET. For example, that the first-type information is configured to be enabled in the CORESET indicates that the first-type information is 1, and that the first-type information is configured to be not enabled in the CORESET indicates that the first-type information is 0. Alternatively, that the first-type information is configured in the CORESET indicates that the first-type information is 1, and that the first-type information is not configured in the CORESET indicates that the first-type information is 0. Alternatively, the first-type information corresponding to PDSCH/CSI reporting is determined according to control channel resource information of DCI scheduling the PDSCH/CSI reporting, for example, the CORESETID of the DCI, the search space ID of the DCI or the PDCCH ID of the DCI.

In an embodiment, the smaller the CORESETID/search space ID/candidate PDCCH ID corresponding to the DCI scheduling the PDSCH/CSI reporting, the smaller the first-type information corresponding to the PDSCH/CSI reporting.

In an embodiment, the second-type information may be information about a control channel or PDSCH information. Different values of the same type of information of a control channel correspond to different values of the second-type information, and/or different values of the same type of information of a data channel correspond to different values of the second-type information. For example, information of a control channel includes one or more of the following: a DCI format (for example, different DCI formats correspond to different second-type information values); a DCI size (for example, different DCI sizes correspond to different second-type information values); an RNTI (for example, different RNTIs correspond to different second-type information values); a search space ID of DCI; a CORESET ID of DCI (different CORESET IDs correspond to different second-type information values, or second-type information value=mod (CORESET ID, 2), where mod (x, y) denotes the remainder of a division of x by y); or information included in DCI (that is, the DCI explicitly includes a second-type information value, where this information value and other information in the DCI may be jointly encoded, or this information value may be a independent bit field). For example, the information about the PDSCH includes at least one of the following: the number of time domain symbols and/or slots occupied by the PDSCH (for example, a PDSCH of which the number of time domain symbols and/or slots is less than a predetermined value corresponds to one value in the second-type information, and a PDSCH of which the number of time domain symbols and/or slots is greater than or equal to the predetermined value corresponds to another value in the second-type information); scrambling sequence generation parameter information of the PDSCH; demodulation reference signal information of the PDSCH; quasi co-location reference signal information corresponding to a demodulation reference signal of the PDSCH; or process number information of the PDSCH, for example, PDSCHs having different process number sets are of different types.

In an embodiment, the second-type information is used for distinguishing between at least one of the following: different types of PDSCHs; different HARQ-ACK codebooks; different values of the same type of information of PDSCHs (for example, different second-type information is used for indicating different channel scrambling information values, or when time domain resources of two PDSCHs have an intersection, different second-type information corresponding to the two PDSCHs indicates whether channel scrambling parameters used by the two PDSCHs are the same); the number R of transmission repetitions of one PDSCH (the number of transmission repetitions may also be referred to as aggregation, including the number of transmission repetitions within one slot, or the number of transmission repetitions between slots, or the total number of transmission repetitions within one slot and between slots, where different second-type information corresponds to different numbers of transmission repetitions); or a set of different PUCCH resources (also referred to as a PUCCH super set), where one PUCCH super set includes one or more pieces of UCIs, and each PUCCH set is associated with one UCI load range. A terminal selects one PUCCH super set according to the second-type information, then selects one PUCCH resource set from the selected PUCCH super set according to the UCI load, and finally selects one PUCCH resource from the selected one PUCCH resource set according to at least one of PUCCH resource selection information indicated in DCI or a predetermined rule. The selected one PUCCH resource is used for UCI transmission. The UCI includes HARQ-ACK information.

Figure 30:
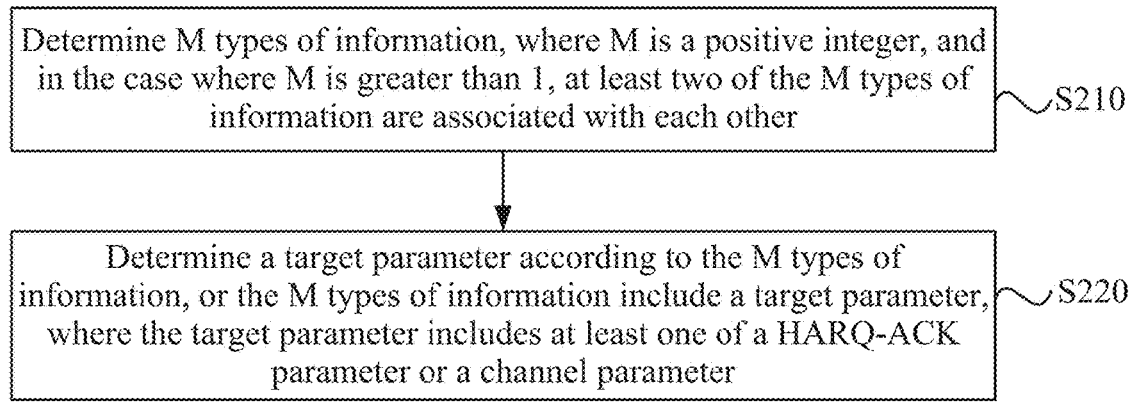
FIG. 30 is a flowchart of a target parameter determination method according to an embodiment.

An embodiment of the present application provides a target parameter determination method. FIG. 30 is a flowchart of a target parameter determination method according to an embodiment. As shown in FIG. 30, the target parameter determination method according to this embodiment includes S210 and S220.

In S210, M types of information are determined, where M is a positive integer, and in the case where M is greater than 1, at least two of the M types of information are associated with each other.

The M types of information in this embodiment are used for determining the target parameter for a HARQ-ACK feedback. For example, the M types of information may include first-type information and second-type information. The first-type information may be used for distinguishing between different communication nodes scheduling PDSCHs. The second-type information may be used for distinguishing between different types of PDSCHs. The target parameter is determined according to the first-type information and the second-type information. An association is established between the first-type information and the second-type information. Multiple communication nodes communicate with one type of terminal in the same frequency-domain bandwidth. HARQ-ACK information can be fed back for different types of PDSCHs. In this manner, the communication reliability is improved, the capability of the terminal during implementation is taken into account, the signaling overhead is reduced, and thus the system can operate effectively. In this embodiment, in the case where M is greater than 1, an association exists between at least two of the M types of information. This association may affect a value of the M types of information and may be used as a basis for determining the target parameter.

In S220, a target parameter is determined according to the M types of information, or the M types of information include a target parameter, where the target parameter includes at least one of a HARQ-ACK parameter or a channel parameter.

In this embodiment, the target parameter for the HARQ-ACK feedback may be determined according to the M types of information. For example, the HARQ-ACK codebook to be fed back may be determined according to the M types of information, and the feedback resource where the HARQ-ACK information to be fed back is located may be determined according to the M types of information. Alternatively, the M types of information include the target parameter.

In an embodiment, the M types of information include the following information: HARQ-ACK codebook type information, N types of information, and the number of PDSCHs whose time domain resources have an intersection.

The HARQ-ACK codebook type includes a semi-static codebook and a dynamic codebook.

The N types of information include at least one type of first-type information or second-type information, where N is a positive integer.

The PDSCHs whose time domain resources have an intersection belong to the same or different frequency domain bandwidths.

In an embodiment, the M types of information include fifth-type information and sixth-type information.

In this embodiment, the sixth-type information includes at least one of the following: a sequence of the HARQ-ACK information of the C downlink channels in HARQ-ACK information included in the one feedback resource; a feedback resource where the HARQ-ACK information of the C downlink channels is located; a processing sequence of DAIs corresponding to the C downlink channels; or the index of a PDCCH.

In an embodiment, the C downlink channels correspond to one combination value of a second-type information set, and C is a positive integer greater than 1.

In an embodiment, the feedback element includes at least one of the following: a feedback channel resource or a HARQ-ACK bit set.

In an embodiment, the second-type information set includes at least one of the following information: a PDCCH monitoring occasion, a serving cell where a PDSCH is located, a time unit where a HARQ-ACK is located, a combination value of the N types of information, a candidate PDSCH type, a feedback resource where a HARQ-ACK is located, or a HARQ-ACK bit set containing a HARQ-ACK.

In an embodiment, the N types of information include at least one type of first-type information or second-type information.

In an embodiment, the fifth-type information satisfies at least one of the following features: The fifth-type information includes at least one of information about a downlink channel or information about a downlink control channel corresponding to the downlink channel; or a difference value between the fifth-type information corresponding to the C downlink channels is not equal to 0.

In an embodiment, in the case where the downlink channel includes a PDSCH, a downlink control channel corresponding to the downlink channel includes a PDCCH scheduling the PDSCH.

In the case where the downlink channel includes a released SPS PDSCH, a downlink control channel corresponding to the downlink channel includes a PDCCH releasing the SPS PDSCH.

In an embodiment, the fifth-type information includes at least one of information about the downlink channel and information about the downlink control channel corresponding to the downlink channel in at least one of the manners below.

The information about the downlink control channel includes a third parameter.

The information about the downlink channel includes a fourth parameter.

The third parameter includes at least one of the following information: CORESET index information of the PDCCH scheduling the PDSCH, search space index information of the PDCCH scheduling the PDSCH, candidate PDCCH index information of the PDCCH scheduling the PDSCH, quasi co-location information of a demodulation reference signal of the PDCCH scheduling the PDSCH, or frequency domain index information of the PDCCH scheduling the PDSCH.

In an embodiment, in the case where the downlink channel includes a PDSCH, the fourth parameter includes at least one of the following information: resource information of the PDSCH; a demodulation reference signal information index of the PDSCH; or a quasi co-location reference signal information index corresponding to the demodulation reference signal of the PDSCH. The resource includes at least one of a time domain resource or a frequency domain resource.

In an embodiment, the M types of information include seventh-type information.

In an embodiment, the M types of information are determined in the following manner: In the case where the number of received PDSCHs in one type of candidate PDSCHs in one serving cell is less than a third predetermined value, the seventh-type information is determined according to at least one of signaling information or a third predetermined rule.

In an embodiment, the seventh-type information includes at least one of the following information: a semi-static HARQ-ACK codebook including HARQ-ACK information corresponding to the one type of candidate PDSCHs; or the number of groups of HARQ-ACK information corresponding to the one type of candidate PDSCHs and included in one HARQ-ACK feedback unit. In this embodiment, one group of HARQ-ACK information corresponds to one PDSCH or one TB.

In an embodiment, the feedback unit includes at least one of the following: one HARQ-ACK feedback time unit, one HARQ-ACK bit set, or one feedback channel including a HARQ-ACK.

In an embodiment, the M types of information include the maximum number of groups of HARQ-ACKs directed at one time domain resource of a downlink transport domain and included in one feedback unit; the maximum number of code words included in PDSCHs whose time domain resources have an intersection; and N types of information.

In this embodiment, the feedback unit includes at least one of the following: one HARQ-ACK feedback time unit, one HARQ-ACK bit set, or one feedback channel including a HARQ-ACK; and the N types of information include at least one type of first-type information or second-type information.

In an embodiment, the M types of information include the number of transmission repetitions of a PDSCH in one time unit and at least one of the following information: the maximum number of PDSCHs received by a terminal in one type of candidate PDSCHs; a feedback resource where HARQ-ACK information of the PDSCH is located; or a time domain resource intersection between two PDSCHs. In this embodiment, the number of transmission repetitions is a positive integer.

In an embodiment, the method further includes calculating the number of PDSCHs in one of the manners below.

A PDSCH repeatedly transmitted R times is counted as one PDSCH.

A PDSCH repeatedly transmitted one time among R transmission repetitions is counted as one PDSCH.

In this embodiment, R denotes the number of transmission repetitions of the PDSCH within one slot; and the number of PDSCHs includes the number of PDSCHs received by the terminal in the one type of candidate PDSCHs and the number of PDSCHs whose time domain resources have an intersection.

In an embodiment, the M types of information include the number of transmission repetitions of a PDSCH in one time unit; and a time interval included in a PDCCH scheduling a PDSCH, where the time interval is a time interval between the PDSCH and a feedback resource where a HARQ-ACK of the PDSCH is located. In this embodiment, the time interval is between the end position of the PDSCH in a predetermined number of transmission repetitions of the PDSCH in one time unit and the feedback resource where the HARQ-ACK of the PDSCH is located. In the case where the number of time units occupied by the PDSCH is greater than 1, the one time unit is the last time unit where the PDSCH is located.

In an embodiment, the M types of information include first-type information and second-type information, where the first-type information is associated with the second-type information.

In an embodiment, the first-type information and the second-type information satisfy at least one of the features below.

The first-type information and the second-type information are acquired in different manners.

One first-type set corresponding to one information value of the first-type information includes at least two set elements, and the at least two set elements correspond to different second-type information values.

One information value of the first-type information corresponds to one first-type downlink control channel element, and the first-type downlink control channel element includes at least two second-type downlink control channel elements, where two second-type downlink channel elements correspond to different second-type information values.

In the case where the number of values of the first-type information is 1, the N types of information include the second-type information.

In the case where the number of values of the second-type information is 1, the N types of information include the first-type information.

In the case where a time domain resource intersection between two PDSCHs corresponding to different values of the first-type information is non-empty, a frequency domain resource intersection between the two PDSCHs is non-empty.

In the case where a time domain resource intersection between two PDSCHs corresponding to different values of the second-type information is non-empty, a frequency domain resource intersection between the two PDSCHs is empty.

In the case where a time and frequency resource intersection between two PDSCHs corresponding to different values of the first-type information is non-empty, the two PDSCHs are received at the intersection.

In the case where a time and frequency resource intersection between two PDSCHs corresponding to different values of the second-type information is non-empty, only one of the two PDSCHs is received at the intersection.

Different values of the first-type information correspond to two types of PDSCHs, and a set difference between time domain symbol number sets of the two types of PDSCHs in one slot is empty.

Different values of the first-type information correspond to two types of PDSCHs, and each of the two types of PDSCHs corresponds to one channel scrambling parameter.

Different values of the second-type information correspond to two types of PDSCHs, and the two types of PDSCHs share one channel scrambling parameter.

Different combination values of the first-type information and the second-type information correspond to different HARQ-ACK bit sets.

The first-type information includes group information in a control resource set (CORESET).

Different values of the second-type information correspond to different PUCCH resource sets.

A mapping relationship exists between a combination value of the first-type information and the second-type information and a first-type set.

In an embodiment, the first-type set includes at least one of the following: a downlink channel set, a HARQ-ACK bit set, an uplink channel set including HARQ-ACK information, or a downlink control channel element set. In this embodiment, the HARQ-ACK information is about a downlink channel, and a downlink control channel element in the downlink control channel element set corresponds to the downlink channel corresponding to the HARQ-ACK information.

In an embodiment, the first-type information is associated with the second-type information in one of the manners below.

The first-type information is associated with the second-type information in terms of configuration; or the first-type information and the second-type information corresponding to PDSCHs whose HARQ-ACKs fall within a same time unit are associated with each other.

The two types of information are associated with each other in at least one of the manners below.

A value of one type of information is obtained according to a value of the other type of information.

A value range of one type of information is obtained according to a value of the other type of information.

A value range of one type of information is obtained according to a value range of the other type of information.

Certain value combinations of the two types of information are unable to exist simultaneously.

Certain values of the two types of information are unable to exist simultaneously.

Configuration information of one type of information includes the other type of information corresponding to the one type of information.

A correspondence between the two types of information is determined according to at least one of signaling information or an agreed rule.

The maximum number of combination values of the two types of information is not greater than a predetermined value.

One type of information is determined according to the number of values of the other type of information.

Configuration information of one type of information is associated with configuration information of the other type of information.

In the case where associated information elements belong to the same time unit, the two types of information are associated with each other.

Figure 31:
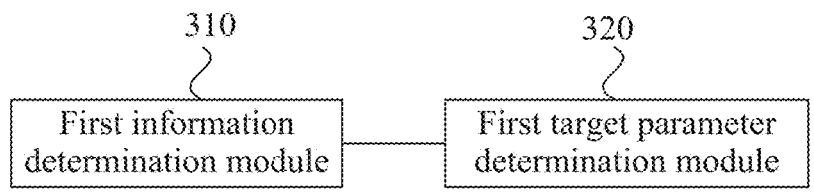
FIG. 31 is a diagram illustrating the structure of a target parameter determination apparatus according to an embodiment.

An embodiment of the present application provides a target parameter determination apparatus. FIG. 31 is a diagram illustrating the structure of a target parameter determination apparatus according to an embodiment. As shown in FIG. 31, the apparatus includes the modules below.

A first information determination module 310 is configured to determine N types of information, where N is a positive integer, and a mapping relationship exists between the N types of information and a first-type set.

A first target parameter determination module 320 is configured to determine a target parameter according to the N types of information, where the target parameter includes at least one of a HARQ-ACK parameter or a channel parameter.

In an embodiment, in the case where the target parameter includes the HARQ-ACK parameter, the first target parameter determination module 320 is configured in at least one of the manners below.

The HARQ-ACK parameter includes a HARQ-ACK feedback channel, and HARQ-ACK information of downlink channels which have the same combination value of the N types of information is included in the same HARQ-ACK feedback channel.

The HARQ-ACK parameter includes a HARQ-ACK feedback channel, and HARQ-ACK information of downlink channels which have different information values of at least one of the N types of information is included in different HARQ-ACK feedback channels.

The HARQ-ACK parameter includes a HARQ-ACK bit set, and HARQ-ACK information of downlink channels which have the same combination value of the N types of information is included in the same HARQ-ACK bit set.

The HARQ-ACK parameter includes a HARQ-ACK bit set, and HARQ-ACK information of downlink channels which have different information values of at least one of the N types of information is included in different bit sets.

In an embodiment, one time unit includes at least two HARQ-ACK bit sets, and physical uplink control channel (PUCCH) resources where different HARQ-ACK bit sets are located are indicated by different physical downlink control channels (PDCCHs).

The PDCCHs satisfy at least one of the features below.

Different PDCCHs correspond to different combination values of the N types of information.

Combination values of the N types of information corresponding to the PDCCHs are the same as combination values of the N types of information corresponding to the HARQ-ACK bit sets included in the PUCCH resources indicated by the PDCCHs.

Combination values of the N types of information corresponding to the PDCCHs are the same as combination values of the N types of information corresponding to the PUCCH resources indicated by the PDCCHs.

In an embodiment, the HARQ-ACK bit set satisfies at least one of the features below.

Different HARQ-ACK bit sets correspond to different candidate PDSCH type sets.

Each HARQ-ACK bit set corresponds to one HARQ-ACK codebook type, where the HARQ-ACK codebook type includes a semi-static codebook and a dynamic codebook.

At least two HARQ-ACK bit sets correspond to different HARQ-ACK codebook types.

Each HARQ-ACK bit set includes HARQ-ACK information of each type of candidate PDSCHs in a candidate PDSCH type set.

A HARQ-ACK bit sets include HARQ-ACK information of PDSCHs of the same type of candidate PDSCHs, where A is a non-negative integer less than or equal to the number of combination values of set-type information in the N types of information.

In the case where for one type of candidate PDSCHs, a downlink channel corresponding to a first combination value of the N types of information is not received, the state of whether a HARQ-ACK bit set corresponding to the first combination value includes HARQ-ACK information corresponding to the one type of candidate PDSCHs is determined according to at least one of signaling information or a first predetermined rule.

In the case where for one type of candidate PDSCHs, the number of received downlink channels is 0, at least one of the following is determined according to at least one of signaling information or a predetermined rule: a HARQ-ACK bit set containing default HARQ-ACK information of the one type of candidate PDSCHs; or the number of groups of HARQ-ACK information of the one type of candidate PDSCHs included in one HARQ-ACK bit set, where one group of HARQ-ACK information corresponds to one PDSCH, or one group of HARQ-ACK information corresponds to one transport block (TB).

The state of whether the HARQ-ACK bit set corresponding to the first combination value includes the HARQ-ACK information corresponding to the one type of candidate PDSCHs includes at least one of the following:

The HARQ-ACK bit set corresponding to the first combination value includes default HARQ-ACK information of the one type of candidate PDSCHs.

The HARQ-ACK bit set corresponding to the first combination value does not include default HARQ-ACK information of the one type of candidate PDSCHs.

The HARQ-ACK bit set corresponding to the first combination value includes HARQ-ACK information of another PDSCH of the one type of candidate PDSCHs, where a combination value of the N types of information corresponding to the another PDSCH is different from the first combination value.

In an embodiment, the HARQ-ACK bit set satisfies at least one of the features below.

The first predetermined rule includes determining the inclusion state according to a first parameter.

The second predetermined rule includes determining the HARQ-ACK bit set containing the default HARQ-ACK information according to a second parameter.

The first parameter includes at least one of the following: the number of HARQ-ACK bit sets included in one time unit; the number of HARQ-ACK bit sets included in one feedback resource; a relationship between the first combination value and a combination value of the N types of information corresponding to a received PDSCH in the one type of candidate PDSCHs; the number of received PDSCHs in the one type of candidate PDSCHs; the maximum number of received PDSCHs in the one type of candidate PDSCHs; the maximum number of received transport blocks (TBs) in the one type of candidate PDSCHs; a set of combination values of the N types of information corresponding to the serving cell where the one type of candidate PDSCHs are located; or information about the number of sets of parameters of the same type corresponding to the frequency domain bandwidth where the one type of candidate PDSCHs are located.

The time unit is a time unit where the HARQ-ACK bit set corresponding to the first combination value is located.

The feedback resource includes the HARQ-ACK bit set corresponding to the first combination value.

The second parameter includes at least one of the following: a HARQ-ACK bit set containing HARQ-ACK information of the one type of candidate PDSCHs; the number of HARQ-ACK bit sets included in one time unit; the number of HARQ-ACK bit sets included in one feedback resource; the maximum number of received PDSCHs in the one type of candidate PDSCHs; a set of combination values of the N types of information corresponding to the serving cell where the one type of candidate PDSCHs are located; the maximum number of received TBs in the one type of candidate PDSCHs; or information about the number of sets of parameters of the same type corresponding to the frequency domain bandwidth where the one type of candidate PDSCHs are located.

The number of HARQ-ACK bit sets containing default HARQ-ACK information of the one type of candidate PDSCHs is less than or equal to the number of combination values of the set-type information among the N types of information or less than or equal to the number of HARQ-ACK bit sets included in one time unit.

In an embodiment, in the case where the target parameter includes the HARQ-ACK parameter, the HARQ-ACK parameter includes a DAI for determining at least one of a bit sequence of HARQ-ACK information or a number of bits of HARQ-ACK information.

In an embodiment, the DAI satisfies at least one of the features below.

DAIs corresponding to different values of the N types of information are counted separately.

T-DAI information in the DAI includes a cumulative number of PDCCH monitoring occasion-serving cell pairs that satisfy a first predetermined feature and exist until a PDCCH monitoring occasion-serving cell pair corresponding to a PDCCH where the DAI is located.

C-DAI information in the DAI includes a total number of PDCCH monitoring occasion-serving cell pairs that satisfy a first predetermined feature and exist until a PDCCH monitoring occasion corresponding to a PDCCH where the DAI is located.

One HARQ-ACK bit set includes multiple groups of HARQ-ACK bits, each group of HARQ-ACK bits corresponds to one DAI, and DAIs corresponding to the multiple groups of HARQ-ACK bits correspond to the same combination value of the N types of information, where a DAI corresponding to one group of HARQ-ACK bits includes a DAI included in a PDCCH scheduling the HARQ-ACK information.

A combination value of the N types of information corresponding to one HARQ-ACK bit set is the same as a combination value of the N types of information corresponding to HARQ-ACK bits included in the one HARQ-ACK bit set.

The DAI includes the C-DAI, or the DAI includes the C-DAI and the T-DAI.

In an embodiment, the serving cell satisfies at least one of the following:

The serving cell is a serving cell where a PDCCH is located or a serving cell where a PDSCH scheduled by a PDCCH is located.

One PDCCH monitoring occasion-serving cell pair corresponds to one downlink channel. The downlink channel includes at least one of the following: a PDSCH; or a PDCCH releasing an SPS PDSCH.

The first predetermined feature includes at least one of the following:

Combination values of the N types of information corresponding to the PDCCH monitoring occasion-serving cell pairs are the same.

HARQ-ACK information of downlink channels corresponding to the PDCCH monitoring occasion-serving cell pairs falls within the same feedback unit.

The feedback unit includes at least one of the following: one HARQ-ACK feedback time unit, one HARQ-ACK bit set, or one feedback channel including a HARQ-ACK.

In an embodiment, the DAI satisfies at least one of the features below.

DAIs corresponding to different combination values of the N types of information are counted in a uniform manner.

A processing sequence of DAIs in multiple PDCCHs corresponding to different combination values of the N types of information is determined according to at least one of signaling information or a predetermined rule.

T-DAI information in the DAI includes a cumulative number of PDCCH monitoring occasion-serving cell pairs that satisfy a second predetermined feature and exist until a PDCCH monitoring occasion-serving cell pair corresponding to a PDCCH where the DAI is located.

C-DAI information in the DAI includes a total number of PDCCH monitoring occasion-serving cell pairs that satisfy a second predetermined feature and exist until a PDCCH monitoring occasion corresponding to a PDCCH where the DAI is located.

The DAI includes the C-DAI, or the DAI includes the C-DAI and the T-DAI.

In an embodiment, a processing sequence of DAIs in multiple PDCCHs corresponding to different combination values of the N types of information is determined according to at least one of signaling information or a predetermined rule in at least one of the manners below.

The processing sequence of the DAIs in the multiple PDCCHs corresponding to the different combination values of the N types of information is determined according to indexes of the combination values of the N types of information.

The processing sequence is determined in the following manner: The multiple PDCCHs are ordered in ascending order of each of the N types of information.

The multiple PDCCHs are the same in terms of at least one of the following information: a PDCCH monitoring occasion, a serving cell where a PDCCH is located, a serving cell where a PDSCH scheduled by a PDCCH is located, a time unit where HARQ-ACK information corresponding to a PDCCH is located, a HARQ-ACK bit set containing HARQ-ACK information corresponding to a PDCCH, or a HARQ-ACK feedback resource where HARQ-ACK information corresponding to a PDCCH is located.

One processing of the DAI in one PDCCH of the multiple PDCCHs includes at least one of the following:

The state of a progressive increase of second predetermined information is determined according to a relationship between the C-DAI in the one PDCCH and first predetermined information; first predetermined information is updated to the C-DAI information in the one PDCCH; or third predetermined information is updated to the C-DAI or the T-DAI according to a relationship between the T-DAI in the one PDCCH and an empty set.

The first predetermined information is used for determining a position where a HARQ-ACK bit corresponding to the PDCCH is located in a HARQ-ACK bit set to which the HARQ-ACK bit belongs.

The second predetermined information is used for determining at least one of a position where a HARQ-ACK bit corresponding to the PDCCH is located in a HARQ-ACK bit set containing the HARQ-ACK bit.

The third predetermined information is used for determining the number of bits included in a HARQ-ACK bit set.

In an embodiment, the second predetermined feature includes at least one of the following:

Combination values of the N types of information corresponding to the PDCCH monitoring occasion-serving cell pairs are the same.

HARQ-ACK information of downlink channels corresponding to the PDCCH monitoring occasion-serving cell pairs falls within the same feedback unit. The feedback unit includes at least one of the following: one HARQ-ACK feedback time unit, one HARQ-ACK bit set, or one feedback channel including a HARQ-ACK.

In an embodiment, in the case where the target parameter includes the HARQ-ACK parameter, the HARQ-ACK parameter includes an uplink feedback resource where a HARQ-ACK is located.

The target parameter is determined according to the N types of information in the manner below.

The uplink feedback resource is determined according to uplink feedback resource information indicated in a PDCCH, where the PDCCH includes a PDCCH satisfying a predetermined feature among multiple PDCCHs corresponding to multiple groups of HARQ-ACK information, and the uplink feedback resource includes the multiple groups of HARQ-ACK information.

An acquisition parameter of the PDCCH satisfying the predetermined feature includes the N types of information; or in the case where a predetermined condition is satisfied, an acquisition parameter of the PDCCH satisfying the predetermined feature includes the N types of information.

In an embodiment, the PDCCHs satisfy at least one of the features below.

The PDCCH satisfying the predetermined feature includes a PDCCH having the largest index among the multiple PDCCHs, where an acquisition parameter of the indexes of the multiple PDCCHs includes the N types of information or where an acquisition parameter of the indexes of the multiple PDCCHs includes the N types of information, a PDCCH monitoring occasion index, and a serving cell index corresponding to the PDCCH.

The PDCCH satisfying the predetermined feature includes a PDCCH having the largest index among multiple PDCCHs corresponding to predetermined combination values of the N types of information, where an acquisition parameter of the indexes of the multiple PDCCHs does not include the N types of information.

The predetermined condition includes at least one of the following:

One PDCCH monitoring occasion includes more than one PDCCH that schedules PDSCHs belonging to one serving cell.

The multiple PDCCHs include at least two PDCCHs in one PDCCH monitoring occasion, and PDSCHs corresponding to the two PDCCHs are located in one serving cell.

DAIs corresponding to different combination values of the N types of information are counted in a uniform manner.

The uplink feedback resource includes HARQ-ACK bits corresponding to different combination values of the N types of information.

In an embodiment, the first-type set satisfies at least one of the features below.

The number of first-type sets is determined according to the number of combination values of set-type information among the N types of information.

The number of first-type sets included in one time unit is less than or equal to the number of combination values of set-type information among the N types of information.

The maximum number of PUCCH resources included in one time unit is determined according to the number of combination values of set-type information among the N types of information.

HARQ-ACK information corresponding to the same type of candidate PDSCHs is included in H first-type sets, where H is less than or equal to the number of combination values of set-type information among the N types of information or where H is less than or equal to the number of first-type sets included in one time unit; and where the H first-type sets include HARQ-ACK information of the same or different PDSCHs in the same type of candidate PDSCHs.

In an embodiment, H is determined in one of the manners below.

H is determined according to the maximum number of received PDSCHs in the same type of candidate PDSCHs.

H is determined according to the number of actually received PDSCHs in the same type of candidate PDSCHs.

In an embodiment, in the case where the target parameter includes the HARQ-ACK parameter, at least one of the following applies:

A loop of each of the N types of information is included in a process of determining a HARQ-ACK bit set included in one HARQ-ACK feedback resource.

A loop of combination values of the N types of information is included in a process of determining a HARQ-ACK bit set included in one HARQ-ACK feedback resource.

The HARQ-ACK parameter includes the HARQ-ACK bit set included in the one HARQ-ACK feedback resource.

In an embodiment, in the case where the target parameter includes the channel parameter, the channel parameter includes a PDCCH parameter, and a PDCCH satisfies at least one of the following:

In one PDCCH monitoring occasion, at most one PDCCH in one type of PDCCH is received.

In one PDCCH monitoring occasion, in the case where the number of PDCCHs scheduling PDSCHs is greater than 1, different PDCCHs are different in terms of an information value of at least one type of information in a first-type information set.

The one type of PDCCH corresponds to one combination value of the first-type information set.

In an embodiment, the first-type information set satisfies at least one of the following:

In the case where HARQ-ACK information included in one dynamic HARQ-ACK codebook corresponds to two or more combination values of set-type information among the N types of information, the first-type information set includes the N types of information.

In the case where HARQ-ACK information included in one dynamic HARQ-ACK codebook corresponds to less than two combination values of set-type information among the N types of information, the first-type information set does not include the N types of information.

The first-type information set includes one of the following: the N types of information, a time unit where a HARQ-ACK corresponding to a PDCCH is located, and a serving cell where a PDSCH scheduled by the PDCCH is located; a time unit where a HARQ-ACK corresponding to a PDCCH is located and a serving cell where a PDSCH scheduled by the PDCCH is located; the N types of information, a time unit where a HARQ-ACK corresponding to a PDCCH is located, and a serving cell where the PDCCH is located; or a time unit where a HARQ-ACK corresponding to a PDCCH is located and a serving cell where the PDCCH is located.

In an embodiment, in the case where the target parameter includes the HARQ-ACK parameter, at least one of the following also applies:

For multiple HARQ-ACK bit sequences falling within the same time unit, the arrangement sequence of the multiple HARQ-ACK bit sequences in one combination HARQ-ACK bit sequence is determined according to the N types of information. The HARQ-ACK parameter includes a HARQ-ACK bit sequence.

For multiple downlink channels whose HARQ-ACKs fall within the same time unit, the positions where the HARQ-ACKs of the multiple downlink channels are located in one combination HARQ-ACK bit sequence are determined according to combination values of the N types of information corresponding to the multiple downlink channels. The HARQ-ACK parameter includes a HARQ-ACK bit position.

For multiple HARQ-ACK bit sequences falling within the same time unit, a mapping relationship between the multiple HARQ-ACK bit sequences and X combination HARQ-ACK bit sequences is determined according to the N types of information. X is a positive integer. The HARQ-ACK parameter includes a combination HARQ-ACK bit sequence.

For multiple downlink channels whose HARQ-ACKs fall within the same time unit, a mapping relationship between HARQ-ACKs of the multiple downlink channels and multiple combination HARQ-ACK bit sequences is determined according to combination values of the N types of information corresponding to the multiple downlink channels. The HARQ-ACK parameter includes a combination HARQ-ACK bit sequence.

In the case where the number F of HARQ-ACK bit sequences falling within the same time unit exceeds a predetermined threshold, HARQ-ACK bit sequences sent in the time unit are determined according to the priority of values of the N types of information. The number of the sent HARQ-ACK bit sequences is less than F. The HARQ-ACK parameter includes a HARQ-ACK bit sequence.

In the case where the number F of HARQ-ACK bit sequences falling within the same time unit exceeds a predetermined threshold, the number G of HARQ-ACK bit sequences sent in the time unit later than the preceding time unit is determined according to the priority of values of the N types of information. G is less than or equal to F. The HARQ-ACK parameter includes a HARQ-ACK bit sequence.

In the case where the number of uplink channels satisfying the predetermined feature and included in one time unit exceeds a predetermined threshold, HARQ-ACK bit sequences sent in the time unit are determined according to the priority of values of the N types of information. The HARQ-ACK parameter includes a HARQ-ACK bit sequence.

One combination HARQ-ACK bit sequence is determined according to an information value loop rule of the N types of information. The HARQ-ACK parameter includes a HARQ-ACK bit sequence.

The maximum number of combination HARQ-ACK bit sequences included in one time unit is determined according to the number of values of predetermined-type information among the N types of information. The HARQ-ACK parameter includes a combination HARQ-ACK bit sequence.

Different HARQ-ACK bit sequences among the multiple HARQ-ACK bit sequences correspond to different combination values of the N types of information; or downlink channel elements corresponding to different HARQ-ACK bit sequences correspond to different combination values of the N types of information.

In an embodiment, for multiple HARQ-ACK bit sequences falling within the same time unit, the arrangement sequence of the multiple HARQ-ACK bit sequences in one combination HARQ-ACK bit sequence is determined according to the N types of information in one of the manners below.

In the case where the N types of information include first-type information and second-type information, the multiple HARQ-ACK bit sequences first increase progressively according to the first-type information and then increase progressively according to the second-type information so that the arrangement sequence of the multiple HARQ-ACK bit sequences in one combination HARQ-ACK bit sequence is obtained.

In the case where the N types of information include first-type information and second-type information, the multiple HARQ-ACK bit sequences first increase progressively according to the second-type information and then increase progressively according to the first-type information so that the arrangement sequence of the multiple HARQ-ACK bit sequences in one combination HARQ-ACK bit sequence is obtained.

In the case where the N types of information include first-type information, the multiple HARQ-ACK bit sequences increase progressively according to the first-type information so that the arrangement sequence of the multiple HARQ-ACK bit sequences in one combination HARQ-ACK bit sequence is obtained.

In the case where the N types of information include second-type information, the multiple HARQ-ACK bit sequences increase progressively according to the second-type information so that the arrangement sequence of the multiple HARQ-ACK bit sequences in one combination HARQ-ACK bit sequence is obtained.

In an embodiment, for multiple HARQ-ACK bit sequences falling within the same time unit, a mapping relationship between the multiple HARQ-ACK bit sequences and X combination HARQ-ACK bit sequences is determined according to the N types of information. X is a positive integer in one of the manners below.

HARQ-ACK bit sequences corresponding to the same first-type information among the multiple HARQ-ACK bit sequences are mapped to one combination HARQ-ACK bit sequence.

HARQ-ACK bit sequences corresponding to the same second-type information among the multiple HARQ-ACK bit sequences are mapped to one combination HARQ-ACK bit sequence.

HARQ-ACK bit sequences corresponding to the same first-type information among the multiple HARQ-ACK bit sequences are mapped to one combination HARQ-ACK bit sequence according to the loop order of the second-type information.

HARQ-ACK bit sequences corresponding to the same second-type information among the multiple HARQ-ACK bit sequences are mapped to one combination HARQ-ACK bit sequence according to the loop order of the first-type information.

In the case where the second-type information corresponding to the multiple HARQ-ACK bit sequences is equal to a third predetermined value, the multiple HARQ-ACK bit sequences are mapped to different combination HARQ-ACK bit sequences.

HARQ-ACK bit sequences having a non-empty intersection between PUCCH resources corresponding to the multiple HARQ-ACK bit sequences are mapped to one combination HARQ-ACK bit sequence, where a PUCCH resource corresponding to one HARQ-ACK bit sequence is acquired by information indicated in a PDCCH of a predetermined number among multiple PDCCHs corresponding to the one HARQ-ACK bit sequence.

In an embodiment, X satisfies at least one of the features below.

In the case where the number D of HARQ-ACK bit sequences included in one time unit is less than a fourth predetermined value, X is equal to D.

In the case where the number D of HARQ-ACK bit sequences included in one time unit is greater than or equal to a fourth predetermined value, X is less than D.

In the case where the number E of channel elements satisfying the predetermined feature and included in one time unit is less than a fifth predetermined value, X is equal to D.

In the case where the number E of channel elements satisfying the predetermined feature and included in one time unit is greater than or equal to a fifth predetermined value, X is less than D.

The value of X is determined according to an intersection between PUCCH resources corresponding to the multiple HARQ-ACK bit sequences, where a PUCCH resource corresponding to one HARQ-ACK bit sequence is acquired by information indicated in a PDCCH of a predetermined number among multiple PDCCHs corresponding to the one HARQ-ACK bit sequence.

The channel elements satisfying the predetermined feature include one of the following: a PUCCH, a PUCCH including a HARQ-ACK, a PUSCH, a PUSCH including a HARQ-ACK, channel elements between which an intersection is empty, or channel elements between which a time domain resource intersection is empty.

In an embodiment, a combination HARQ-ACK bit sequence satisfies at least one of the features below.

One combination HARQ-ACK bit sequence is included in one feedback resource.

X combination HARQ-ACK bit sequences are included in X feedback resources.

X combination HARQ-ACK bit sequences are included in X feedback resources in the same time unit.

One combination HARQ-ACK bit sequence includes one HARQ-ACK codebook consisting of multiple HARQ-ACK subcodebooks, where one HARQ-ACK bit sequence includes one HARQ-ACK subcodebook.

One combination HARQ-ACK bit sequence includes a combination HARQ-ACK codebook consisting of multiple HARQ-ACK codebooks, where one HARQ-ACK bit sequence includes one HARQ-ACK codebook.

In an embodiment, the apparatus further includes a sixth-type information determination module.

The sixth-type information determination module is configured to, in the case where one feedback resource includes HARQ-ACK information of C downlink channels and C is greater than 1, determine sixth-type information according to fifth-type information. The sixth-type information includes at least one of the following: a position where the HARQ-ACK information of the C downlink channels is located in HARQ-ACK information included in the one feedback resource; a position where the HARQ-ACK information of the C downlink channels is located in HARQ-ACK information included in one HARQ-ACK bit set; a feedback resource where the HARQ-ACK of the C downlink channels is located; or a processing sequence of DAIs corresponding to the C downlink channels. C is a positive integer greater than 1, and the C downlink channels correspond to one combination value of a second-type information set.

The second-type information set includes at least one of the following information: a PDCCH monitoring occasion, a serving cell where a PDSCH is located, the N types of information, a time unit where a HARQ-ACK is located, a feedback resource where a HARQ-ACK is located, a HARQ-ACK bit set containing a HARQ-ACK, or a candidate PDSCH type.

The PDSCH is a PDSCH corresponding to the downlink channels.

The HARQ-ACK parameter includes the sixth-type information, and the N types of information include the fifth information.

In an embodiment, the fifth-type information includes at least one of the following information: a calculation mode of DAIs corresponding to the C downlink channels, where the calculation mode includes separate calculation and unified calculation; information about a PDCCH corresponding to the downlink channels; or information about the downlink channels.

In an embodiment, the information about the PDCCH includes at least one of the following: control resource set (CORESET) index information of the PDCCH, search space index information of the PDCCH, candidate PDCCH index information of the PDCCH, quasi co-location (QCL) information of a demodulation reference signal of the PDCCH, or serving cell index information of the PDCCH.

In an embodiment, in the case where the target parameter includes the HARQ-ACK parameter, the N types of information satisfy at least one of the following:

A correspondence exists between B values of the second-type information and S sets of the HARQ-ACK parameter, where S is less than or equal to B, and B is a positive integer.

At least two values of the second-type information correspond to different HARQ-ACK parameters.

In an embodiment, the HARQ-ACK parameter includes at least one of the following: a parameter for acquisition of HARQ-ACK bits included in a HARQ-ACK bit set corresponding to a value of the second-type information; a parameter for acquisition of a HARQ-ACK bit sequence included in a HARQ-ACK bit set corresponding to a value of the second-type information; an uplink feedback resource where a HARQ-ACK bit is located; or a HARQ-ACK codebook type that includes a semi-static HARQ-ACK codebook and a dynamic HARQ-ACK codebook.

In an embodiment, the apparatus further includes a correspondence determination module.

The correspondence determination module is configured to determine a correspondence between Z PDSCHs and W groups of HARQ-ACK information, where the W groups of HARQ-ACK information are included in one HARQ-ACK feedback unit.

The correspondence determination module is configured to make one HARQ-ACK feedback unit include at most W groups of HARQ-ACK information for one time domain resource of a downlink transport domain, where the W groups of HARQ-ACK information correspond to Z PDSCHs in the one time domain resource of the downlink transport domain.

The correspondence determination module is configured to, in the case where the number Z1 of PDSCHs whose time domain resources have an intersection is greater than 1, the maximum number of transport blocks (TBs) included in the Z1 PDSCHs is less than a predetermined value, where the Z1 PDSCHs belong to one frequency domain bandwidth or include PDSCHs belonging to different frequency domain bandwidths.

The one HARQ-ACK feedback unit includes one of the following: one HARQ-ACK bit set or one time unit including a HARQ-ACK, where one group of HARQ-ACK information corresponds to one TB.

Z is greater than or equal to 1, and in the case where Z is greater than 1, a time domain resource intersection between the PDSCHs is non-empty.

In an embodiment, W satisfies at least one of the features below.

W is less than the sum of respective maximum numbers of TBs included in the Z PDSCHs, where among PDSCHs whose maximum number of TBs is greater than 1 among the Z PDSCHs, no configuration exists between two groups of HARQ-ACK information corresponding to one PDSCH so that a bundling operation is required.

The maximum number of TBs included in the Z1 PDSCHs is less than the predetermined value, where the predetermined value is acquired according to at least one of the following information: the number of combination values of the N types of information or the maximum number of simultaneously received TBs.

In an embodiment, the channel parameter includes at least one of the following: the maximum number of received PDSCHs in one type of candidate PDSCHs; the maximum number of received PDSCHs between which a time domain intersection is non-empty; the maximum total number of code words included in PDSCHs between which a time domain intersection is non-empty; the maximum number of code words included in one PDSCH; the maximum number of PDCCHs included in one PDCCH monitoring occasion and used for scheduling PDSCHs in the same carrier component (CC); the maximum number of channels included in one time unit, where the channels include at least one of the following channels: a downlink channel, an uplink channel, a downlink data channel, a downlink control channel, an uplink data channel or an uplink control channel; the maximum number of received PDSCHs between which a time domain resource intersection is non-empty and of which radio network temporary identifiers (RNTIs) are different; the number of groups of HARQ-ACK information directed at one type of candidate PDSCHs and included in one HARQ-ACK feedback unit, where one group of HARQ-ACK information corresponds to one transport block or one PDSCH, and the one HARQ-ACK feedback unit includes one of the following: one HARQ-ACK feedback time unit, one HARQ-ACK bit set, or one feedback channel including a HARQ-ACK; information about a relationship between time domain resources occupied by E PDSCHs, where E is a positive integer greater than or equal to 2; whether a transmission configuration indicator (TCI) pool corresponding to one frequency domain bandwidth satisfies the following condition: no TCI in the TCI pool includes a quasi co-location reference signal associated with a QCL-TypeD; or parameter information of the same PUCCH resource index.

The PDSCHs between which the time domain resource intersection is non-empty include one of the following: PDSCHs belonging to one serving cell or PDSCHs belonging to at least two serving cells.

In an embodiment, the number of transmission repetitions of a PDSCH in one slot is associated with at least one of the following: the number of PDSCHs whose radio network temporary identifiers (RNTIs) are different; or the maximum number of received PDSCHs in one type of candidate PDSCHs.

In an embodiment, in the case where the channel parameter includes the information about the relationship between the time domain resources occupied by the E PDSCHs, the first target parameter determination module is configured in at least one of the manners below.

A predetermined condition needs to be satisfied between the time domain resources occupied by the E PDSCHs corresponding to the same value of the first-type information.

The predetermined condition does not need to be satisfied between time domain resources occupied by multiple PDSCHs corresponding to different values of the first-type information.

In an embodiment, the predetermined condition includes at least one of the following:

A time domain resource intersection between the E PDSCHs is empty, where the E PDSCHs correspond to one or more HARQ-ACK processes of one serving cell.

In the case where HARQ-ACK information of PDSCH1 is located in a first feedback time unit and HARQ-ACK information of PDSCH2 is located in a feedback time unit earlier than the first feedback time unit, the start position of PDSCH2 is not later than the start position of PDSCH1, where PDSCH1 and PDSCH2 belong to the E PDSCHs, and the E PDSCHs belong to one serving cell.

In the case where the end position of PDCCH4 is later than the end position of PDCCH3, the start position of PDSCH4 is not earlier than the end position of PDSCH3, where PDCCH3 schedules PDSCH3, PDCCH4 schedules PDSCH4, PDSCH3 and PDSCH4 belong to the E PDSCHs, and the E PDSCHs correspond to E HARQ-ACK processes of one serving cell.

A time domain resource intersection between PDSCH5 whose scrambling RNTI is a first-type RNTI and PDSCH6 scrambled by a CS-RNTI is empty, where PDSCH5 and PDSCH6 belong to the E PDSCHs, the E PDSCHs belong to a primary serving cell, and the first-type RNTI includes a cell RNTI (C-RNTI) and a modulation and coding scheme C-RNTI (MCS-C-RNTI).

A time domain resource intersection between PDSCH7 whose scrambling RNTI is a second-type RNTI and PDSCH8 scrambled by an RA-RNTI is empty, where PDSCH7 and PDSCH8 belong to the E PDSCHs, the E PDSCHs belong to one serving cell, and the second-type RNTI includes a C-RNTI, an MCS-C-RNTI and a CS-RNTI.

In an RRC_IDLE mode and an RRC_INACTIVE mode, an intersection between the E PDSCHs whose scrambling RNTI is a third-type RNTI is allowed to be non-empty, where the third-type RNTI includes an SI-RNTI, a P-RNTI, an RA-RNTI and a TC-RNTI.

In an embodiment, in the case where the channel parameter includes parameter information of one PUCCH resource index, the target parameter is determined according to the N types of information in the manner below.

Each of different combination values of the N types of information corresponds to one parameter set of the one PUCCH resource index, where the one parameter set of the one PUCCH resource index includes at least one of the following information: spatial relationship information, power information or timing advance information.

In an embodiment, the first target parameter determination module 320 is configured in one of the manners below.

The target parameter is determined according to the maximum number among numbers of respective values of Q types of information.

The target parameter is determined according to the number of combination values of Q types of information.

The target parameter is determined according to the minimum value of a first value and a predetermined threshold, where the first value is the maximum number among numbers of respective values of Q types of information.

The target parameter is determined according to the minimum value of a second value and a predetermined threshold, where the second value is the product of numbers of respective values of Q types of information.

Q is a positive integer less than or equal to N.

The Q types of information satisfy at least one of the following:

The Q types of information belong to the N types of information.

In the case where the N types of information include a time unit where HARQ-ACK information of a downlink channel is located, the Q types of information do not include the time unit where the HARQ-ACK of the downlink channel is located.

In an embodiment, the N types of information include one of the following: at least one of first-type information or second-type information; or a time unit where HARQ-ACK information of a downlink channel is located and at least one of first-type information or second-type information.

In an embodiment, the first-type information satisfies at least one of the features below.

The first-type information is acquired by RRC signaling.

The first-type information is acquired according to group information corresponding to a CORESET.

Different information values of the first-type information correspond to different CORESET group information.

Different values of the first-type information correspond to different communication nodes, where the communication nodes include at least one of the following: a receiving node of a HARQ-ACK; or a sending node of a downlink channel corresponding to the HARQ-ACK.

The first-type information is acquired according to a downlink control channel element index, where the downlink control channel element index includes at least one of the following: a CORESET index, a search space index or a candidate PDCCH index.

The first-type information is associated with a HARQ-ACK codebook type, where the HARQ-ACK codebook type includes a semi-static HARQ-ACK codebook and a dynamic HARQ-ACK codebook.

In an embodiment, the second-type information satisfies at least one of the features below.

The second-type information is acquired according to information included in a PDCCH.

The second-type information is acquired according to information about a control channel. The information about the control channel includes at least one of the following: a downlink control information format, a downlink control information size, a radio network temporary identifier, search space index information of downlink control information, CORESET index information, or downlink control information.

the second-type information is acquired according to a type of the downlink channel, where different values of the second-type information correspond to different types of the downlink channel.

The second-type information is acquired according to the PDSCH information.

The information about the PDSCH includes at least one of the following: the number of time domain symbols occupied by the PDSCH; the number of slots occupied by the PDSCH; scrambling sequence generation parameter information of the PDSCH; demodulation reference signal information of the PDSCH; quasi co-location reference signal information corresponding to a demodulation reference signal of the PDSCH; process number information of the PDSCH; or the position of a time domain symbol occupied by the PDSCH.

In an embodiment, the first-type information and the second-type information satisfy at least one of the features below.

The first-type information and the second-type information are acquired in different manners.

One first-type set corresponding to one information value of the first-type information includes at least two set elements, and the at least two set elements correspond to different second-type information values.

One information value of the first-type information corresponds to one first-type downlink control channel element, and the first-type downlink control channel element includes at least two second-type downlink control channel elements, where two second-type downlink channel elements correspond to different second-type information values.

In the case where the number of values of the first-type information is 1, the N types of information include the second-type information.

In the case where the number of values of the second-type information is 1, the N types of information include the first-type information.

In the case where a time domain resource intersection between two PDSCHs corresponding to different values of the first-type information is non-empty, a frequency domain resource intersection between the two PDSCHs is non-empty.

In the case where a time domain resource intersection between two PDSCHs corresponding to different values of the second-type information is non-empty, a frequency domain resource intersection between the two PDSCHs is empty.

In the case where a time and frequency resource intersection between two PDSCHs corresponding to different values of the first-type information is non-empty, the two PDSCHs are received at the intersection.

In the case where a time and frequency resource intersection between two PDSCHs corresponding to different values of the second-type information is non-empty, only one of the two PDSCHs is received at the intersection.

Different values of the first-type information correspond to two types of PDSCHs, and a set difference between time domain symbol number sets of the two types of PDSCHs in one slot is empty.

Different values of the first-type information correspond to two types of PDSCHs, and each of the two types of PDSCHs corresponds to one channel scrambling parameter.

Different values of the second-type information correspond to two types of PDSCHs, and the two types of PDSCHs share one channel scrambling parameter.

The first-type information is associated with the second-type information.

In an embodiment, the first-type information is associated with the second-type information in one of the manners below.

The first-type information is associated with the second-type information in terms of configuration; or the first-type information and the second-type information corresponding to PDSCHs whose HARQ-ACKs fall within a same time unit are associated with each other.

In an embodiment, the first-type information is associated with the second-type information in at least one of the manners below.

A value of one type of information is obtained according to a value of the other type of information.

A value range of one type of information is obtained according to a value or value range of the other type of information.

Certain value combinations of the two types of information are unable to exist simultaneously.

Certain value combinations of the two types of information are unable to be configured simultaneously.

Configuration information of one type of information includes the other type of information corresponding to the one type of information.

A correspondence between the two types of information is determined according to at least one of signaling information or an agreed rule.

The maximum number of combination values of the two types of information is not greater than a predetermined value.

One type of information is determined according to the number of values of the other type of information.

In an embodiment, the mapping relationship satisfies at least one of the features below.

Each information value of each of Q types of information corresponds to one first-type set.

Each combination value of the N types of information corresponds to one first-type set.

An intersection between first-type sets corresponding to different information values of each of Q types of information is empty.

A set difference between first-type sets corresponding to different information values of each of Q types of information is non-empty.

An intersection between first-type sets corresponding to different combination values of the N types of information is empty.

A set difference between first-type sets corresponding to different combination values of the N types of information is non-empty.

Each of different information values of each of Q types of information corresponds to one first-type set in one time unit.

Each of different combination values of Q types of information corresponds to the first-type set in one time unit.

Q is a positive integer less than or equal to N.

The Q types of information satisfy at least one of the following:

The Q types of information belong to the N types of information.

In the case where the N types of information include a time unit where a HARQ-ACK of a downlink channel is located, the Q types of information do not include the time unit where the HARQ-ACK of the downlink channel is located.

In an embodiment, the first-type set includes at least one of the following: a downlink channel set, a HARQ-ACK bit set, an uplink channel set including HARQ-ACK information, or a downlink control channel element set. The HARQ-ACK information is about a downlink channel, and a downlink control channel element in the downlink control channel element set corresponds to the downlink channel corresponding to the HARQ-ACK information.

In an embodiment, the apparatus further includes a time interval determination module.

The time interval determination module is configured to determine a time interval between a PDSCH and a feedback resource where a HARQ-ACK of the PDSCH is located according to the end position of the PDSCH in a predetermined number of transmission repetitions of the PDSCH in one time unit.

In the case where the number of time units occupied by the PDSCH is greater than 1, the one time unit is the last time unit where the PDSCH is located.

The target parameter determination apparatus according to this embodiment and the target parameter determination method according to any preceding embodiment belong to the same concept and have the same effect. For technical details not described in detail in this embodiment, see any preceding embodiment.

Figure 32:
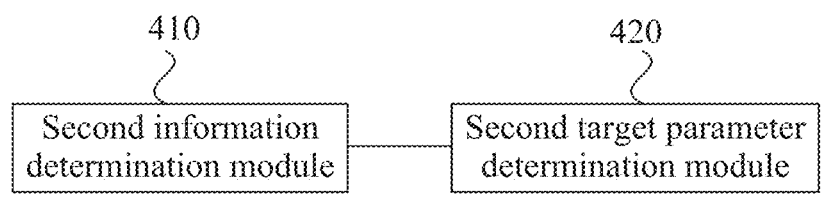
FIG. 32 is a diagram illustrating the structure of a target parameter determination apparatus according to an embodiment.

An embodiment of the present application provides a target parameter determination apparatus. FIG. 32 is a diagram illustrating the structure of a target parameter determination apparatus according to an embodiment. As shown in FIG. 32, the apparatus includes the modules below.

A second information determination module 410 is configured to determine M types of information, where M is a positive integer, and in the case where M is greater than 1, at least two of the M types of information are associated with each other.

A second target parameter determination module 420 is configured to determine a target parameter according to the M types of information, where the target parameter includes at least one of a HARQ-ACK parameter or a channel parameter.

In an embodiment, the M types of information include the following information: HARQ-ACK codebook type information, N types of information, and the number of PDSCHs whose time domain resources have an intersection.

The HARQ-ACK codebook type includes a semi-static codebook and a dynamic codebook.

The N types of information include at least one type of first-type information or second-type information, where N is a positive integer.

The PDSCHs whose time domain resources have an intersection belong to the same or different frequency domain bandwidths.

In an embodiment, the M types of information include fifth-type information and sixth-type information.

The sixth-type information includes at least one of the following: a sequence of the HARQ-ACK information of the C downlink channels in HARQ-ACK information included in the one feedback resource; a feedback resource where the HARQ-ACK information of the C downlink channels is located; a processing sequence of DAIs corresponding to the C downlink channels; or the index of a PDCCH.

The C downlink channels correspond to one combination value of a second-type information set, and C is a positive integer greater than 1.

The feedback element includes at least one of the following: a feedback channel resource or a HARQ-ACK bit set.

The second-type information set includes at least one of the following information: a PDCCH monitoring occasion, a serving cell where a PDSCH is located, a time unit where a HARQ-ACK is located, a combination value of the N types of information, a candidate PDSCH type, a feedback resource where a HARQ-ACK is located, or a HARQ-ACK bit set containing a HARQ-ACK.

The N types of information include at least one type of first-type information or second-type information.

In an embodiment, the fifth-type information includes information about a downlink control channel corresponding to a downlink channel.

In the case where the downlink channel includes a PDSCH, a downlink control channel corresponding to the downlink channel includes a PDCCH scheduling the PDSCH.

In the case where the downlink channel includes a released SPS PDSCH, a downlink control channel corresponding to the downlink channel includes a PDCCH releasing the SPS PDSCH.

In an embodiment, the information about the downlink control channel includes at least one of the following information: CORESET index information of the PDCCH scheduling the PDSCH, search space index information of the PDCCH scheduling the PDSCH, candidate PDCCH index information of the PDCCH scheduling the PDSCH, quasi co-location information of a demodulation reference signal of the PDCCH scheduling the PDSCH, or frequency domain index information of the PDCCH scheduling the PDSCH.

In an embodiment, the M types of information include seventh-type information.

The second information determination module 410 is configured to: in the case where the number of received PDSCHs in one type of candidate PDSCHs in one serving cell is less than a third predetermined value, determine the seventh-type information according to at least one of signaling information or a third predetermined rule.

The seventh-type information includes at least one of the following information: a semi-static HARQ-ACK codebook including HARQ-ACK information corresponding to the one type of candidate PDSCHs; or the number of groups of HARQ-ACK information corresponding to the one type of candidate PDSCHs and included in one HARQ-ACK feedback unit.

One group of HARQ-ACK information corresponds to one PDSCH or one TB.

The feedback unit includes at least one of the following: one HARQ-ACK feedback time unit, one HARQ-ACK bit set, or one feedback channel including a HARQ-ACK.

In an embodiment, the M types of information include the maximum number of groups of HARQ-ACKs directed at one time domain resource of a downlink transport domain and included in one feedback unit; the maximum number of code words (CWs) included in PDSCHs whose time domain resources have an intersection; N types of information; information about the number of sets of parameters of the same type corresponding to one frequency domain bandwidth.

The feedback unit includes at least one of the following: one HARQ-ACK feedback time unit, one HARQ-ACK bit set, or one feedback channel including a HARQ-ACK; and the N types of information include at least one type of first-type information or second-type information.

In an embodiment, the M types of information include the number of transmission repetitions of a PDSCH in one time unit and at least one of the following information: the maximum number of PDSCHs received by a terminal in one type of candidate PDSCHs; a feedback resource where HARQ-ACK information of the PDSCH is located; or a time domain resource intersection between two PDSCHs.

The number of transmission repetitions is a positive integer.

In an embodiment, the apparatus further includes a channel number determination module.

The channel number determination module is configured to calculate the number of PDSCHs in one of the manners below.

A PDSCH repeatedly transmitted R times is counted as one PDSCH.

A PDSCH repeatedly transmitted one time among R transmission repetitions is counted as one PDSCH.

R denotes the number of transmission repetitions of the PDSCH within one slot.

The number of PDSCHs includes the number of PDSCHs received by the terminal in the one type of candidate PDSCHs and the number of PDSCHs whose time domain resources have an intersection.

In an embodiment, the M types of information include the number of transmission repetitions of a PDSCH in one time unit; a time interval included in a PDCCH scheduling a PDSCH and located between the PDSCH and a feedback resource where a HARQ-ACK of the PDSCH is located.

The time interval is between the end position of the PDSCH in a predetermined number of transmission repetitions of the PDSCH in one time unit and the feedback resource where the HARQ-ACK of the PDSCH is located.

In the case where the number of time units occupied by the PDSCH is greater than 1, the one time unit is the last time unit where the PDSCH is located.

In an embodiment, the M types of information include N types of information, parameter information of a PUCCH, where each of different combination values of the N types of information corresponds to one parameter set of the PUCCH; and the one parameter set of the PUCCH includes at least one of the following information: spatial relationship information, power information or timing advance information.

In an embodiment, the M types of information include a relationship between a predetermined threshold and a time interval between a PDSCH and a PDCCH scheduling the PDSCH; a transmission mode set supported by the PDSCH; a mapping mode between resources of the PDSCH and multiple TCIs corresponding to the PDSCH.

In an embodiment, the M types of information include whether a TCI pool corresponding to one frequency domain bandwidth satisfies a predetermined condition and also include at least one of the following information: the number of combination values of the N types of information, the number of PDSCHs between which the time domain resource intersection is non-empty in one frequency domain bandwidth, or the maximum number of PDSCHs between which the time domain resource intersection is non-empty in one frequency domain bandwidth.

The predetermined condition includes that no TCI in the TCI pool includes a quasi co-location reference signal associated with a QCL-TypeD.

In an embodiment, the M types of information include the number of TCIs corresponding to a PDSCH in one slot, the number of transmission repetitions of the PDSCH in the one slot, the number of transmission repetitions of the PDSCH between slots, pattern information of a demodulation reference signal, the number of information bits included in a transport block.

In an embodiment, at least two of the M types of information are associated with each other in at least one of the manners below.

The number of transmission repetitions of the PDSCH in the one slot is determined according to the number of TCIs corresponding to the PDSCH in the one slot.

The pattern information of the demodulation reference signal is determined according to the number of time domain symbols of one of the TCIs corresponding to the PDSCH in the one slot.

The pattern information of the demodulation reference signal is determined according to the number of time domain symbols corresponding to one of the transmission repetitions of the PDSCH in the one slot.

In the case where the number of transmission repetitions of one PDSCH in the one slot is greater than 1 and a number of resource elements (REs) available to the one PDSCH varies in different transmission repetitions, the number of information bits included in a transport block in the one PDSCH is obtained according to the number of REs available to the one PDSCH in a predetermined number of transmission repetitions.

In an embodiment, the M types of information include first-type information and second-type information, where the first-type information is associated with the second-type information.

In an embodiment, the first-type information and the second-type information satisfy at least one of the features below.

The first-type information and the second-type information are acquired in different manners.

One first-type set corresponding to one information value of the first-type information includes at least two set elements, and the at least two set elements correspond to different second-type information values.

One information value of the first-type information corresponds to one first-type downlink control channel element, and the first-type downlink control channel element includes at least two second-type downlink control channel elements, where two second-type downlink channel elements correspond to different second-type information values.

In the case where the number of values of the first-type information is 1, the N types of information include the second-type information.

In the case where the number of values of the second-type information is 1, the N types of information include the first-type information.

In the case where a time domain resource intersection between two PDSCHs corresponding to different values of the first-type information is non-empty, a frequency domain resource intersection between the two PDSCHs is non-empty.

In the case where a time domain resource intersection between two PDSCHs corresponding to different values of the second-type information is non-empty, a frequency domain resource intersection between the two PDSCHs is empty.

In the case where a time and frequency resource intersection between two PDSCHs corresponding to different values of the first-type information is non-empty, the two PDSCHs are received at the intersection.

In the case where a time and frequency resource intersection between two PDSCHs corresponding to different values of the second-type information is non-empty, only one of the two PDSCHs is received at the intersection.

Different values of the first-type information correspond to two types of PDSCHs, and a set difference between time domain symbol number sets of the two types of PDSCHs in one slot is empty.

Different values of the first-type information correspond to two types of PDSCHs, and each of the two types of PDSCHs corresponds to one channel scrambling parameter.

Different values of the second-type information correspond to two types of PDSCHs, and the two types of PDSCHs share one channel scrambling parameter.

Different combination values of the first-type information and the second-type information correspond to different HARQ-ACK bit sets.

The first-type information includes group information in a CORESET.

Different values of the second-type information correspond to different PUCCH resource sets.

A mapping relationship exists between a combination value of the first-type information and the second-type information and a first-type set. The first-type set includes at least one of the following: a downlink channel set, a HARQ-ACK bit set, an uplink channel set including HARQ-ACK information, or a downlink control channel element set. The HARQ-ACK information is about a downlink channel, and a downlink control channel element in the downlink control channel element set corresponds to the downlink channel corresponding to the HARQ-ACK information.

In an embodiment, the first-type information is associated with the second-type information in one of the manners below.

The first-type information is associated with the second-type information in terms of configuration; or the first-type information and the second-type information corresponding to PDSCHs whose HARQ-ACKs fall within a same time unit are associated with each other.

The two types of information are associated with each other in at least one of the manners below.

A value of one type of information is obtained according to a value of the other type of information.

A value range of one type of information is obtained according to a value of the other type of information.

A value range of one type of information is obtained according to a value range of the other type of information.

Certain value combinations of the two types of information are unable to exist simultaneously.

Certain values of the two types of information are unable to exist simultaneously.

Configuration information of one type of information includes the other type of information corresponding to the one type of information.

A correspondence between the two types of information is determined according to at least one of signaling information or an agreed rule.

The maximum number of combination values of the two types of information is not greater than a predetermined value.

One type of information is determined according to the number of values of the other type of information.

Configuration information of one type of information is associated with configuration information of the other type of information.

In the case where associated information elements belong to the same time unit, the two types of information are associated with each other.

The target parameter determination apparatus according to this embodiment and the target parameter determination method according to any preceding embodiment belong to the same concept and have the same effect. For technical details not described in detail in this embodiment, reference may be made to any preceding embodiment.

An embodiment of the present application provides a communication node. The target parameter determination method according to any preceding embodiment may be performed by the target parameter determination apparatus. The target parameter determination apparatus may be implemented as software and/or hardware and integrated in the communication node.

Figure 33:
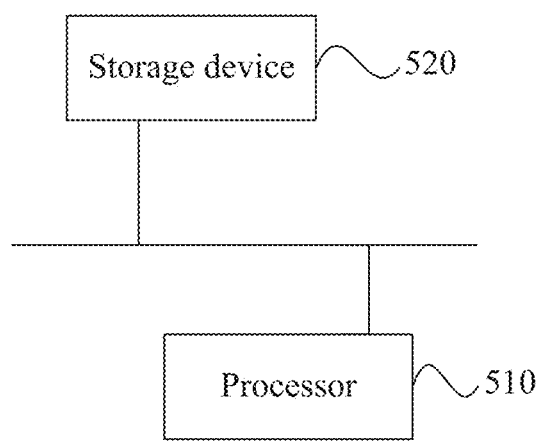
FIG. 33 is a diagram illustrating the structure of a communication node according to an embodiment.

FIG. 33 is a diagram illustrating the structure of a communication node according to an embodiment. As shown in FIG. 33, the communication node includes a processor 510 and a storage device 520. The communication node may include one or more processors. In FIG. 33, one processor 510 is used as an example. The processor 510 and the storage device 520 in the communication node may be connected by a bus, which is taken as an example in FIG. 33, or connected in other manners.

When the one or more programs are executed by the one or more processors, the one or more processors perform the target parameter determination method according to any preceding embodiment.

As a computer-readable storage medium, the storage device 520 in the communication node may be configured to store one or more programs. The programs may be software programs, computer-executable programs and modules, for example, program instructions/modules corresponding to the resource indication method according to any preceding embodiment (for example, modules in the target parameter determination apparatus of FIG. 31 include a first information determination module 310 and a first target parameter determination module 320). The processor 510 executes software programs, instructions and modules stored in the storage device 520 to perform the various function applications and data processing of the communication node, that is, implement the target parameter determination method according to any preceding embodiment.

The storage device 520 includes a program storage region and a data storage region. The program storage region may store an operating system and an application program required by at least one function. The data storage region may store data (for example, the N types of information and the target parameter in any preceding embodiment) created based on the use of the communication node. In addition, the storage device 520 may include a high-speed random-access memory and a nonvolatile memory, such as at least one disk memory, a flash memory or other nonvolatile solid-state memories. In some examples, the storage device 520 may include memories disposed remote from the processor 510. These remote memories may be connected to the communication node via a network. Examples of the preceding network include, but are not limited to, the Internet, an intranet, a local area network, a mobile communication network and a combination thereof.

When the one or more programs included in the communication node are executed by the one or more processors 510, the target parameter determination method according to any preceding embodiment is implemented.

The communication node according to this embodiment and the target parameter determination method according to any preceding embodiment belong to the same concept. For technical details not described in detail in this embodiment, see any preceding embodiment. Moreover, this embodiment has the same effect as the performed resource indication method.

An embodiment of the present application provides a storage medium including computer-executable instructions. The storage medium stores a computer program which, when executed by a processor, causes the processor to perform the target parameter determination method according to any preceding embodiment.

From the preceding description of embodiments, it will be apparent to those skilled in the art that the present application may be implemented by software and general-purpose hardware or may be implemented by hardware. Based on this understanding, the solution according to the present application may be embodied in the form of a software product. The software product may be stored in a computer-readable storage medium (such as a floppy disk, a read-only memory (ROM)/random-access memory (RAM), a magnetic disk or an optical disk) and includes several instructions for enabling a computer device (which may be a personal computer, a server or a network device) to perform the method according to any embodiment of the present application.

The preceding are merely example embodiments of the present application and are not intended to limit the scope of the present application.

A block diagram of any logic flow in drawings of the present application may represent program steps, may represent interconnected logic circuits, modules and functions or may represent a combination of program steps, logic circuits, modules and functions. The computer program may be stored in a memory. The memory may be of any type suitable for a local technical environment and may be implemented using any suitable data storage technology, such as, but not limited to a read-only memory (ROM), a random-access memory (RAM), an optical memory device and system (a digital video disc (DVD) or a compact disc (CD)). The computer-readable medium may include a non-transitory storage medium. The processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA) or a processor based on a multi-core processor architecture.

What is claimed is:

1. A target parameter determination method, comprising:
   determining control resource set (CORESET) group information, wherein a mapping relationship exists between the CORESET group information and a first-type set, and the first-type set comprises a downlink channel set and a hybrid automatic repeat request acknowledgement (HARQ-ACK) bit set; and
   determining a target parameter according to the CORESET group information, wherein the target parameter comprises a relationship between time domain resources occupied by E physical downlink shared channels (PDSCHs), wherein E is a positive integer greater than or equal to 2;

wherein the target parameter is determined according to the CORESET group information in following manner:

a predetermined condition needs to be satisfied between the time domain resources occupied by the E PDSCHs if the E PDSCHs correspond to a same value of CORESET group information; and the predetermined condition does not need to be satisfied between time domain resources occupied by the E PDSCHs if the E PDSCHs correspond to different values of CORESET group information;

wherein the predetermined condition comprises:

in a case where HARQ-ACK information of PDSCH1 is located in a first feedback time unit and HARQ-ACK information of PDSCH2 is located in a feedback time unit earlier than the first feedback time unit, a start position of PDSCH2 is not later than a start position of PDSCH1, wherein PDSCH1 and PDSCH2 belong to the E PDSCHs, and the E PDSCHs belong to one serving cell;

in a case where an end position of physical downlink control channel 4 (PDCCH4) is later than an end position of PDCCH3, a start position of PDSCH4 is not earlier than an end position of PDSCH3, wherein the PDCCH3 schedules the PDSCH3, the PDCCH4 schedules the PDSCH4, the PDSCH3 and the PDSCH4 belong to the E PDSCHs, and the E PDSCHs correspond to E HARQ-ACK processes of one serving cell.

2. The method of claim 1, wherein the target parameter further comprises an HARQ-ACK parameter, the HARQ-ACK parameter comprises a downlink assignment index (DAI) for determining a bit sequence of HARQ-ACK information and a number of bits of HARQ-ACK information, and the determining the target parameter according to the CORESET group information comprises:

DAIs corresponding to different values of the CORESET group information are counted in a uniform manner;

a processing sequence of DAIs in multiple PDCCHs corresponding to different values of the CORESET group information is determined according to a predetermined rule;

wherein the DAI comprises C-DAI and T-DAI;

wherein the predetermined rule comprises the processing sequence of the DAIs in the PDCCHs corresponding to the different values of the CORESET group information is determined in ascending order of the values of the CORESET group information; wherein the multiple PDCCHs correspond to a same value of the following information: a PDCCH monitoring occasion, a serving cell where a PDSCH scheduled by a PDCCH is located, a time unit where HARQ-ACK information corresponding to a PDCCH is located, a HARQ-ACK bit set containing HARQ-ACK information corresponding to a PDCCH, and a HARQ-ACK feedback resource where HARQ-ACK information corresponding to a PDCCH is located.

3. The method of claim 1, wherein the target parameter further comprises an HARQ-ACK parameter, the HARQ-ACK parameter comprises a downlink assignment index (DAI) for determining a bit sequence of HARQ-ACK information and a number of bits of HARQ-ACK information, and a processing sequence of DAIs comprises:

first, DAIs in PDCCHs corresponding to a same PDCCH monitoring occasion and a same serving cell are processed in ascending order of CORESET group information;

second, DAIs in PDCCHs corresponding to a same PDCCH monitoring occasion are processed in ascending order of serving cells; and third, DAIs in PDCCHs are processed in ascending order of PDCCH monitoring occasions, wherein HARQ-ACK information corresponding to the PDCCHs is comprised in one HARQ-ACK bit set.

4. The method of claim 1, wherein the target parameter further comprises an HARQ-ACK parameter, the HARQ-ACK parameter comprises an uplink feedback resource where HARQ-ACK is located; and the target parameter is determined according to the CORESET group information in the following manner:

the uplink feedback resource is determined according to uplink feedback resource information indicated in a PDCCH, wherein the PDCCH comprises a PDCCH satisfying a predetermined feature among multiple PDCCHs corresponding to multiple groups of HARQ-ACK information, and the uplink feedback resource comprises the multiple groups of HARQ-ACK information, wherein an acquisition parameter of the PDCCH satisfying the predetermined feature comprises the CORESET group information; or in a case where a predetermined condition is satisfied, an acquisition parameter of the PDCCH satisfying the predetermined feature comprises the CORESET group information;

wherein the PDCCH satisfying the predetermined feature comprises a PDCCH having a largest index among the multiple PDCCHs, wherein an acquisition parameter of indexes of the multiple PDCCHs comprises the CORESET group information, a PDCCH monitoring occasion index, and a serving cell index corresponding to the PDCCH.

5. The method of claim 4, wherein the acquisition parameter of the indexes of the multiple PDCCHs comprises the CORESET group information, the PDCCH monitoring occasion index, and the serving cell index corresponding to the PDCCH in the following manner:

first, PDCCHs corresponding to a same PDCCH monitoring occasion and a same serving cell are indexed in ascending order of the CORESET group information;

second, PDCCHs corresponding to a same PDCCH monitoring occasion are indexed in ascending order of serving cells; and third, PDCCHs are indexed in ascending order of PDCCH monitoring occasions.

6. The method of claim 1, further comprising:

in a case where one feedback resource comprises HARQ-ACK information of C downlink channels and C is greater than 1, determining, according to a time domain resource index of each of the E PDSCHs, the following:

a position where the HARQ-ACK information of the C downlink channels is located in HARQ-ACK information comprised in one HARQ-ACK bit set in one feedback resource; and a processing sequence of DAIs corresponding to the C downlink channels, wherein C is a positive integer greater than 1, and the C downlink channels correspond to one combination value of a second-type information set, wherein the second-type information set comprises the following information: a PDCCH monitoring occasion, a serving cell where a PDSCH is located, a time unit where a HARQ-ACK is located, a feedback resource where a HARQ-ACK is located, and a HARQ-ACK bit set containing a HARQ-ACK.

7. The method of claim 1, wherein the channel parameter further comprises:
   a maximum number of received PDSCHs in one type of candidate PDSCHs.

8. The method of claim 1, wherein the predetermined condition comprises:
   a time domain resource intersection between the E PDSCHs is empty, wherein the E PDSCHs correspond to one or more HARQ-ACK processes of one serving cell.

9. A communication node, comprising:
   at least one processor; and
   a storage medium configured to store at least one program,
   wherein when the at least one program is executed by the at least one processor, the at least one processor performs the following steps:
   determining control resource set (CORESET) group information, wherein a mapping relationship exists between the CORESET group information and a first-type set, and the first-type set comprises a downlink channel set and a hybrid automatic repeat request acknowledgement (HARQ-ACK) bit set; and
   determining a target parameter according to the CORESET group information, wherein the target parameter comprises a relationship between time domain resources occupied by E physical downlink shared channels (PDSCHs), wherein E is a positive integer greater than or equal to 2;
   wherein the target parameter is determined according to the CORESET group information in following manner:
   a predetermined condition needs to be satisfied between the time domain resources occupied by the E PDSCHs if the E PDSCHs correspond to a same value of CORESET group information; and
   the predetermined condition does not need to be satisfied between time domain resources occupied by the E PDSCHs if the E PDSCHs correspond to different values of CORESET group information;
   wherein the predetermined condition comprises:
   in a case where HARQ-ACK information of PDSCH1 is located in a first feedback time unit and HARQ-ACK information of PDSCH2 is located in a feedback time unit earlier than the first feedback time unit, a start position of PDSCH2 is not later than a start position of PDSCH1, wherein PDSCH1 and PDSCH2 belong to the E PDSCHs, and the E PDSCHs belong to one serving cell;
   in a case where an end position of physical downlink control channel 4 (PDCCH4) is later than an end position of PDCCH3, a start position of PDSCH4 is not earlier than an end position of PDSCH3, wherein the PDCCH3 schedules the PDSCH3, the PDCCH4 schedules the PDSCH4, the PDSCH3 and the PDSCH4 belong to the E PDSCHs, and the E PDSCHs correspond to E HARQ-ACK processes of one serving cell.

10. A non-transitory computer-readable storage medium, the storage medium storing a computer program which, when executed by a processor, causes the processor to perform the following steps:
   determining control resource set (CORESET) group information, wherein a mapping relationship exists between the CORESET group information and a first-type set, and the first-type set comprises a downlink channel set and a hybrid automatic repeat request acknowledgement (HARQ-ACK) bit set; and
   determining a target parameter according to the CORESET group information, wherein the target parameter comprises a relationship between time domain resources occupied by E physical downlink shared channels (PDSCHs), wherein E is a positive integer greater than or equal to 2;
   wherein the target parameter is determined according to the CORESET group information in following manner:
   a predetermined condition needs to be satisfied between the time domain resources occupied by the E PDSCHs if the E PDSCHs correspond to a same value of CORESET group information; and
   the predetermined condition does not need to be satisfied between time domain resources occupied by the E PDSCHs if the E PDSCHs correspond to different values of CORESET group information;
   wherein the predetermined condition comprises:
   in a case where HARQ-ACK information of PDSCH1 is located in a first feedback time unit and HARQ-ACK information of PDSCH2 is located in a feedback time unit earlier than the first feedback time unit, a start position of PDSCH2 is not later than a start position of PDSCH1, wherein PDSCH1 and PDSCH2 belong to the E PDSCHs, and the E PDSCHs belong to one serving cell;
   in a case where an end position of physical downlink control channel 4 (PDCCH4) is later than an end position of PDCCH3, a start position of PDSCH4 is not earlier than an end position of PDSCH3, wherein the PDCCH3 schedules the PDSCH3, the PDCCH4 schedules the PDSCH4, the PDSCH3 and the PDSCH4 belong to the E PDSCHs, and the E PDSCHs correspond to E HARQ-ACK processes of one serving cell.

11. The communication node of claim 9, wherein the target parameter further comprises an HARQ-ACK parameter, the HARQ-ACK parameter comprises a downlink assignment index (DAI) for determining a bit sequence of HARQ-ACK information and a number of bits of HARQ-ACK information, and the determining the target parameter according to the CORESET group information comprises:
   DAIs corresponding to different values of the CORESET group information are counted in a uniform manner;
   a processing sequence of DAIs in multiple PDCCHs corresponding to different values of the CORESET group information is determined according to a predetermined rule;
   wherein the DAI comprises C-DAI and T-DAI;
   wherein the predetermined rule comprises the processing sequence of the DAIs in the PDCCHs corresponding to the different values of the CORESET group information is determined in ascending order of the values of the CORESET group information; wherein
   the multiple PDCCHs correspond to a same value of the following information: a PDCCH monitoring occasion, a serving cell where a PDSCH scheduled by a PDCCH is located, a time unit where HARQ-ACK information corresponding to a PDCCH is located, a HARQ-ACK bit set containing HARQ-ACK information corresponding to a PDCCH, and a HARQ-ACK feedback resource where HARQ-ACK information corresponding to a PDCCH is located.

12. The communication node of claim 9, wherein the target parameter further comprises an HARQ-ACK parameter, the HARQ-ACK parameter comprises a downlink assignment index (DAI) for determining a bit sequence of HARQ-ACK information and a number of bits of HARQ-ACK information, and a processing sequence of DAIs comprises:
- first, DAIs in PDCCHs corresponding to a same PDCCH monitoring occasion and a same serving cell are processed in ascending order of CORESET group information;
- second, DAIs in PDCCHs corresponding to a same PDCCH monitoring occasion are processed in ascending order of serving cells; and
- third, DAIs in PDCCHs are processed in ascending order of PDCCH monitoring occasions, wherein HARQ-ACK information corresponding to the PDCCHs is comprised in one HARQ-ACK bit set.

13. The communication node of claim 9, wherein the target parameter further comprises an HARQ-ACK parameter, the HARQ-ACK parameter comprises an uplink feedback resource where a HARQ-ACK is located; and
- the target parameter is determined according to the CORESET group information in the following manner:
- the uplink feedback resource is determined according to uplink feedback resource information indicated in a PDCCH, wherein the PDCCH comprises a PDCCH satisfying a predetermined feature among multiple PDCCHs corresponding to multiple groups of HARQ-ACK information, and the uplink feedback resource comprises the multiple groups of HARQ-ACK information, wherein
- an acquisition parameter of the PDCCH satisfying the predetermined feature comprises the CORESET group information; or in a case where a predetermined condition is satisfied, an acquisition parameter of the PDCCH satisfying the predetermined feature comprises the CORESET group information;
- wherein the PDCCH satisfying the predetermined feature comprises a PDCCH having a largest index among the multiple PDCCHs, wherein an acquisition parameter of indexes of the multiple PDCCHs comprises the CORESET group information, a PDCCH monitoring occasion index, and a serving cell index corresponding to the PDCCH;
- wherein the acquisition parameter of the indexes of the multiple PDCCHs comprises the CORESET group information, the PDCCH monitoring occasion index, and the serving cell index corresponding to the PDCCH in the following manner:
- first, PDCCHs corresponding to a same PDCCH monitoring occasion and a same serving cell are indexed in ascending order of the CORESET group information;
- second, PDCCHs corresponding to a same PDCCH monitoring occasion are indexed in ascending order of serving cells; and
- third, PDCCHs are indexed in ascending order of PDCCH monitoring occasions.

14. The communication node of claim 9, wherein when the at least one program is executed by the at least one processor, the at least one processor further performs the following steps:
- in a case where one feedback resource comprises HARQ-ACK information of C downlink channels and C is greater than 1, determining, according to a time domain resource index of each of the E PDSCHs, the following:
- a position where the HARQ-ACK information of the C downlink channels is located in HARQ-ACK information comprised in one HARQ-ACK bit set in one feedback resource; and
- a processing sequence of DAIs corresponding to the C downlink channels,
- wherein C is a positive integer greater than 1, and the C downlink channels correspond to one combination value of a second-type information set, wherein
- the second-type information set comprises the following information: a PDCCH monitoring occasion, a serving cell where a PDSCH is located, a time unit where a HARQ-ACK is located, a feedback resource where a HARQ-ACK is located, and a HARQ-ACK bit set containing a HARQ-ACK.

15. The communication node of claim 9, wherein the channel parameter further comprises:
- a maximum number of received PDSCHs in one type of candidate PDSCHs.

16. The communication node of claim 9, wherein the predetermined condition comprises:
- a time domain resource intersection between E PDSCHs is empty, wherein the E PDSCHs correspond to one or more HARQ-ACK processes of one serving cell.

* * * * *